United States Patent
Stoller et al.

(10) Patent No.: US 10,219,431 B2
(45) Date of Patent: Mar. 5, 2019

(54) SYSTEMS, METHODS, AND APPARATUS FOR SOIL AND SEED MONITORING

(71) Applicants: The Climate Corporation, San Francisco, CA (US); Leann Rocke

(72) Inventors: Jason Stoller, Eureka, IL (US); Justin Koch, Morton, IL (US); Brian McMahon, Deer Creek, IL (US); Derek Sauder, Tremont, IL (US); Ian Radtke, Washington, IL (US); Michael Strnad, Delavan, IL (US); Dale Koch, Tremont, IL (US); Matthew Morgan, Peoria, IL (US); Tracy Leman, Eureka, IL (US); Paul Wildermuth, Tremont, IL (US)

(73) Assignee: The Climate Corporation, San Francisco, CA (US)

(*) Notice: Subject to any disclaimer, the term of this patent is extended or adjusted under 35 U.S.C. 154(b) by 0 days.

(21) Appl. No.: 15/672,024

(22) Filed: Aug. 8, 2017

(65) Prior Publication Data

US 2018/0125002 A1 May 10, 2018

Related U.S. Application Data

(63) Continuation of application No. 15/345,847, filed on Nov. 8, 2016, which is a continuation of application (Continued)

(51) Int. Cl.
*A01C 23/02* (2006.01)
*A01C 5/06* (2006.01)
*A01C 7/06* (2006.01)

(52) U.S. Cl.
CPC ............ *A01C 23/025* (2013.01); *A01C 5/068* (2013.01); *A01C 5/064* (2013.01); *A01C 7/06* (2013.01)

(58) Field of Classification Search
CPC ...... A01C 23/02; A01C 23/022; A01C 23/028; A01C 23/04; A01C 7/06; A01C 7/203;
(Continued)

(56) References Cited

U.S. PATENT DOCUMENTS 2,366,389 A 1/1945 Davenport
3,749,035 A 7/1973 Cayton et al.
(Continued)

FOREIGN PATENT DOCUMENTS

CA 2905119 A1 9/2014
CA 2888970 A1 5/2015
(Continued)

OTHER PUBLICATIONS

International Search Report and Written Opinion for PCT/US2015/029719 dated Oct. 5, 2015, pp. 1-14.
(Continued)

*Primary Examiner* — Christopher J. Novosad
(74) *Attorney, Agent, or Firm* — Hickman Palermo; Becker Bingham LLP; Malgorzata A. Kulczycka

(57) ABSTRACT

Systems, methods and apparatus for monitoring soil properties and applying fertilizer during a planting operation. Various sensors are disposed in ground engaging components for monitoring soil properties. The ground engaging components may have structure for opening a side trench in the sidewalls of the seed trench and may include liquid application conduits for injecting liquid into the sidewalls of the resulting side trenches.

13 Claims, 48 Drawing Sheets

Related U.S. Application Data

No. PCT/US2016/037704, filed on Jun. 15, 2016, and a continuation-in-part of application No. PCT/US2015/029719, filed on May 7, 2015, and a continuation-in-part of application No. PCT/US2015/029710, filed on May 7, 2015.

(60) Provisional application No. 62/280,085, filed on Jan. 18, 2016, provisional application No. 62/220,576, filed on Sep. 18, 2015, provisional application No. 62/175,920, filed on Jun. 15, 2015, provisional application No. 62/137,551, filed on Mar. 24, 2015, provisional application No. 62/060,392, filed on Oct. 6, 2014, provisional application No. 61/990,404, filed on May 8, 2014.

(58) Field of Classification Search
CPC ....... A01C 7/04; A01C 23/025; A01C 23/023; A01C 23/00; A01C 5/068; A01C 5/066; A01C 5/06; A01C 5/00; A01C 5/064; A01C 5/062; A01C 7/00
USPC .......................................................... 111/120
See application file for complete search history.

(56) References Cited

U.S. PATENT DOCUMENTS

| | | | |
|---|---|---|---|
| 3,815,830 A | 6/1974 | Rowan | |
| 4,103,177 A | 1/1978 | Sanford et al. | |
| 4,116,140 A | 9/1978 | Anderson et al. | |
| 4,374,500 A | 2/1983 | Westerfield | |
| 4,413,685 A | 11/1983 | Gremelspacher et al. | |
| 5,038,040 A | 8/1991 | Funk et al. | |
| 5,044,756 A | 9/1991 | Gaultney et al. | |
| 5,296,702 A | 3/1994 | Beck et al. | |
| 5,355,815 A | 10/1994 | Monson | |
| 5,387,977 A | 2/1995 | Berg et al. | |
| 5,398,771 A | 3/1995 | Hornung et al. | |
| 5,461,229 A | 10/1995 | Sauter et al. | |
| 5,563,340 A | 10/1996 | Clowater et al. | |
| 5,621,666 A | 4/1997 | O'Neall et al. | |
| 5,673,637 A | 10/1997 | Colburn, Jr. et al. | |
| 5,852,982 A | 12/1998 | Peter | |
| 5,865,131 A | 2/1999 | Dietrich, Sr. et al. | |
| 5,887,491 A | 3/1999 | Monson et al. | |
| 5,931,882 A | 8/1999 | Fick et al. | |
| 5,956,255 A | 9/1999 | Flamme | |
| 6,016,714 A | 1/2000 | Smith et al. | |
| 6,148,747 A | 11/2000 | Deckler et al. | |
| 6,216,794 B1 | 4/2001 | Buchl | |
| 6,220,191 B1 | 4/2001 | Peter | |
| 6,302,040 B2 | 10/2001 | Lempriere | |
| 6,389,999 B1 | 5/2002 | Duello | |
| 6,453,832 B1 | 9/2002 | Schaffert | |
| 6,484,652 B1 | 11/2002 | Colburn, Jr. | |
| 6,596,996 B1 | 7/2003 | Stone et al. | |
| 6,608,672 B1 | 8/2003 | Shibusawa et al. | |
| 6,748,884 B1 | 6/2004 | Bettin et al. | |
| 6,827,029 B1 | 12/2004 | Wendte | |
| 6,918,342 B2 | 7/2005 | Sauder et al. | |
| 6,973,884 B2 | 12/2005 | Dietrich, Sr. | |
| 7,096,803 B2 | 8/2006 | Bergen | |
| 7,726,251 B1 | 6/2010 | Peterson et al. | |
| 7,849,955 B2 | 12/2010 | Crabill et al. | |
| 7,900,568 B2 | 3/2011 | Senchuk | |
| 7,942,102 B2 | 5/2011 | Schaffert | |
| 8,204,689 B2 | 6/2012 | Christy et al. | |
| 8,451,449 B2 | 5/2013 | Holland | |
| 8,453,586 B2 | 6/2013 | Cruson | |
| 8,544,395 B2 | 10/2013 | Dietrich, Sr. | |
| 8,550,020 B2 | 10/2013 | Sauder et al. | |
| 8,738,243 B2 | 5/2014 | Sauder et al. | |
| 8,789,482 B2 | 7/2014 | Garner et al. | |
| 8,814,626 B2 | 8/2014 | Smith | |
| 8,849,523 B1 | 9/2014 | Chan et al. | |
| 8,924,092 B2 | 12/2014 | Achen et al. | |
| 9,192,090 B2 | 11/2015 | Yeomans | |
| 9,585,301 B1* | 3/2017 | Lund | A01C 5/06 |
| 9,629,304 B2 | 4/2017 | Zielke | |
| 9,651,536 B1 | 5/2017 | Lund et al. | |
| 9,675,004 B2 | 6/2017 | Landphair et al. | |
| 9,743,574 B1 | 8/2017 | Maxton et al. | |
| 9,943,027 B2 | 4/2018 | Sauder et al. | |
| 2002/0000476 A1 | 1/2002 | Swanson | |
| 2002/0043197 A1 | 4/2002 | Schaffert | |
| 2002/0131046 A1 | 9/2002 | Christy et al. | |
| 2002/0171842 A1 | 11/2002 | Dicarlo et al. | |
| 2003/0016029 A1 | 1/2003 | Schuler et al. | |
| 2003/0048449 A1 | 3/2003 | Vander Jagt et al. | |
| 2004/0255832 A1 | 12/2004 | Schneider | |
| 2004/0255834 A1 | 12/2004 | Schaffert | |
| 2005/0051068 A1 | 3/2005 | Swanson | |
| 2006/0158652 A1 | 7/2006 | Rooney et al. | |
| 2007/0272134 A1 | 11/2007 | Baker et al. | |
| 2008/0110088 A1 | 5/2008 | Brusatore | |
| 2009/0112475 A1 | 4/2009 | Christy et al. | |
| 2010/0023430 A1 | 1/2010 | Hunter et al. | |
| 2010/0180695 A1 | 7/2010 | Sauder et al. | |
| 2010/0212558 A1 | 8/2010 | Wright et al. | |
| 2011/0106451 A1* | 5/2011 | Christy | G01N 21/359 702/5 |
| 2011/0108139 A1 | 5/2011 | Wright et al. | |
| 2012/0042813 A1 | 2/2012 | Liu et al. | |
| 2012/0137942 A1 | 6/2012 | Nikkel et al. | |
| 2012/0255474 A1 | 10/2012 | Sauder et al. | |
| 2013/0093580 A1 | 4/2013 | Chaney | |
| 2013/0104785 A1 | 5/2013 | Achen | |
| 2013/0112122 A1 | 5/2013 | Blomme | |
| 2013/0125800 A1* | 5/2013 | Landphair | A01B 79/005 111/149 |
| 2013/0138289 A1* | 5/2013 | Sauder | A01B 79/005 701/29.1 |
| 2013/0180742 A1 | 7/2013 | Wendte | |
| 2013/0250305 A1 | 9/2013 | Holland | |
| 2014/0076215 A1 | 3/2014 | Peter | |
| 2014/0343802 A1 | 11/2014 | Pichlmaier | |
| 2015/0094917 A1 | 4/2015 | Blomme | |
| 2015/0105984 A1* | 4/2015 | Birrell | A01D 41/127 701/50 |
| 2015/0319915 A1 | 11/2015 | Piftzner | |
| 2017/0045489 A1* | 2/2017 | Sauder | G01N 33/24 |
| 2017/0061052 A1* | 3/2017 | Gates | A01G 25/167 |
| 2017/0086359 A1 | 3/2017 | Landphair et al. | |
| 2017/0090068 A1* | 3/2017 | Xiang | G01V 99/005 |
| 2017/0172058 A1 | 6/2017 | Lund et al. | |
| 2017/0213083 A1* | 7/2017 | Shriver | G06K 9/00657 |

FOREIGN PATENT DOCUMENTS

| | | | |
|---|---|---|---|
| DE | 4121218 A1 | 3/1992 | |
| GB | 2126062 A | 3/1986 | |
| WO | WO-9636889 A1 * | 11/1996 | A01C 7/105 |
| WO | WO 01/76352 A1 | 10/2001 | |
| WO | WO2012129442 | 9/2012 | |
| WO | WO2012129442 A2 | 9/2012 | |
| WO | WO2012149398 | 11/2012 | |
| WO | WO2012149415 | 11/2012 | |
| WO | WO2014066664 A1 | 1/2014 | |
| WO | WO2014153157 A1 | 9/2014 | |

OTHER PUBLICATIONS

International Search Report and Written Opinion for PCT/US2016/037704 dated Sep. 13, 2016, pp. 1-24.

Sudduth et al., Soil Organic Matter, CEC, and Moisture Sensing with a Portable NIR Spectrophotomer, Power and Machinery Division of ASAE, vol. 36(6): 1571-1582, Nov.-Dec. 1993, 12 pages.

Sudduth et al., "Portable, Near-Infared Spectrophotometer for Rapid Soil Analysis", vol. 36(1): Jan.-Feb. 1993, Information and Electrical Technologies Systems Div. of ASAE, 10 pages.

(56) References Cited

OTHER PUBLICATIONS

Schirrmann et al, Soil pH Mapping with an On-The-Go-Sensor, Sensors 2011, 11, 573-598; doi:10.3390/s110100573, 26 pages.

Morgan et al., "Precision Farming: Sensors vs. Map-Based", Agricultural and Biological Engineering Department, Apr. 1995. 2 pages.

Maleki et al., "Optimisation of Soil VIS-NIR Sensor-based Variable Rate Application System of Soil Phosphorus", Soil & Tillage Research 94 (2007), pp. 239-250.

Lagacherie et al., "Visible-NIR Hyperspecttal Imagery for Discrimination Soil Types in the La Peyne Watershed", France, Developments in Soil Science vol. 31, Chapter 17, , dated 2007 16 pages.

Hummel et al., "Soil Property Sensing for Site-Specific Crop Management", Computers and Electronics in Agriculture 14 (1996), pp. 121-136.

Hummel et al., "Soil Moisture and Organic Matter Prediction of Surface and Subsurface Soils Using an NIR Soil Sensor", Computers and Electronics in Agriculture 32 (2001) pp. 149-165.

Grisso et al., "Precision Farming Tools: Variable Rate Application", Publication 442-505 Virginia Cooperative Extension, dated 2011, 16 pages.

Gaultney et al., "Soil Moisture Sensor for Predicting Seed Planting Depth", vol. 36 (6) dated Nov.-Dec. 1993, pp. 1703-1711.

Ess et al., "Implementing Site-Specific Management: Map—Versus Sensor-Based Variable Rate Application", Purdue University SSM-2-W, Jan. 2001, 9 pages.

Adamchuk et al., "On-the-Go Vehicle Based Soil Sensors", University of Nebraska Cooperative Extension EC 02-178, undated, 4 pages.

Adamchuk et al., "On-the-go Soil Sensors for Precision Agriculture", Computers and Electronics in Agriculture 44 (2004), pp. 71-91.

Adamchuk et al., "On-the-Go Capacitance Sensing of Soil Water Content", ASABE Meeting Presentation, Paper No. MC09-201, Apr. 4-5, 2009, 8 pages.

Adamchuk et al., "Characterizing Soil Variability Using On-the-Go Sensing Technology", Site-Specific Management Guidelines, SSMG-44, May 2006, 4 pages.

* cited by examiner

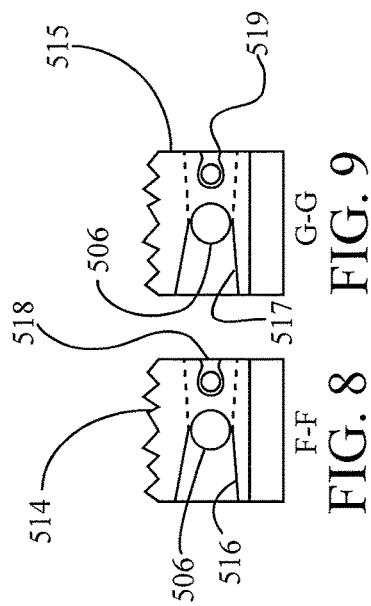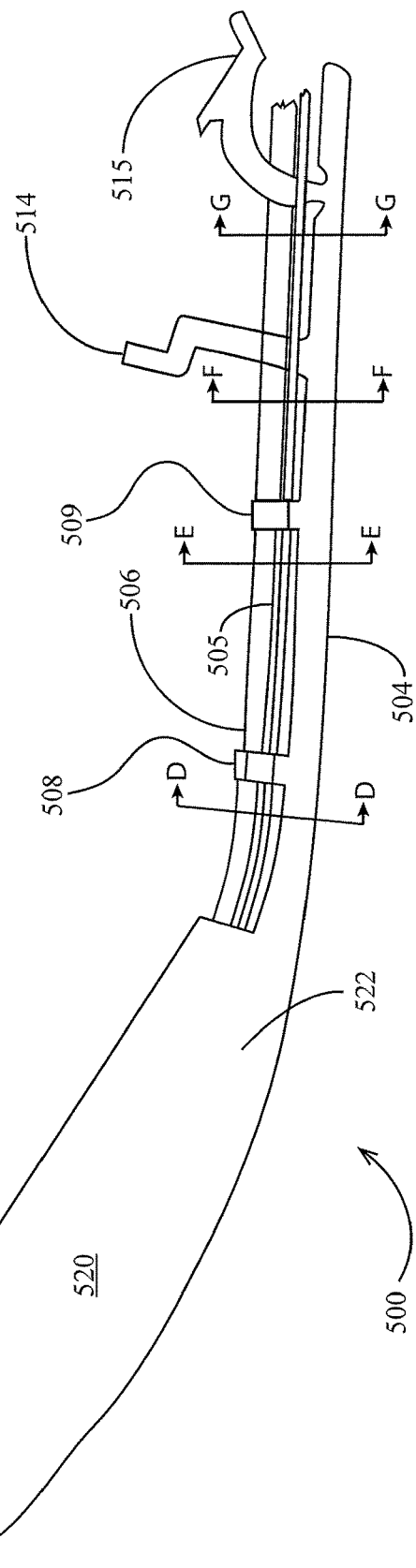

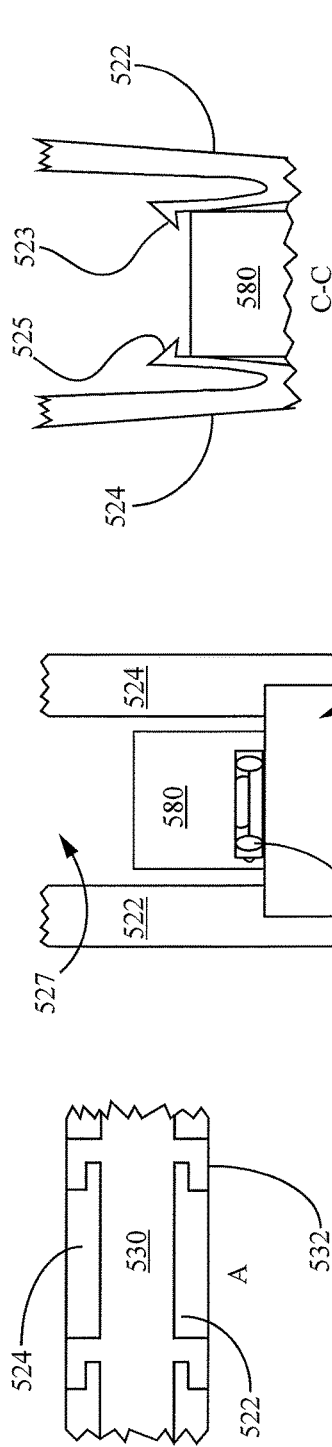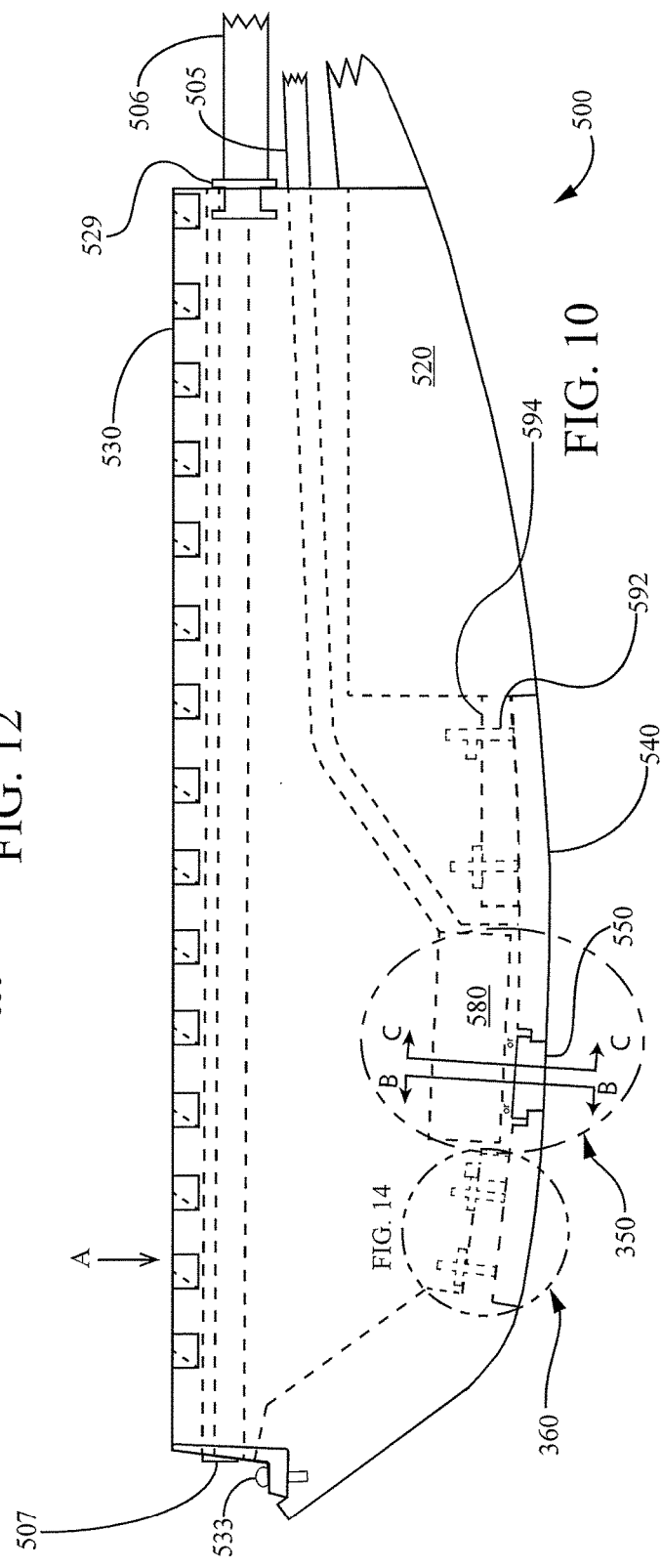

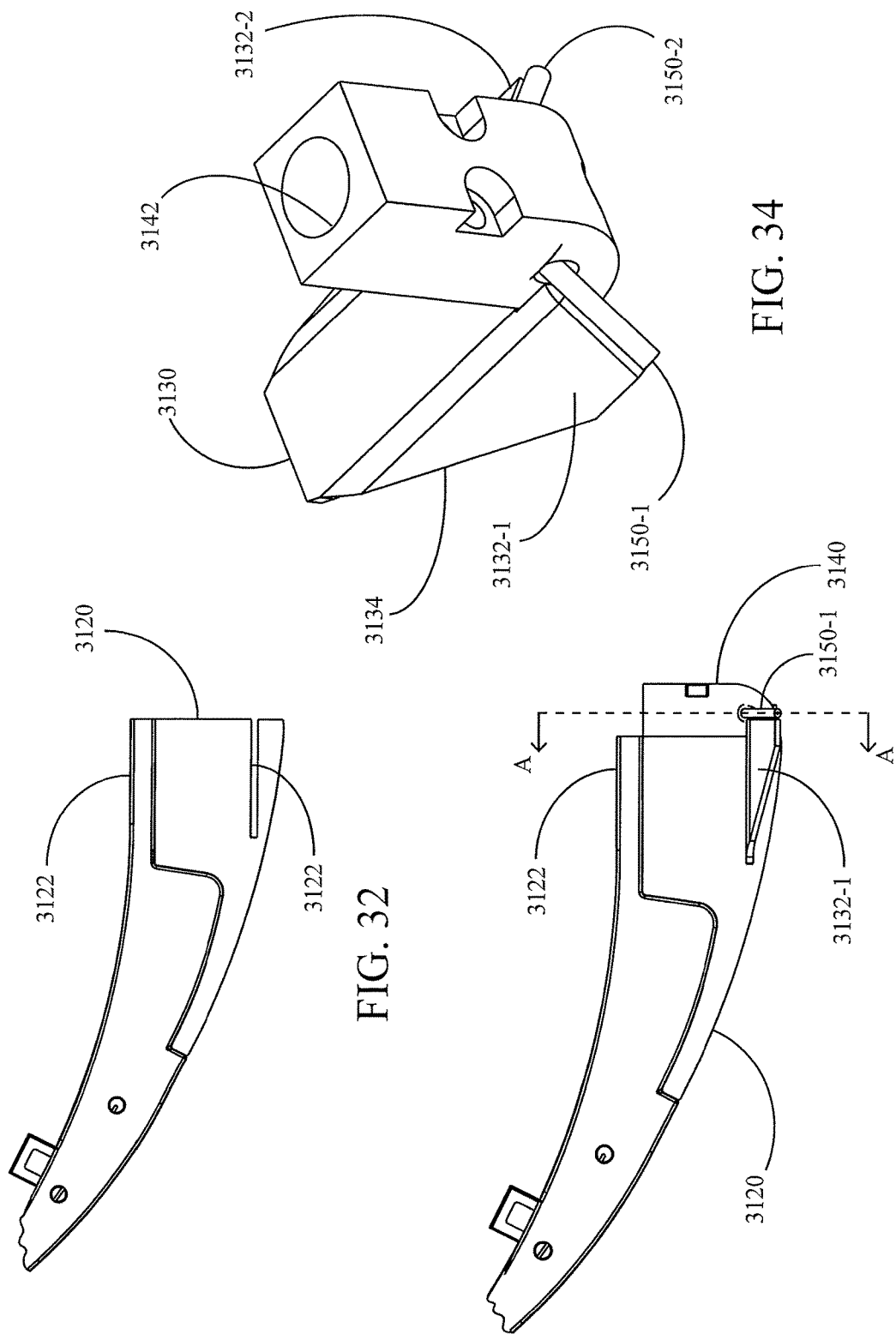

Section X-X

Section X-X

SYSTEMS, METHODS, AND APPARATUS FOR SOIL AND SEED MONITORING

BACKGROUND

In recent years, the availability of advanced location-specific agricultural application and measurement systems (used in so-called "precision farming" practices) has increased grower interest in determining spatial variations in soil properties and in varying input application variables (e.g. planting depth) and fertilizer and other liquid applications in light of such variations and at the appropriate location during the planting operation. However, the available mechanisms for measuring soil properties are not effectively locally made throughout the filed or not made at the same time as an input operation (e.g. planting). Additionally, commercial solutions for applying liquid have included applying liquid on top of seeds in the planting trench, which may cause deleterious effects such as "burning" (i.e., over-fertilizing) seed. Other liquid application solutions have included opening a separate trench in the soil surface (disposed between the planting trenches opened by the row unit) and depositing liquid in the separate vertical trench, which may result in underutilization of applied fertilizer.

Thus there is a need in the art for a method for monitoring soil properties during an agricultural input application and for effectively applying liquid during the planting operation.

DESCRIPTION OF THE DRAWINGS

FIG. 5 is a side elevation view of another embodiment of a seed firmer having a plurality of firmer-mounted sensors.

FIG. 6 is a sectional view along section D-D of FIG. 5.

FIG. 7 is a sectional view along section E-E of FIG. 5.

FIG. 8 is a sectional view along section F-F of FIG. 5.

FIG. 9 is a sectional view along section G-G of FIG. 5.

FIG. 10 is a partially cutaway partial side view of the seed firmer of FIG. 5.

FIG. 11 is a view along direction A of FIG. 10.

FIG. 12 is a view along section B-B of FIG. 10.

FIG. 13 is a view along section C-C of FIG. 10.

FIG. 32 is a side elevation view of the seed firmer of FIG. 31 with a wing body and manifold removed.

FIG. 33 is a side elevation view of the seed firmer of FIG. 31.

FIG. 34 is a perspective view of a wing body and manifold of the seed firmer of FIG. 31

DESCRIPTION

Depth Control and Soil Monitoring Systems

Figure 1:
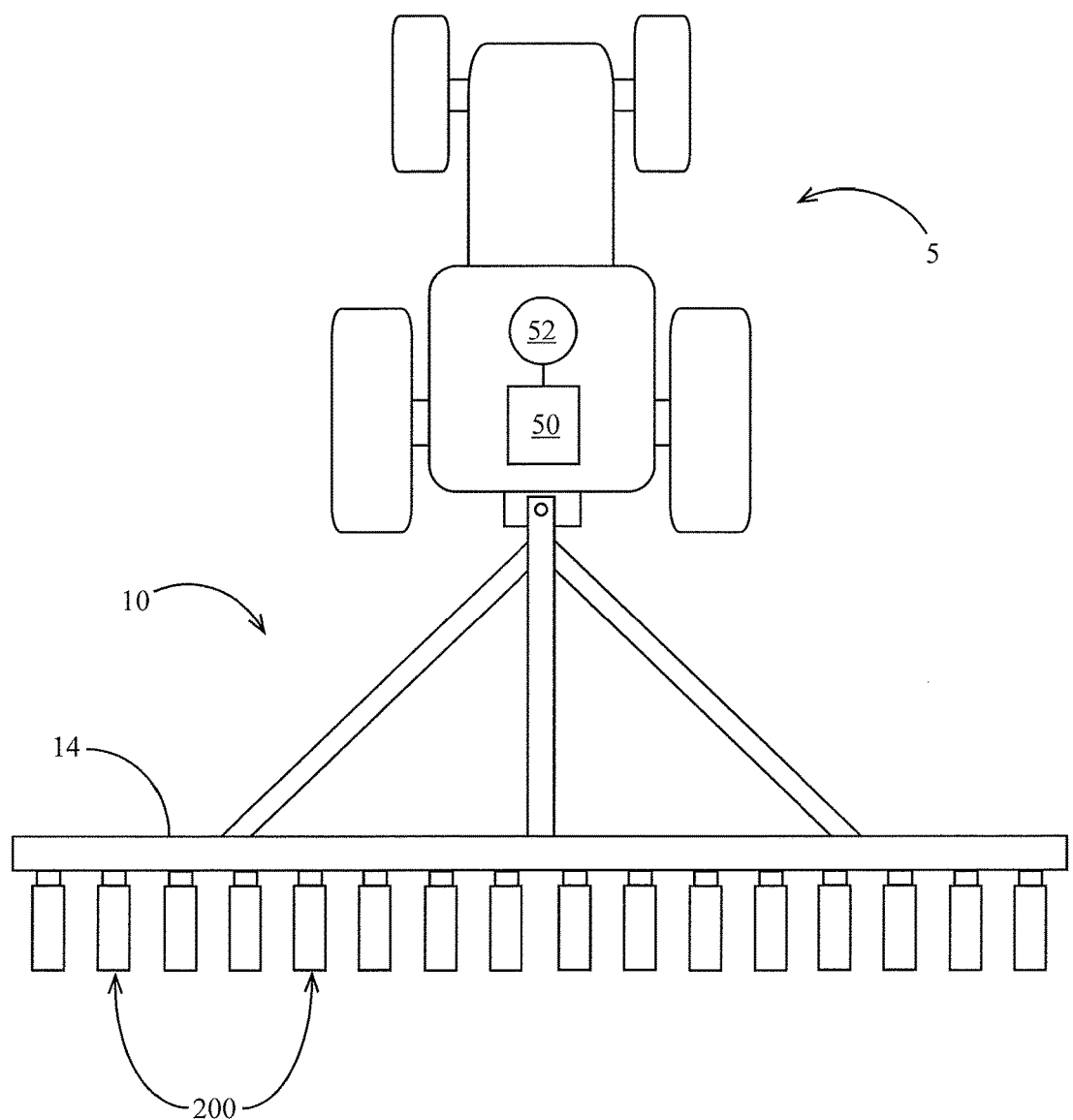
FIG. 1 is a top view of an embodiment of an agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 5. A global positioning system ("GPS") receiver 52 is preferably mounted to the tractor 5.

Figure 2:
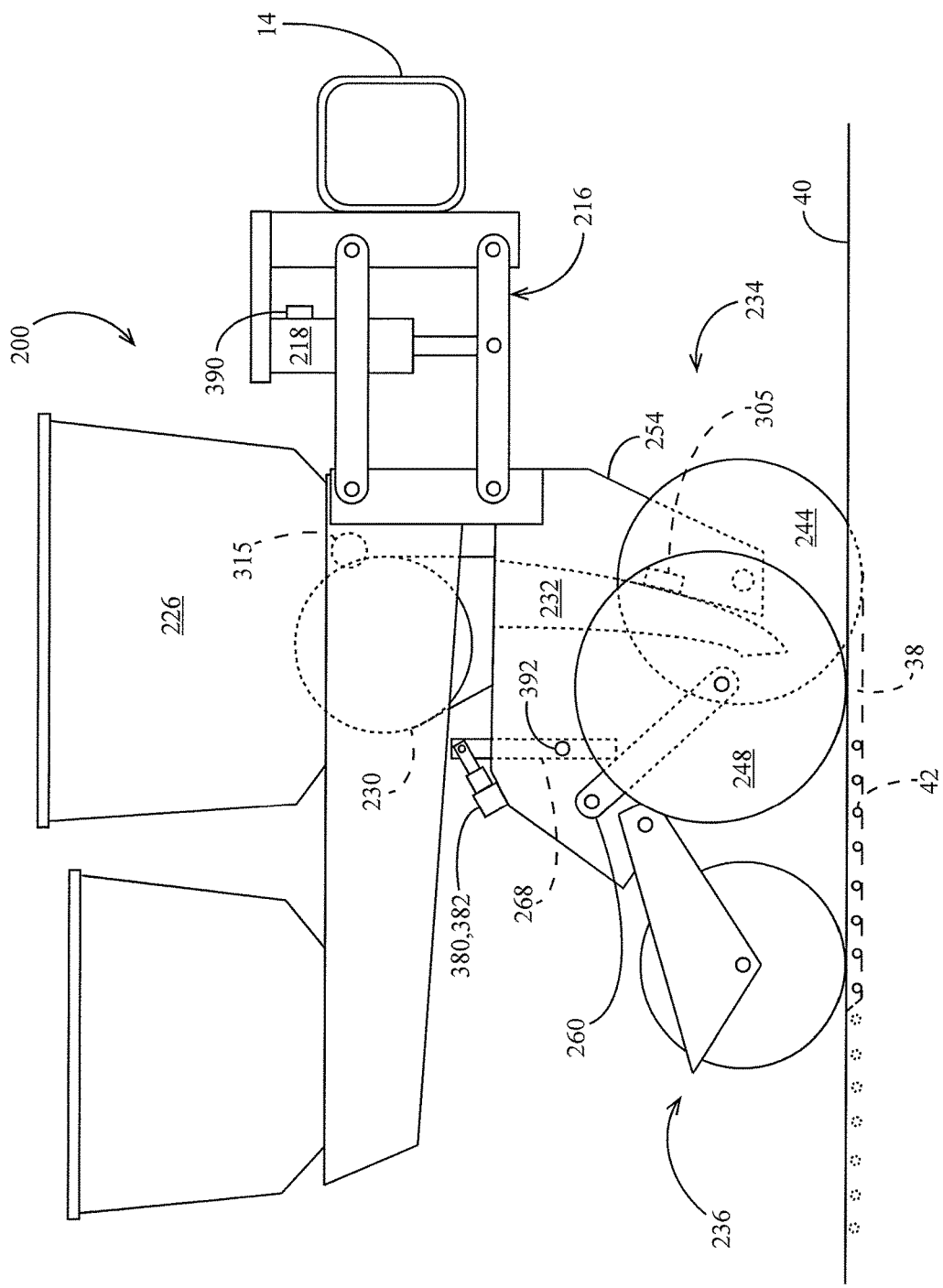
FIG. 2 is a side elevation view of an embodiment of a planter row unit.

Turing to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve 390 is preferably in fluid communication with the actuator 218 for modifying the lift and/or downforce applied by the actuator. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260. The height of the gauge wheels 248 relative to the opener discs 244 sets the depth of the trench 38. A depth adjustment rocker 268 limits the upward travel of the gauge wheel arms 260 and thus the upward travel of the gauge wheels 248. A depth adjustment actuator 380 is preferably configured to modify a position of the depth adjustment rocker 268 and thus the height of the gauge wheels 248. The actuator 380 is preferably a linear actuator mounted to the row unit 200 and pivotally coupled to an upper end of the rocker 268. In some embodiments the depth adjustment actuator 380 comprises a device such as that disclosed in International Patent Application No. PCT/US2012/035585 ("the '585 application"), the disclosure of which is hereby incorporated herein by reference. An encoder 382 is preferably configured to generate a signal related to the linear extension of the actuator 380. It should be appreciated that the linear extension of the actuator 380 is related to the depth of the trench 38 when the gauge wheel arms 260 are in contact with the rocker 268. A downforce sensor 392 is preferably configured to generate a signal related to the amount of force imposed by the gauge wheels 248 on the soil 40; in some embodiments the downforce sensor 392 comprises an instrumented pin about which the rocker 268 is pivotally coupled to the row unit 200, such as those instrumented pins disclosed in Applicant's U.S. patent application Ser. No. 12/522,253, the disclosure of which is hereby incorporated herein by reference.

Figure 30:
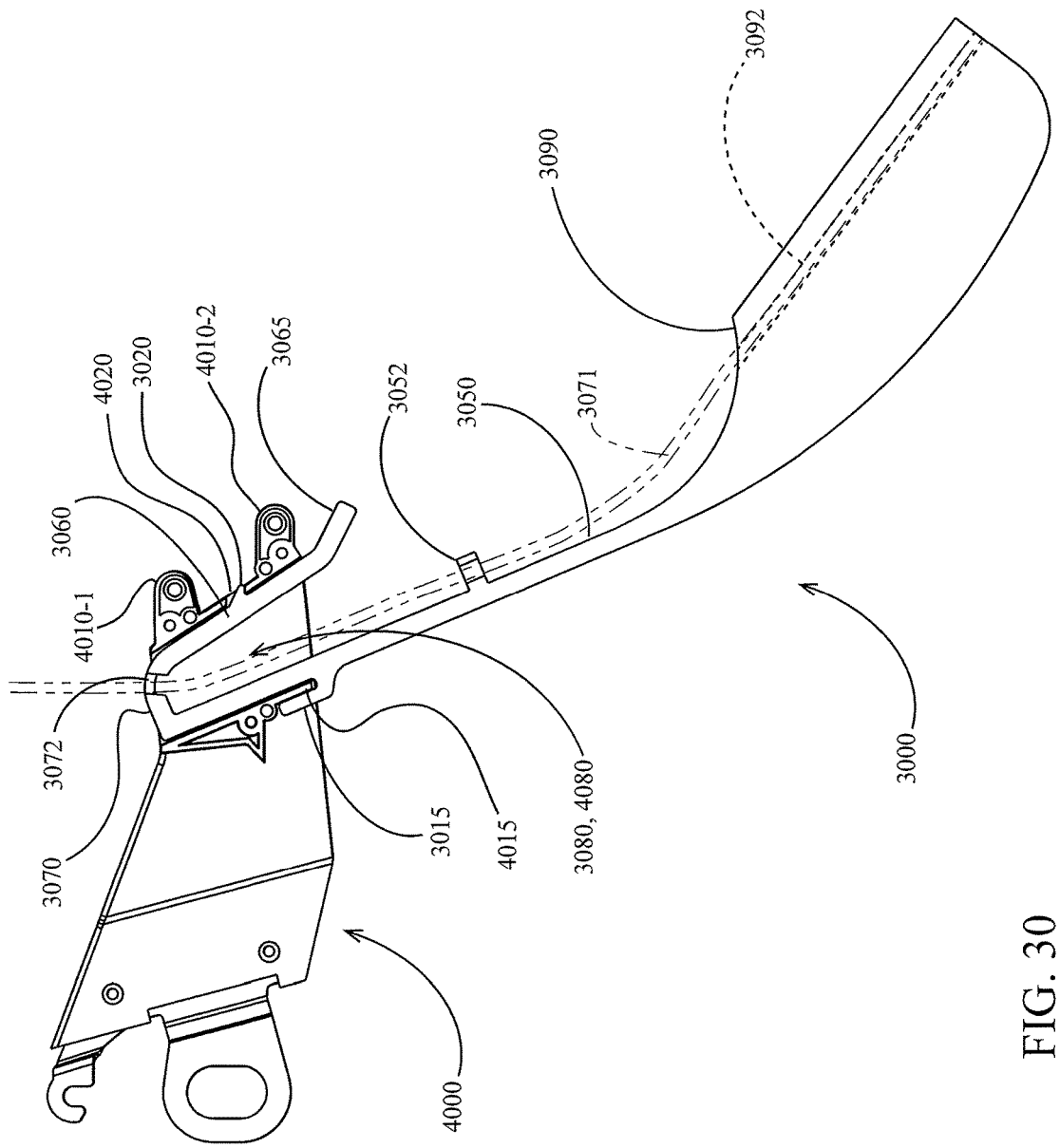
FIG. 30 is a side elevation view of another embodiment of a seed firmer mounted to a mounting bracket.
Figure 31:
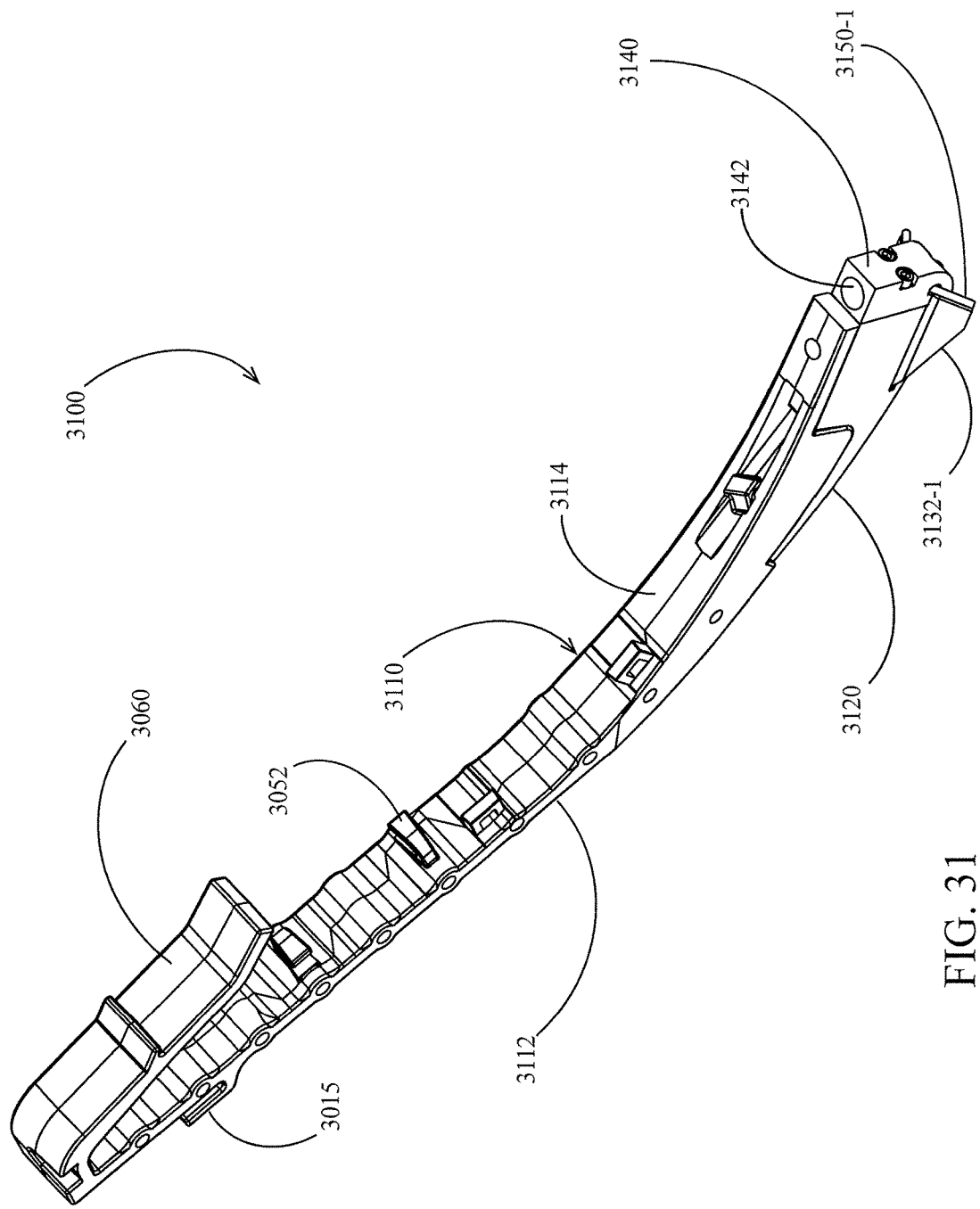
FIG. 31 is a perspective view of another embodiment of a seed firmer.

Continuing to refer to FIG. 2, a seed meter 230 such as that disclosed in Applicant's International Patent Application No. PCT/US2012/030,192, the disclosure of which is hereby incorporated herein by reference, is preferably disposed to deposit seeds 42 from a hopper 226 into the trench 38, e.g., through a seed tube 232 disposed to guide the seeds toward the trench. In some embodiments, instead of a seed tube 232, a seed conveyor is implemented to convey seeds from the seed meter to the trench at a controlled rate of speed as disclosed in U.S. patent application Ser. No. 14/347,902 and/or U.S. Pat. No. 8,789,482, both of which are incorporated by reference herein. In such embodiments, a bracket such as that shown in FIG. 30 is preferably configured to mount the seed firmer to the shank 254 via sidewalls extending laterally around the seed conveyor, such that the seed firmer is disposed behind the seed conveyor to firm seeds into the soil after they are deposited by the seed conveyor. In some embodiments, the meter is powered by an electric drive 315 configured to drive a seed disc within the seed meter. In other embodiments, the drive 315 may comprise a hydraulic drive configured to drive the seed disc. A seed sensor 305 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

Figure 3:
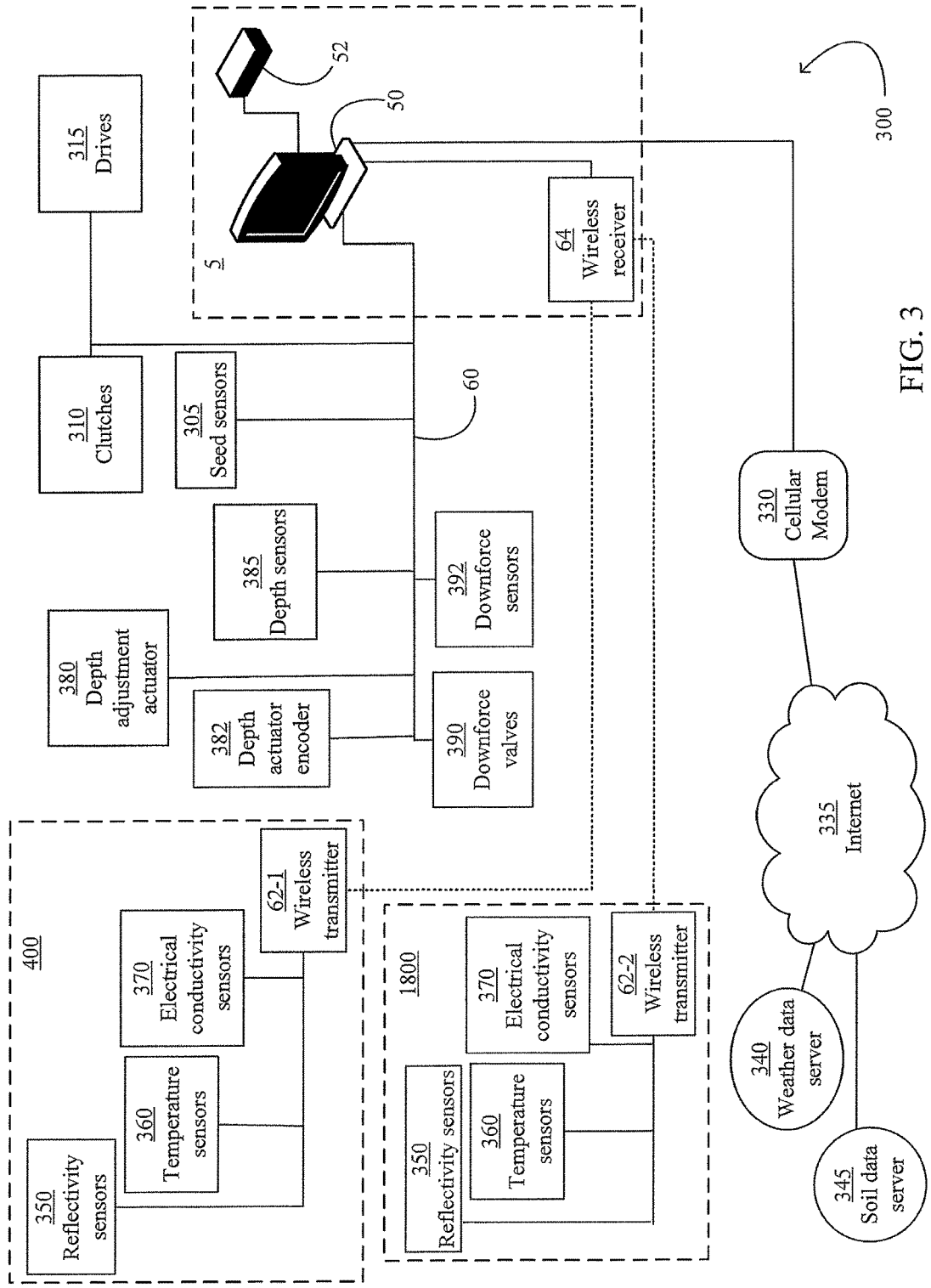
FIG. 3 schematically illustrates an embodiment of a soil monitoring system.

Turning to FIG. 3, a depth control and soil monitoring system 300 is schematically illustrated. The monitor 50 is preferably in data communication with components associated with each row unit 200 including the drives 315, the seed sensors 305, the GPS receiver 52, the downforce sensors 392, the downforce valves 390, the depth adjustment actuator 380, and the depth actuator encoders 382. In some embodiments, particularly those in which each seed meter 230 is not driven by an individual drive 315, the monitor 50 is also preferably in data communication with clutches 310 configured to selectively operably couple the seed meter 230 to the drive 315.

Continuing to refer to FIG. 3, the monitor 50 is preferably in data communication with a cellular modem 330 or other component configured to place the monitor 50 in data communication with the Internet, indicated by reference numeral 335. The internet connection may comprise a wireless connection or a cellular connection. Via the Internet connection, the monitor 50 preferably receives data from a weather data server 340 and a soil data server 345. Via the Internet connection, the monitor 50 preferably transmits measurement data (e.g., measurements described herein) to a recommendation server (which may be the same server as the weather data server 340 and/or the soil data server 345) for storage and receives agronomic recommendations (e.g., planting recommendations such as planting depth, whether to plant, which fields to plant, which seed to plant, or which crop to plant) from a recommendation system stored on the server. In some embodiments, the recommendation system updates the planting recommendations based on the measurement data provided by the monitor 50.

Continuing to refer to FIG. 3, the monitor 50 is also preferably in data communication with one or more temperature sensors 360 mounted to the planter 10 and configured to generate a signal related to the temperature of soil being worked by the planter row units 200. The monitor 50 is preferably in data communication with one or more reflectivity sensors 350 mounted to the planter 10 and configured to generate a signal related to the reflectivity of soil being worked by the planter row units 200.

Referring to FIG. 3, the monitor 50 is preferably in data communication with one or more electrical conductivity sensors 370 mounted to the planter 10 and configured to generate a signal related to the temperature of soil being worked by the planter row units 200.

In some embodiments, a first set of reflectivity sensors 350, temperature sensors 360, and electrical conductivity sensors 370 are mounted to a seed firmer 400 and disposed to measure reflectivity, temperature and electrical conductivity, respectively, of soil in the trench 38. In some embodiments, a second set of reflectivity sensors 350, temperature sensors 360, and electrical conductivity sensors 370 are mounted to a reference sensor assembly 1800 and disposed to measure reflectivity, temperature and electrical conductivity, respectively, of the soil, preferably at a depth different than the sensors on the seed firmer 400.

In some embodiments, a subset of the sensors are in data communication with the monitor 50 via a bus 60 (e.g., a CAN bus). In some embodiments, the sensors mounted to the seed firmer 400 and the reference sensor assembly 1800 are likewise in data communication with the monitor 50 via the bus 60. However, in the embodiment illustrated in FIG. 3, the sensors mounted to the seed firmer the sensors mounted to the seed firmer 400 and the reference sensor assembly 1800 are in data communication with the monitor 50 via a first wireless transmitter 62-1 and a second wireless transmitter 62-2, respectively. The wireless transmitters 62 at each row unit are preferably in data communication with a single wireless receiver 64 which is in turn in data communication with the monitor 50. The wireless receiver may be mounted to the toolbar 14 or in the cab of the tractor 5.

Soil Monitoring, Seed Monitoring and Seed Firming Apparatus

Figure 4A:
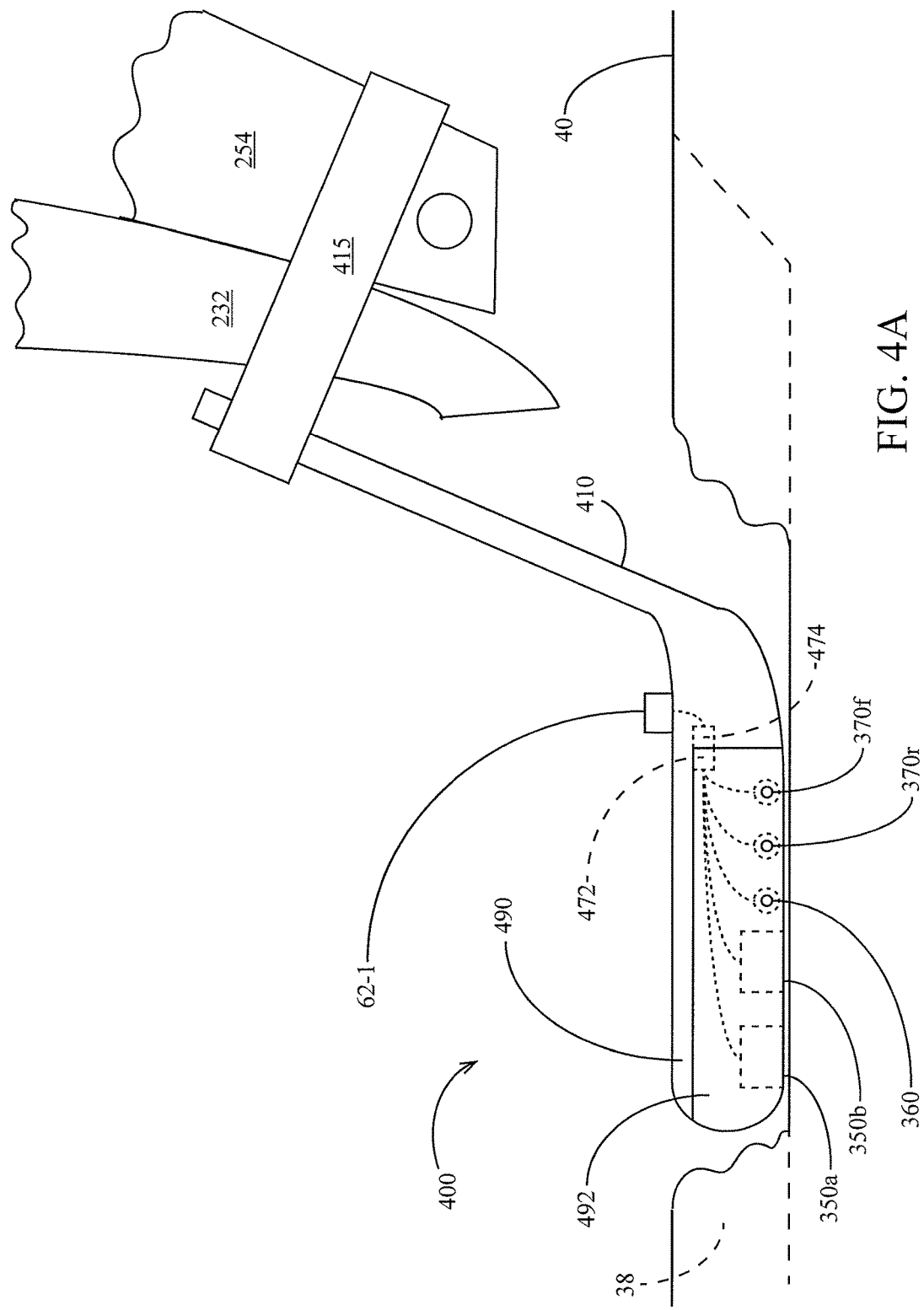
FIG. 4A is a side elevation view of an embodiment of a seed firmer having a plurality of firmer-mounted sensors showing the firmer mounted to a row unit and disposed in a seed trench.
Figure 4B:
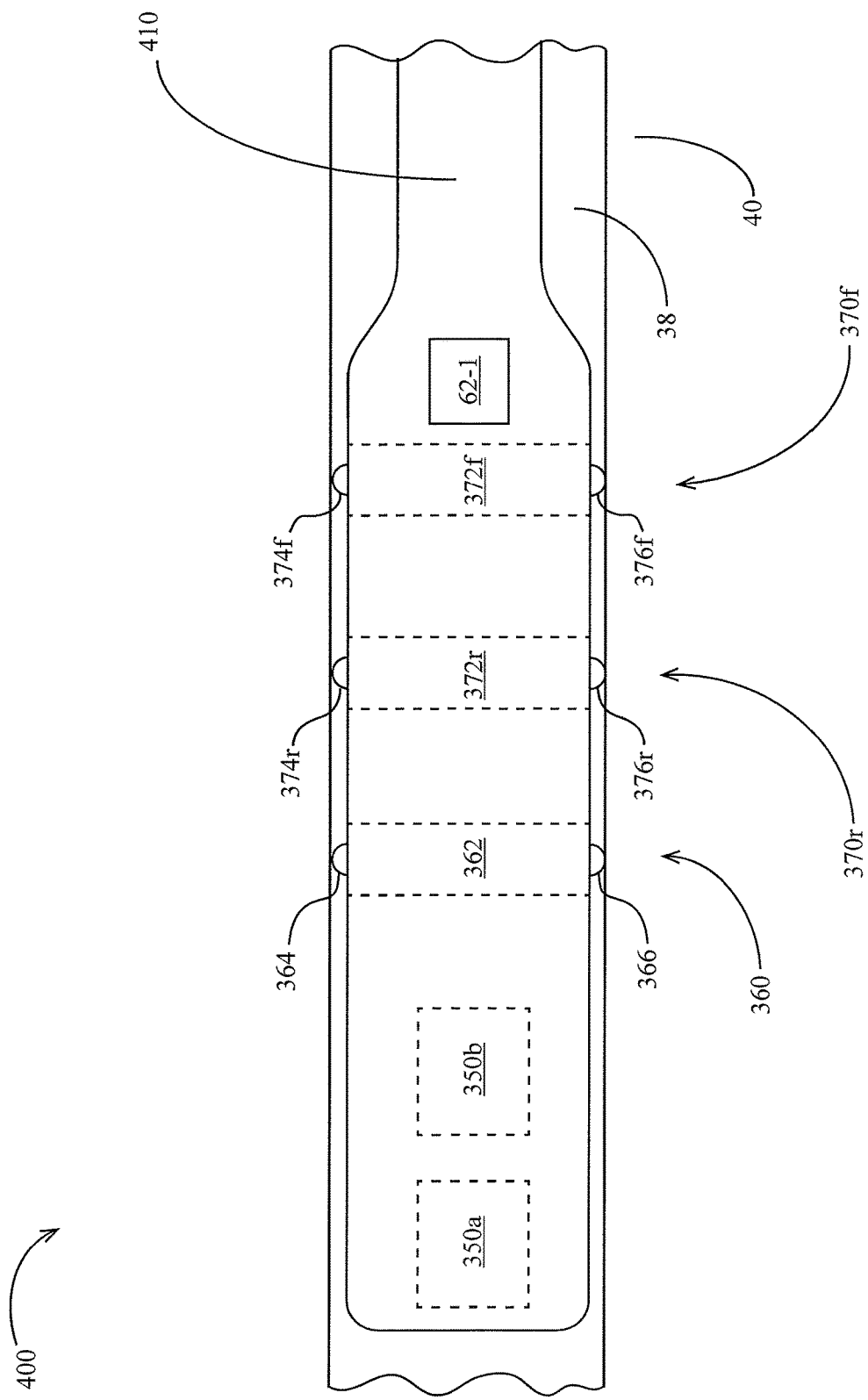
FIG. 4B is a top plan view of the seed firmer of FIG. 4A.
Figure 4C:
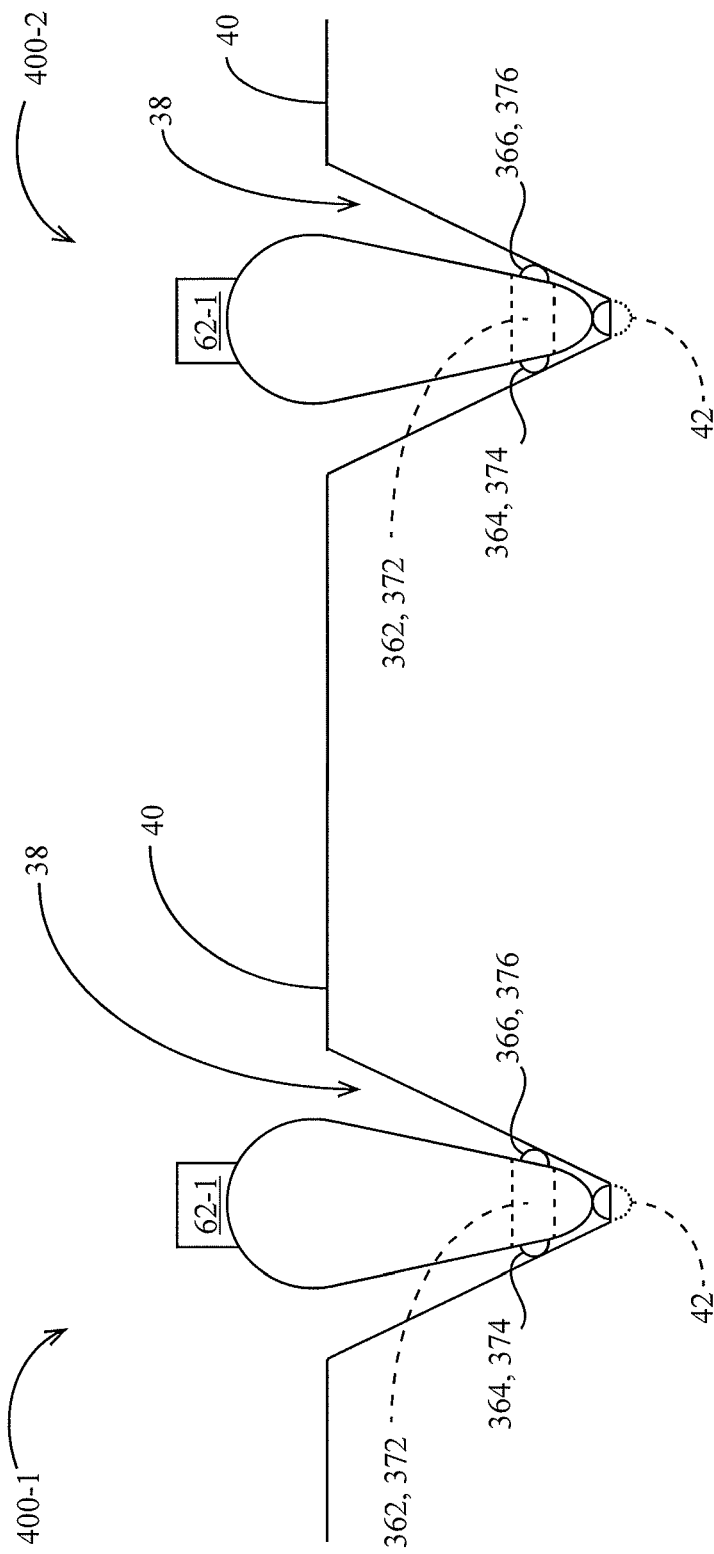
FIG. 4C is a rear elevation view of the seed firmer of FIG. 4A.

Turning to FIGS. 4A-4C, an embodiment of a seed firmer 400 is illustrated having a plurality of sensors for sensing soil characteristics. The seed firmer 400 preferably includes a flexible portion 410 mounted to the shank 254 and/or the seed tube 232 by a bracket 415. In some embodiments, the bracket 415 is similar to one of the bracket embodiments disclosed in U.S. Pat. No. 6,918,342, incorporated by reference herein. The seed firmer preferably includes a firmer body 490 disposed and configured to be received at least partially within v-shaped trench 38 and firm seeds 42 into the bottom of the trench. When the seed firmer 400 is lowered into the trench 38, the flexible portion 410 preferably urges the firmer body 490 into resilient engagement with the trench. In some embodiments the flexible portion 410 preferably includes an external or internal reinforcement as disclosed in International Patent Application No. PCT/US2013/066652, incorporated by reference herein. In some embodiments, the firmer body 490 includes a removable portion 492 that preferably slides into locking engagement with the remainder of the firmer body. The firmer body 490 (preferably including the portion of the firmer body engaging the soil, which in some embodiments comprises the removable portion 492) is preferably made of a material (or has an outer surface or coating) having hydrophobic and/or anti-stick properties, e.g. having a Teflon graphite coating and/or comprising a polymer having a hydrophobic material (e.g., silicone oil or polyether-ether-ketone) impregnated therein.

Referring to FIG. 30, a modified seed firmer embodiment 3000 is illustrated mounted to a firmer bracket 4000. The firmer bracket 4000 is preferably configured to be mounted to the shank 254 of the row unit and support the seed firmer 3000 in a position rearward of the seed tube 232 or seed conveyor of the row unit. The seed firmer 3000 preferably includes a firmer body 3090 that is resiliently biased into the bottom of the trench 38 by a flexible portion 3050. The seed firmer 3000 preferably includes an upper portion 3070 received in an opening 4080 in the firmer bracket 4000. The firmer 3000 preferably includes a hook 3015 which engages a wall 4015 of the bracket. It should be appreciated that the engagement of the wall and hook prevent the firmer from moving upward, forward or rearward relative to the bracket, but permits the firmer to slide downward relative to the bracket. The firmer 3000 preferably includes a flexible mounting portion 3060 having an angled portion 3065 at a lower end thereof and a rearward-facing retention tab 3020. During installation, the user preferably grasps the flexible portion 3050 and inserts the upper portion 3070 in the opening 4080. The firmer is preferably sized such that the flexible mounting portion 3060 deflects toward the flexible portion 3050 as the firmer is inserted into the bracket, until the retention tab 3020 reaches an opening 4020 in a rearward portion of the bracket, allowing the flexible mounting portion 3060 to return to a relaxed (or more relaxed) state in which the retention tab 3020 engages the opening 4020 in order to prevent the firmer 3000 from sliding downward relative to the bracket 4000. In a preferred embodiment, the wall 4015 and the opening 4020 are preferably disposed such that the retention tab 3020 engages the opening 4020 when the firmer reaches the position in which the hook 3015 engages the wall 4015, such that in the installed configuration, the firmer is prevented from moving upward or downward relative to the bracket. During removal of the firmer 3000, the user preferably grasps the flexible portion 3050 and presses the angled portion 3065 (e.g., with the user's thumb) such that the flexible mounting portion 3060 deflects toward the flexible 3050, withdrawing the retention tab 3020 from the opening 4020 and allowing the user to lower the firmer and remove the firmer from the bracket. It should be appreciated that if dust or residue enters the opening 4080 from above the upper portion 3070 of the firmer, such dust or residue falls downward through a gap 3080 between the flexible portions 3050 and the mounting portion 3060 such that dust or residue is not trapped in the bracket or firmer during operation.

Continuing to refer to FIG. 30, a liquid application tube may be retained on the firmer 3000 such that a terminal end of the liquid application tube (which may include a flow splitter or other feature) is retained at a rearward end of the firmer, thus being disposed to dispense fluid behind the firmer. One such embodiment is illustrated in FIG. 30, in which the upper portion 3070 of the seed firmer 3000 includes an opening 3072 sized to receive the liquid application tube 3171, the flexible portion 3050 includes a hock 3052 sized to releasably retain the liquid application tube, and the firmer body 3090 includes an interior channel 3092 sized to receive the liquid application tube 3171.

Continuing to refer to FIG. 30, the firmer 3000 may include any of the firmer-mounted sensors described herein. In some such embodiments, the bracket 4000 includes mounting tabs 4010 for supporting a housing (not shown) including electronics or wire pass-throughs for transmitting and processing data generated by the firmer-mounted sensors.

Returning to FIGS. 4A through 4C, the seed firmer 400 preferably includes a plurality of reflectivity sensors 350a, 350b. Each reflectivity sensor 350 is preferably disposed and configured to measure reflectivity of soil. In a preferred embodiment, the reflectivity sensor 350 is disposed to measure soil in the trench 38, and preferably at the bottom of the trench. The reflectivity sensor 350 preferably includes a lens disposed in the bottom of the firmer body 490 and disposed to engage the soil at the bottom of the trench 38. In some embodiments the reflectivity sensor 350 comprises one of the embodiments disclosed in U.S. Pat. No. 8,204,689 and/or U.S. Provisional Patent Application 61/824,975, both of which are incorporated by reference herein. In various embodiments, the reflectivity sensor 350 is configured to measure reflectivity in the visible range (e.g., 400 and/or 600 nanometers), in the near-infrared range (e.g., 940 nanometers) and/or elsewhere the infrared range.

The seed firmer 400 preferably includes a temperature sensor 360. The temperature sensor 360 is preferably disposed and configured to measure temperature of soil; in a preferred embodiment, the temperature sensor is disposed to measure soil in the trench 38, preferably at or adjacent the bottom of the trench 38. The temperature sensor 360 preferably includes soil-engaging ears 364, 366 (FIGS. 4B, 4C) disposed to slidingly engage each side of the trench 38 as the planter traverses the field. The ears 364, 366 preferably engage the trench 38 at or adjacent to the bottom of the trench. The ears 364, 366 are preferably made of a thermally conductive material such as copper. The ears 364 are preferably fixed to and in thermal communication with a central portion 362 housed within the firmer body 490. The central portion 362 preferably comprises a thermally conductive material such as copper. In some embodiments, the central portion 362 comprises a hollow copper rod. The central portion 362 is preferably in thermal communication with a thermocouple fixed to the central portion. In other embodiments, the temperature sensor 360 may comprise a non-contact temperature sensor such as an infrared thermometer. In some embodiments, other measurements made by the system 300 (e.g., reflectivity measurements, electrical conductivity measurements, and/or measurements derived from those measurements) are temperature-compensated using the temperature measurement made by the temperature sensor 360. The adjustment of the temperature-compensated measurement based on temperature is preferably carried out by consulting an empirical look-up table relating the temperature-compensated measurement to soil temperature. For example, the reflectivity measurement at a near-infrared wavelength may be increased (or in some examples, reduced) by 1% for every 1 degree Celsius in soil temperature above 10 degrees Celsius.

The seed firmer preferably includes a plurality of electrical conductivity sensors 370 as shown in FIGS. 4A-4C, which may be arranged as a forward and rearward sensors designated by the suffix "f" and "r". The suffixes "f" and "r" are used when referring to other forward and rearward sensors hereinafter described. Each electrical conductivity sensor 370 is preferably disposed and configured to measure electrical conductivity of the soil. In a preferred embodiment, the electrical conductivity sensors 370 are disposed to measure electrical conductivity of soil in the trench 38, preferably at or adjacent the bottom of the trench 38. The electrical conductivity sensors 370 preferably include soil-engaging ears 374, 376 disposed to slidingly engage each side of the trench 38 as the planter traverses the field. The ears 374, 376 preferably engage the trench 38 at or adjacent to the bottom of the trench. The ears 374, 376 are preferably made of a electrically conductive material such as copper. The ears 374 are preferably fixed to and in electrical communication with a central portion 372 housed within the firmer body 490. The central portion 372 preferably comprises an electrically conductive material such as copper. In some embodiments the central portion 372 comprises a copper rod. The central portion 372 is preferably in electrical communication with an electrical lead fixed to the central portion.

In some embodiments, the seed firmer 400 in cooperation with the system 300 measures electrical conductivity of soil adjacent the trench 38 by measuring an electrical potential between the forward electrical conductivity sensor 370f and the rearward electrical conductivity sensor 370f. In other embodiments, the electrical conductivity sensors 370f, 370r may be disposed in longitudinally spaced relation on the bottom of the seed firmer in order to measure electrical conductivity at the bottom of the seed trench.

In other embodiments, the electrical conductivity sensors 370 may comprise one or more ground-working or ground-contacting devices (e.g., discs or shanks) that contact the soil and which are preferably electrically isolated from one another or from another voltage reference. The voltage potential between the sensors 370 or other voltage reference is preferably measured by the system 300. The voltage potential or another electrical conductivity value derived from the voltage potential is preferably reported to the operator. The electrical conductivity value may also be associated with the GPS-reported position and used to generate a map of the spatial variation in electrical conductivity throughout the field. In some such embodiments, the electrical conductivity sensors may comprise one or more opening discs of a planter row unit, row cleaner wheels of a planter row unit, ground-contacting shanks of a planter, ground-contacting shoes depending from a planter shank, shanks of a tillage tool, or discs of a tillage tool. In some embodiments a first electrical conductivity sensor may comprise a component (e.g., disc or shank) of a first agricultural row unit while a second electrical conductivity sensor comprises a component (e.g., disc or shank) of a second agricultural row unit, such that electrical conductivity of soil extending transversely between the first and second row units is measured. It should be appreciated that at least one of the electrical conductivity sensors described herein are preferably electrically isolated from the other sensor or voltage reference. In one example, the electrical conductivity sensor is mounted to an implement (e.g., to the planter row unit or tillage tool) by being first mounted to an electrically insulating component (e.g., a component made from an electrically insulating material such as polyethylene, polyvinyl chloride, or a rubber-like polymer) which is in turn mounted to the implement.

Referring to FIG. 4C, in some embodiments, the seed firmer 400 in cooperation with the system 300 measures electrical conductivity of soil between two row units 200 having a first seed firmer 400-1 and a second seed firmer 400-2, respectively, by measuring an electrical potential between an electrical conductivity sensor on the first seed firmer 400-1 and an electrical conductivity sensor on the second seed firmer 400-2. In some such embodiments, the electrical conductivity sensor 370 may comprise a larger ground-engaging electrode (e.g., a seed firmer housing) comprised of metal or other conductive material. It should be appreciated that any of the electrical conductivity sensors described herein may measure conductivity by any of the following combinations: (1) between a first probe on a ground-engaging row unit component (e.g., on a seed firmer, a row cleaner wheel, an opening disc, a shoe, a shank, a frog, a coulter, or a closing wheel) and a second probe on the same ground-engaging row unit component of the same row unit; (2) between a first probe on a first ground-engaging row unit component (e.g., on a seed firmer, a row cleaner wheel, an opening disc, a shoe, a shank, a frog, a coulter, or a closing wheel) and a second probe on a second ground-engaging row unit component (e.g., on a seed firmer, a row cleaner wheel, an opening disc, a shoe, a shank, a frog, a coulter, or a closing wheel) of the same row unit; or (3) between a first probe on a first ground-engaging row unit component (e.g., on a seed firmer, a row cleaner wheel, an opening disc, a shoe, a shank, a frog, a coulter, or a closing wheel) on a first row unit and a second probe on a second ground-engaging row unit component (e.g., on a seed firmer, a row cleaner wheel, an opening disc, a shoe, a shank, a frog, a coulter, or a closing wheel) on a second row unit. Either or both of the row units described in combinations 1 through 3 above may comprise a planting row unit or another row unit (e.g., a tillage row unit or a dedicated measurement row unit) which may be mounted forward or rearward of the toolbar.

The reflectivity sensors 350, the temperature sensors 360, and the electrical conductivity sensors 370 (collectively, the "firmer-mounted sensors") are preferably in data communication with the monitor 50. In some embodiments, the firmer-mounted sensors are in data communication with the monitor 50 via a transceiver (e.g., a CAN transceiver) and the bus 60. In other embodiments, the firmer-mounted sensors are in data communication with the monitor 50 via wireless transmitter 62-1 (preferably mounted to the seed firmer) and wireless receiver 64. In some embodiments, the firmer-mounted sensors are in electrical communication with the wireless transmitter 62-1 (or the transceiver) via a multi-pin connector comprising a male coupler 472 and a female coupler 474 as shown in FIG. 4A. In firmer body embodiments having a removable portion 492, the male coupler 472 is preferably mounted to the removable portion and the female coupler 474 is preferably mounted to the remainder of the firmer body 190. The couplers 472, 474 are preferably disposed such that the couplers engage electrically as the removable portion is slidingly mounted to the firmer body.

Figure 19A:
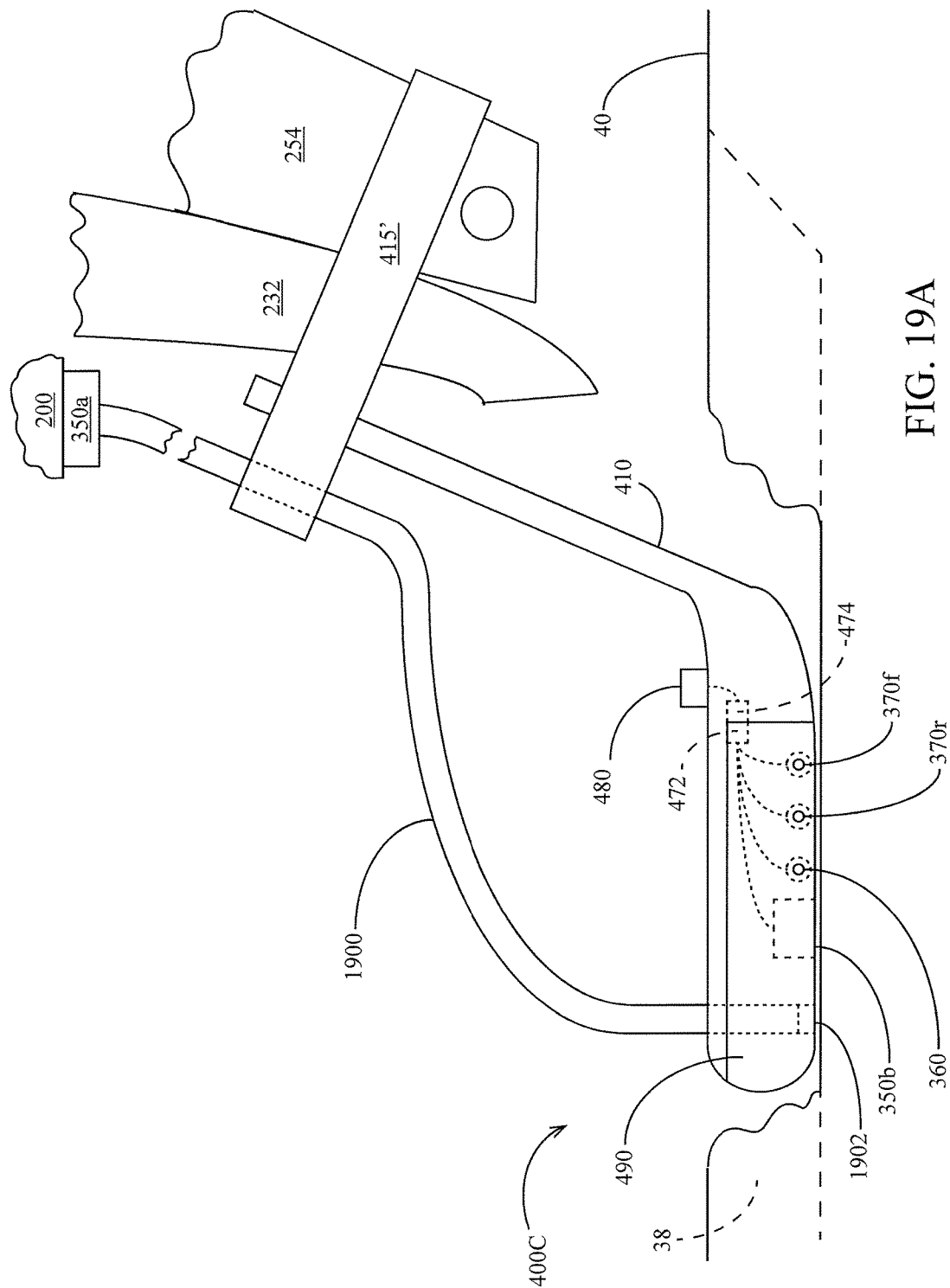
FIG. 19A is a side elevation view of an embodiment of an instrumented seed firmer incorporating fiber-optic cable transmitting light to a reflectivity sensor.
Figure 19B:
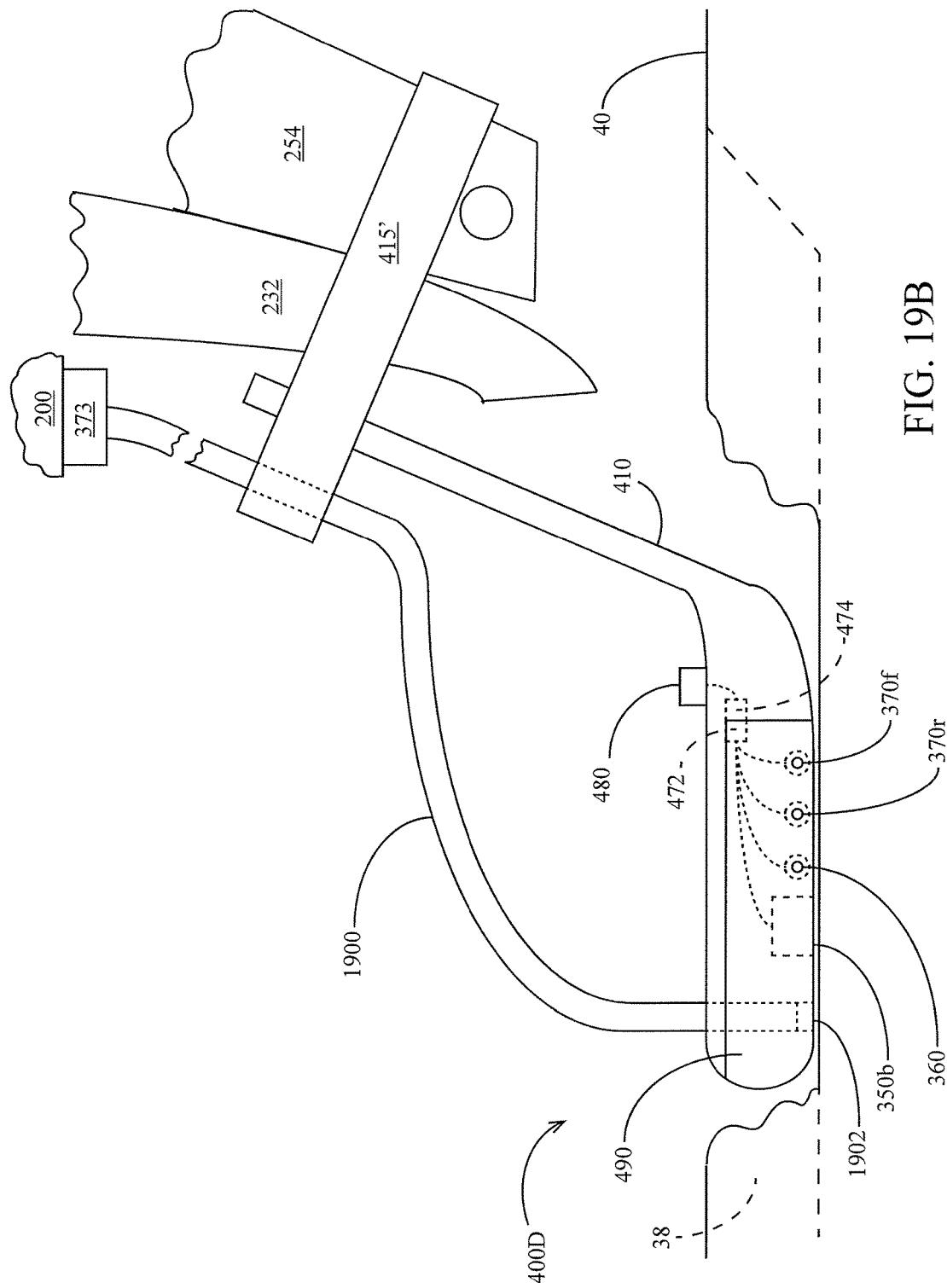
FIG. 19B is a side elevation view of an embodiment of an instrumented seed firmer incorporating fiber-optic cable transmitting light to a spectrometer.

Turning to FIG. 19A, another embodiment of the seed firmer 400C is illustrated incorporating a fiber-optic cable 1900. The fiber-optic cable 1900 preferably terminates at a lens 1902 in the bottom of the firmer 400C. The fiber-optic cable 1900 preferably extends to a reflectivity sensor 350a, which is preferably mounted separately from the seed firmer, e.g., elsewhere on the row unit 200. In operation, light reflected from the soil (preferably the bottom of trench 28) travels to the reflectivity sensor 350a via the fiber-optic cable 1900 such that the reflectivity sensor 350a is enabled to measure reflectivity of the soil at a location remote from the seed firmer 400C. In other embodiments, such as the seed firmer embodiment 400D illustrated in FIG. 19B, the fiber-optic cable extends to a spectrometer 373 configured to analyze light transmitted from the soil. The spectrometer 373 is preferably configured to analyze reflectivity at a spectrum of wavelengths. The spectrometer 373 is preferably in data communication with the monitor 50. The spectrometer 373 preferably comprises a fiber-optic spectrometer such as model no. USB4000 available from Ocean Optics, Inc. in Dunedin, Fla. In the embodiments 400C and 400D, a modified firmer bracket 415A is preferably configured to secure the fiber-optic cable 1900.

Figure 25:
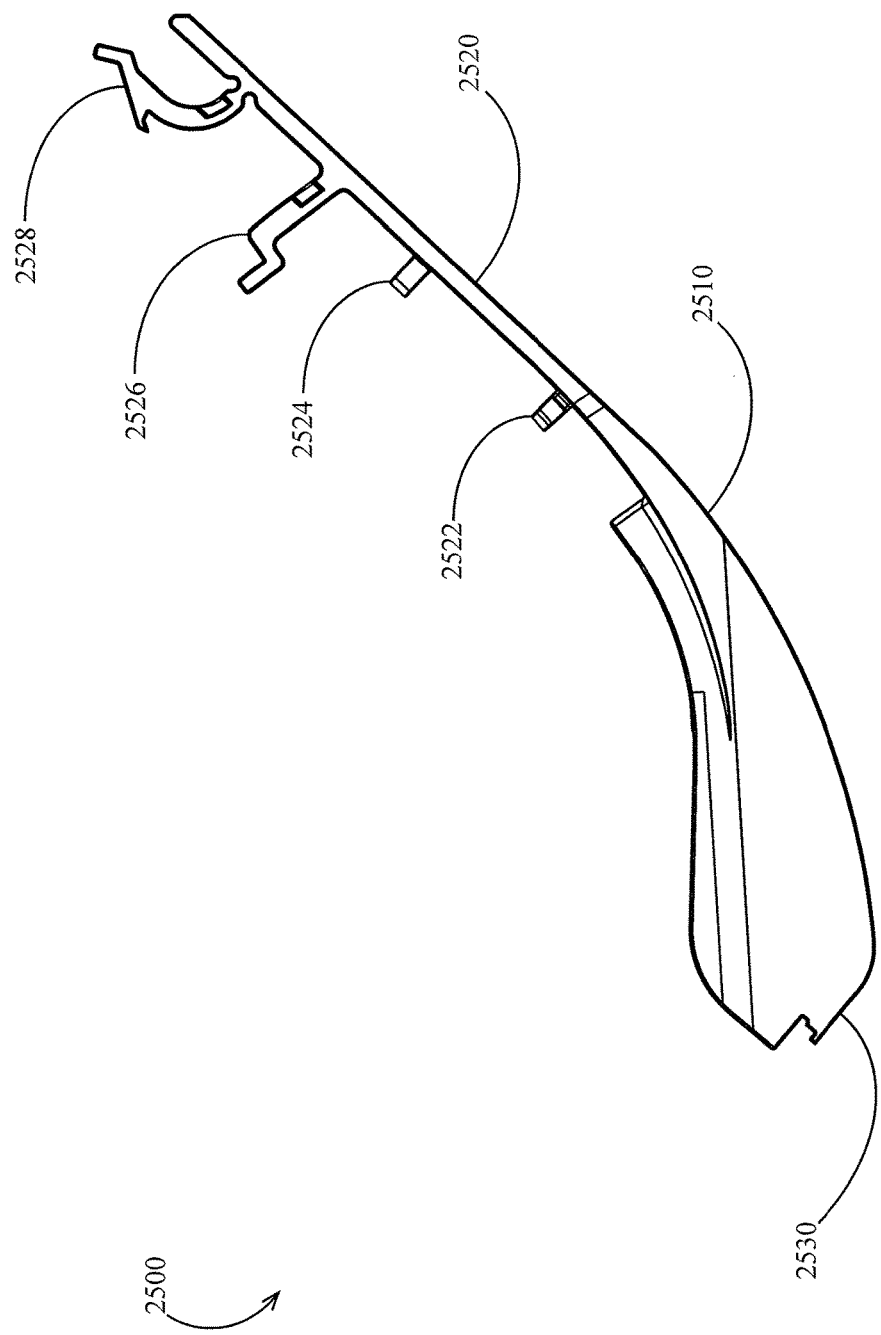
FIG. 25 is a side elevation view of another embodiment of a seed firmer.
Figure 26:
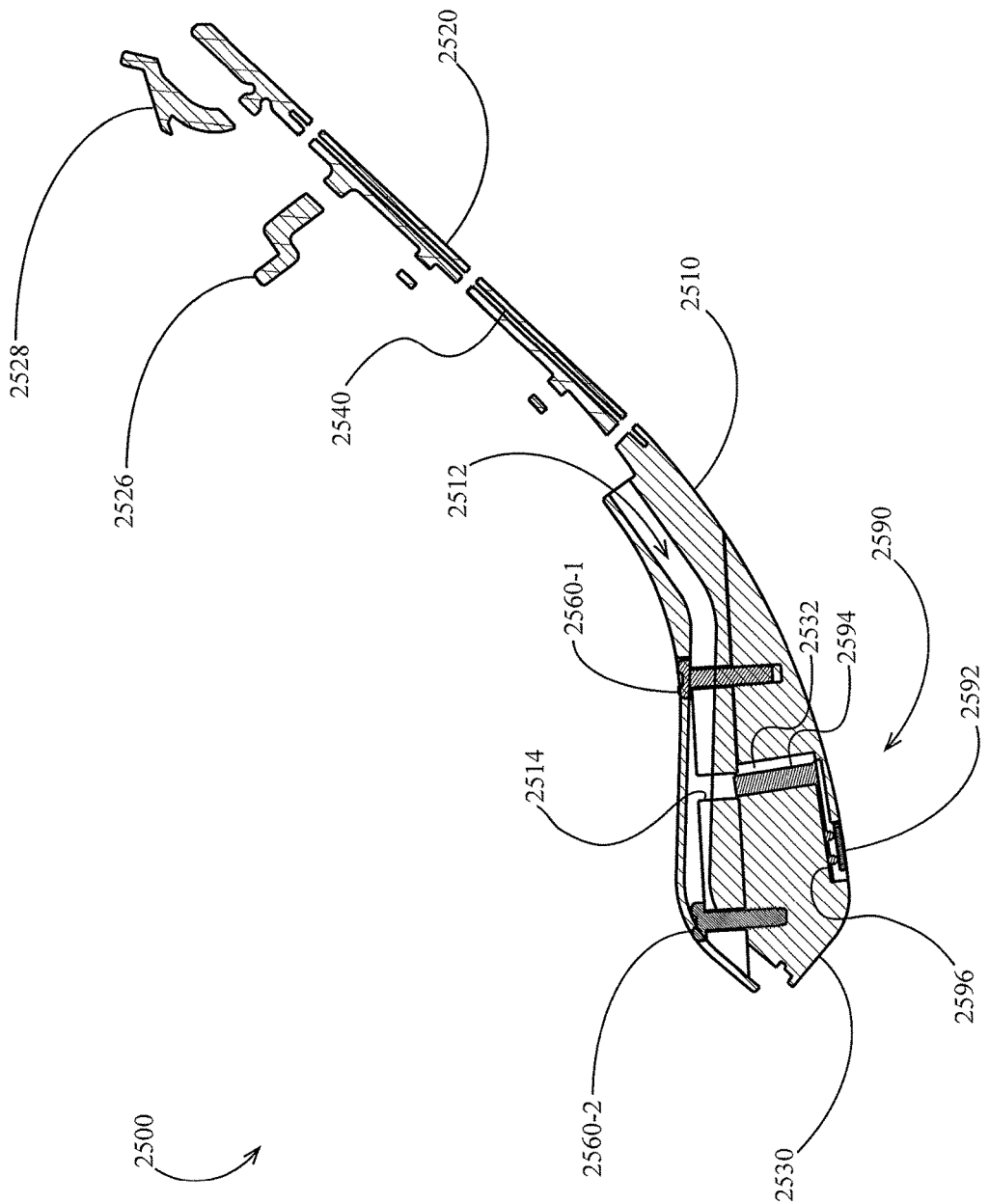
FIG. 26 is a side cross-sectional view of the seed firmer of FIG. 25.

Turning to FIGS. 25-26, an embodiment of another firmer 2500 is illustrated. The firmer 2500 includes an upper portion 2510 having a mounting portion 2520. The mounting portion 2520 is preferably stiffened by inclusion of a stiffening insert made of stiffer material than the mounting portion (e.g., the mounting portion may be made of plastic and the stiffening insert may be made of metal) in an inner cavity 2540 of the mounting portion 2520. The mounting portion 2520 preferably includes mounting tabs 2526, 2528 for releasably attaching the firmer 2500 to a bracket on the row unit. The mounting portion 2520 preferably includes mounting hooks 2522, 2524 for attaching a liquid application conduit (e.g., flexible tube) (not shown) to the firmer 2500. The upper portion 2510 preferably includes an internal cavity 2512 sized to receive the liquid application conduit. The internal cavity 2512 preferably includes a rearward aperture through which the liquid application conduit extends for dispensing liquid behind the firmer 2500. It should be appreciated that a plurality of liquid conduits may be inserted in the internal cavity 2512. Additionally, a nozzle may be included at a terminal end of the conduit or conduits to redirect and/or split the flow of liquid applied in the trench behind the firmer 2500.

The firmer 2500 also preferably includes a ground-engaging portion 2530 mounted to the upper portion 2510. The ground-engaging portion 2530 may be removably mounted to the upper portion 2510. As illustrated, the ground-engaging portion is mounted to the upper portion by threaded screws 2560, but in other embodiments the ground-engaging portion may be installed and removed without the use of tools, e.g. by a slot-and-groove arrangement. The ground-engaging portion 2530 may also be permanently mounted to the upper portion 2510 (e.g., by using rivets instead of screws 2560, or by molding the upper portion to the ground-engaging portion). The ground-engaging portion 2530 is preferably made of a material having greater wear-resistance than plastic such as metal (e.g., stainless steel or hardened white iron), may include a wear-resistant coating (or a non-stick coating as described herein), and may include a wear-resistant portion such as a tungsten carbide insert.

The ground-engaging portion 2530 preferably includes a sensor for detecting characteristics of the trench (e.g., soil moisture, soil organic matter, soil temperature, seed presence, seed spacing, percentage of seeds firmed, soil residue presence) such as a reflectivity sensor 2590, preferably housed in a cavity 2532 of the ground-engaging portion. The reflectivity sensor 2590 preferably includes a sensor circuit board 2596 having a sensor disposed to receive reflected light from the trench through a transparent window 2592. The transparent window 2592 is preferably mounted flush with a lower surface of the ground-engaging portion such that soil flows underneath the window without building up over the window or along an edge thereof. An electrical connection 2594 preferably connects the sensor circuit board 2596 to a wire or bus (not shown) placing the sensor circuit board in data communication with the monitor 50.

Turning to FIGS. 5-14, an embodiment of another seed firmer 500 is illustrated. A flexible portion 504 is preferably configured to resiliently press a firmer body 520 into the seed trench 38. Mounting tabs 514, 515 releasably couple the flexible portion 504 to the firmer bracket 415, preferably as described in the '585 application.

A flexible liquid conduit 506 preferably conducts liquid (e.g., liquid fertilizer) from a liquid source to an outlet 507 for depositing in or adjacent to the trench 38. As shown in FIG. 10, the conduit 506 preferably extends through the firmer body 520 between the outlet 507 and a fitting 529 which preferably constrains the conduit 506 from sliding relative to the firmer body 520. The portion of the conduit may extend through an aperture formed in the firmer body 520 or (as illustrated) through a channel covered by a removable cap 530. The cap 530 preferably engages sidewalls 522, 524 (FIG. 11) of the firmer body 520 by hooked tabs 532. Hooked tabs 532 preferably retain sidewalls 522, 524 from warping outward in addition to retaining the cap 530 on the firmer body 520. A screw 533 (FIG. 10) also preferably retains the cap 530 on the firmer body 520.

Referring to FIGS. 6 and 7, the conduit 506 is preferably retained to the flexible portion 504 of the seed firmer 500 by mounting hooks 508, 509 and by the mounting tabs 514, 515. The conduit 506 is preferably resiliently grasped by arms 512, 513 of the mounting hooks 508, 509 respectively. Referring to FIGS. 8 and 9, the conduit 506 is preferably received in slots 516, 517 of mounting tabs 514, 515, respectively.

A wiring harness 505 preferably comprises a wire or plurality of wires in electrical communication with the firmer-mounted sensors described below. The wiring harness 505 is preferably received in slots 510, 511 of the mounting hooks 508, 509 and additionally retained in place by the conduit 506. The wiring harness 505 is preferably grasped by slots 518, 519 of the mounting tabs 514, 515, respectively. The wiring harness 505 is preferably pressed through a resilient opening of each slot 518, 519 and the resilient opening returns into place so that the slots retain the harness 505 unless the harness is forcibly removed.

In some embodiments, the lowermost trench-engaging portion of the seed firmer 500 comprises a plate 540. The plate 540 may comprise a different material and/or a material having different properties from the remainder of the firmer body 520. For example, the plate 540 may have a greater hardness than the remainder of the firmer body 520 and may comprise powder metal. In some embodiments, the entire firmer body 520 is made of a relatively hard material such as powder metal. In an installment phase, the plate 540 is mounted to the remainder of the firmer body 520 (e.g., by rods 592 fixed to plate 540 and secured to the remainder of the firmer body by snap rings 594). It should be appreciated that the plate may be either removably mounted or permanently mounted to the remainder of the firmer body.

Referring to FIGS. 10, 12 and 13, the seed firmer 500 is preferably configured to removably receive a reflectivity sensor 350 within a cavity 527 within the firmer body 520. In a preferred embodiment, the reflectivity sensor 350 is removably installed in the seed firmer 500 by sliding the reflectivity sensor 350 into the cavity 527 until flexible tabs 525, 523 (FIG. 13) snap into place, securing the reflectivity sensor 350 in place until the flexible tabs are bent out of the way for removal of the reflectivity sensor. The reflectivity sensor 350 may be configured to perform any of the measurements described above with respect to the reflectivity sensor 350 of seed firmer 400 of FIGS. 4A-4C. The reflectivity sensor 350 preferably comprises a circuit board 580 (in some embodiments an over-molded printed circuit board). The reflectivity sensor 350 preferably detects light transmitted through a lens 550 having a lower surface coextensive with the surrounding lower surface of the firmer body 520 such that soil and seeds are not dragged by the lens 550. In embodiments having a plate 540, the bottom surface of the lens 550 is preferably coextensive with a bottom surface of the plate 540. The lens 550 is preferably a transparent material such as sapphire. The interface between the circuit board 580 and the lens 550 is preferably protected from dust and debris. In the illustrated embodiment the interface is protected by an o-ring 552 (FIG. 12), while in other embodiments the interface is protected by a potting compound. In a preferred embodiment, the lens 550 is mounted to the circuit board 580 and the lens slides into place within the lowermost surface of the firmer body 520 (and/or the plate 540) when the reflectivity sensor 350 is installed. In such embodiments, the flexible tabs 523, 525 (FIG. 13) preferably lock the reflectivity sensor into a position wherein the lens 550 is coextensive with the lowermost surface of the firmer body 520.

Figure 14:
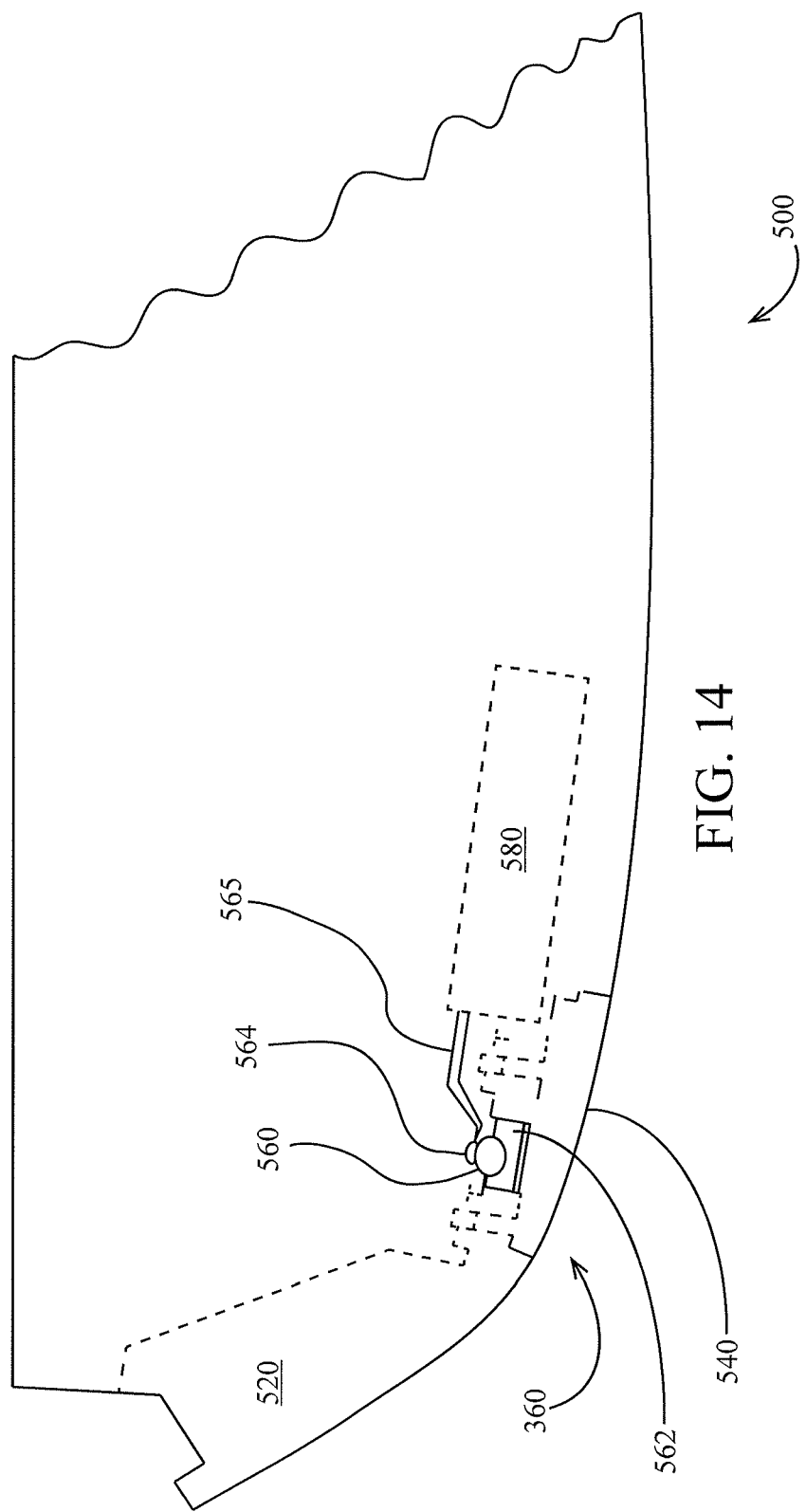
FIG. 14 is an enlarged partial cutaway view of the seed firmer of FIG. 5.

Referring to FIGS. 10 and 14, the seed firmer 500 preferably includes a temperature sensor 360. The temperature sensor 360 preferably comprises a probe 560. The probe 560 preferably comprises a thermo-conductive rod (e.g., a copper rod) extending through the width of the firmer body 500 and having opposing ends extending from the firmer body 500 to contact either side of the trench 38. The temperature sensor 360 preferably also comprises a resistance temperature detector ("RTD") 564 fixed to (e.g., screwed into a threaded hole in) the probe 560. The RTD is preferably in electrical communication with the circuit board 580 via an electrical lead 585. The circuit board 580 is preferably configured to process both reflectivity and temperature measurements and is preferably in electrical communication with the harness 505. In embodiments in which the plate 540 and/or the remainder of the firmer body 520 comprise a thermally conductive material, an insulating material 562 preferably supports the probe 560 such that temperature changes in the probe are minimally affected by contact with the firmer body. In such embodiments, the probe 560 is preferably primarily surrounded by air in the interior of the firmer body 520 and the insulating material 562 (or firmer body) preferably contacts a minimal surface area of the probe. In some embodiments the insulating material comprises a low-conductivity plastic such as polystyrene or polypropylene.

Figure 15:
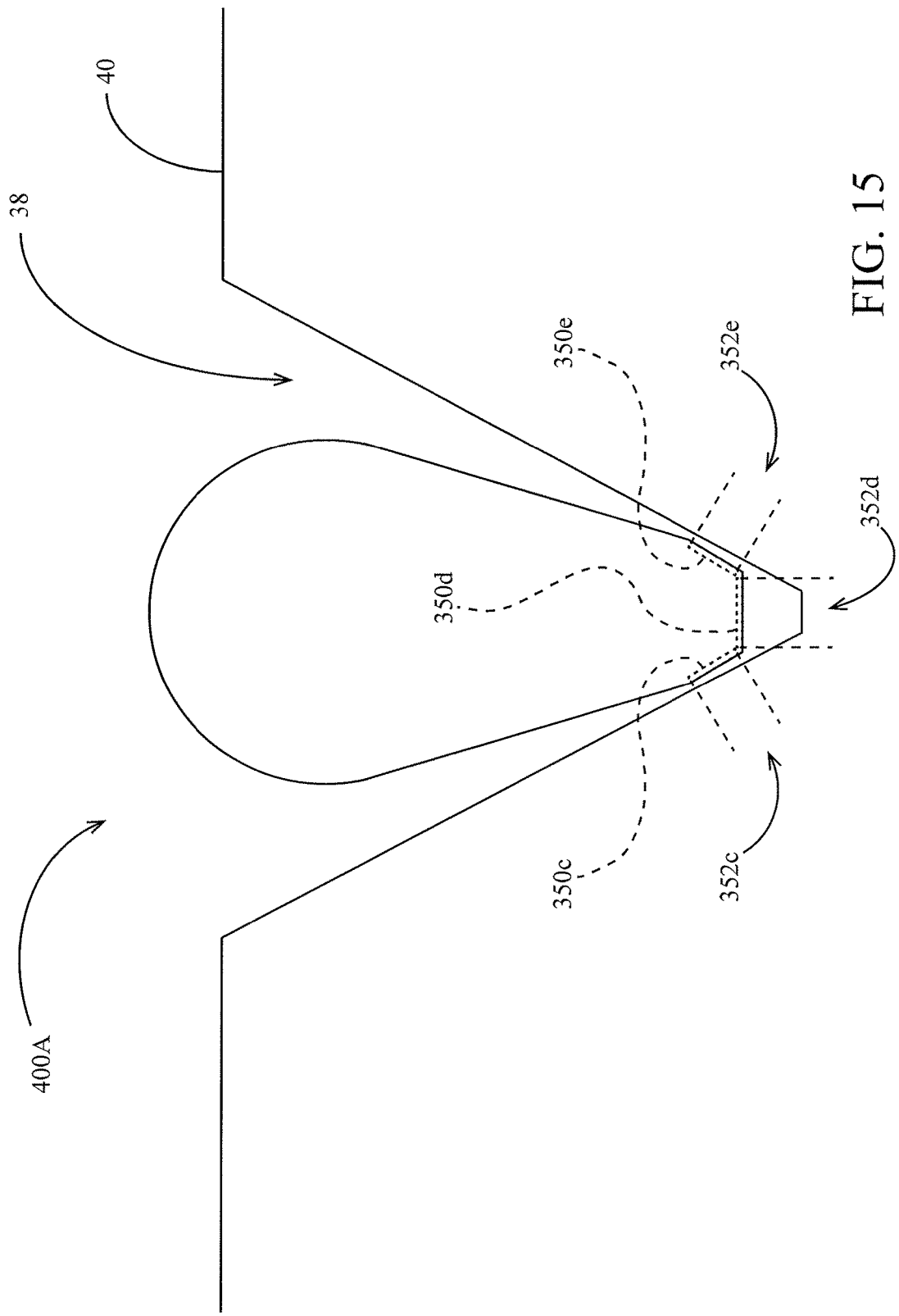
FIG. 15 is a rear view of another embodiment of a seed firmer shown in a seed trench.

Turning to FIG. 15, another embodiment 400A of the seed firmer is illustrated having a plurality of reflectivity sensors 350. Reflectivity sensors 350c, 350d and 350e are disposed to measure reflectivity of regions 352c, 352d and 352e, respectively, at and adjacent to the bottom of the trench 38. The regions 352c, 352d and 352e preferably constitute a substantially contiguous region preferably including all or substantially the entire portion of the trench in which seed rests after falling into the trench by gravity. In other embodiments, a plurality of temperature and/or electrical conductivity sensors are disposed to measure a larger, preferably substantially contiguous region.

Figure 16:
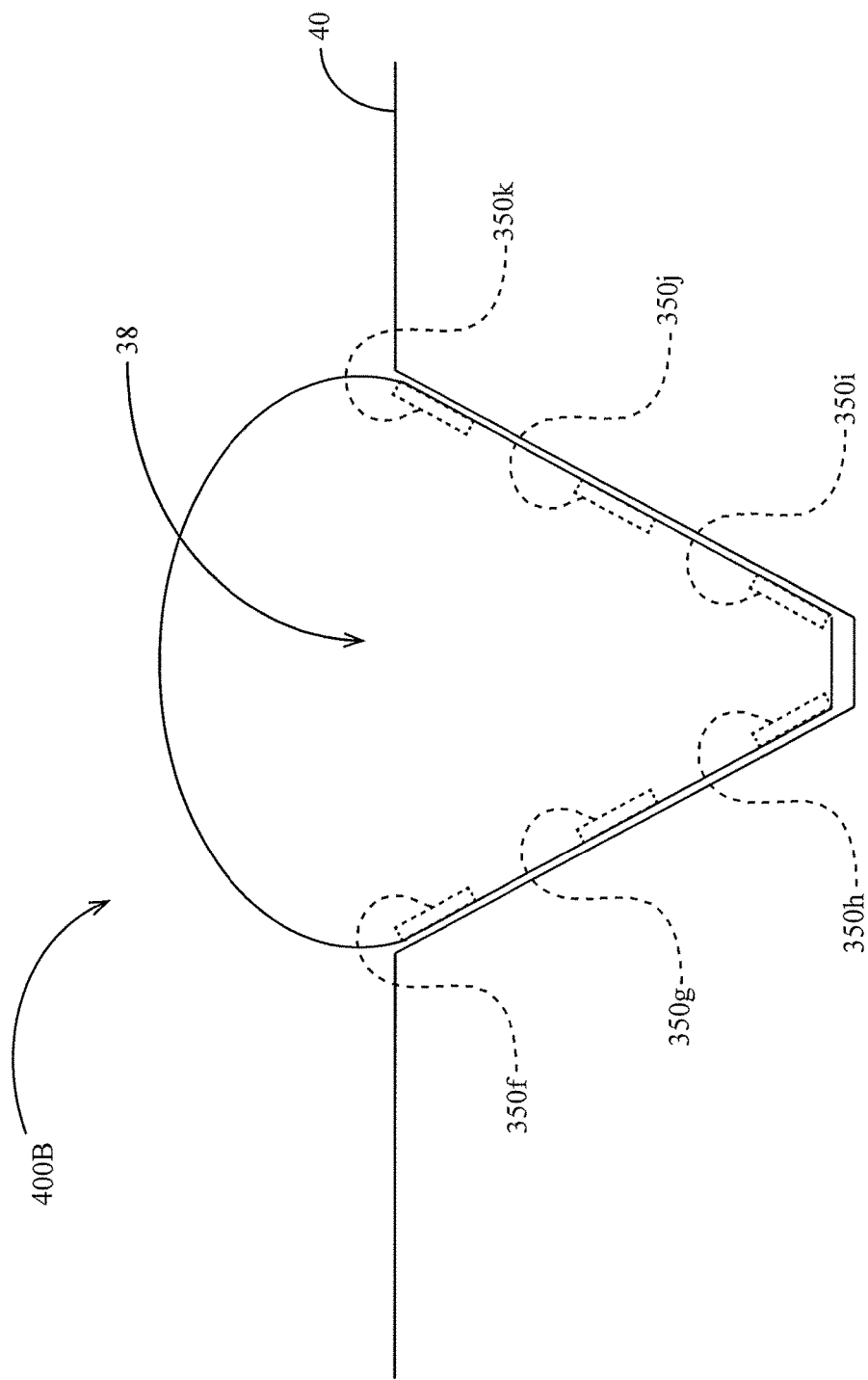
FIG. 16 is a rear view of still another embodiment of a seed firmer shown in a seed trench.

Turning to FIG. 16, another embodiment of a seed firmer 400B is illustrated having a plurality of reflectivity sensors 350 disposed to measure at either side of the trench 38 at various depths within in the trench. The reflectivity sensors 350f, 350k are disposed to measure reflectivity at or adjacent to the top of the trench 38. The reflectivity sensors 350h, 350i are disposed to measure reflectivity at or adjacent to the bottom of the trench 38. The reflectivity sensors 350g, 350j are disposed to measure reflectivity at an intermediate depth of the trench 38, e.g., at half the depth of the trench. It should be appreciated that in order to effectively make soil measurements at a depth at an intermediate depth of the trench, it is desirable to modify the shape of the seed firmer such that the sidewalls of the seed firmer engage the sides of the trench at an intermediate trench depth. Likewise, it should be appreciated that in order to effectively make soil measurements at a depth near the top of the trench (i.e., at or near the soil surface 40), it is desirable to modify the shape of the seed firmer such that the sidewalls of the seed firmer engage the sides of the trench at or near the top of the trench. In other embodiments, a plurality of temperature and/or electrical conductivity sensors are disposed to measure temperature and/or electrical conductivity, respectively, of soil at a plurality of depths within the trench 38.

Figure 18:
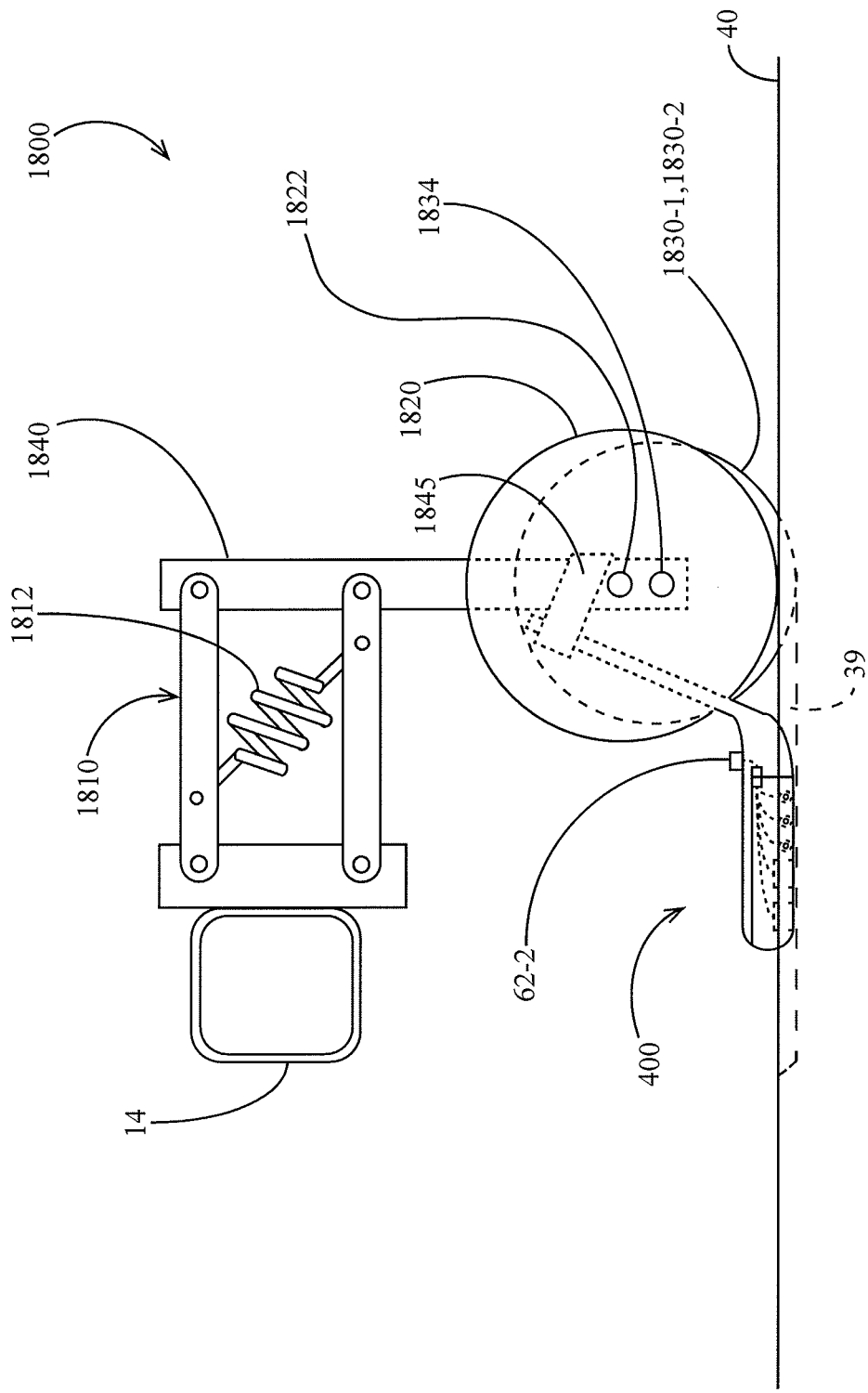
FIG. 18 is a side elevation view of an embodiment of a reference sensor.

As described above with respect to the system 300, in some embodiments a second set of reflectivity sensors 350, temperature sensors 360, and electrical conductivity sensors 370 are mounted to a reference sensor. One such embodiment of a reference sensor 1800 is illustrated in FIG. 18, in which an assembly is provided to open a trench 39 in which a seed firmer 400 having firmer-mounted sensors is resiliently engaged in order to sense the soil characteristics of the bottom of the trench 39. The trench 39 is preferably at a shallow depth (e.g., between ⅛ and ½ inch) or at a deep depth (e.g., between 3 and 5 inches). The trench is preferably opened by a pair of opening discs 1830-1, 1830-2 disposed to open a v-shaped trench in the soil 40 and rotating about lower hubs 1834. The depth of the trench is preferably set by one or more gauge wheels 1820 rotating about upper hubs 1822. The upper and lower hubs are preferably fixedly mounted to a shank 1840. The seed firmer is preferably mounted to the shank 1840 by a firmer bracket 1845. The shank 1840 is preferably mounted to the toolbar 14. In some embodiments, the shank 1840 is mounted to the toolbar 14 by a parallel arm arrangement 1810 for vertical movement relative to the toolbar. In some such embodiments, the shank is resiliently biased toward the soil by an adjustable spring 1812 (or other downforce applicator). In the illustrated embodiment, the shank 1840 is mounted forward of the toolbar 14. In other embodiments, the shank may be mounted rearward of the toolbar 14. In other embodiments, the firmer 400 may be mounted to the row unit shank 254, to a closing wheel assembly, or to a row cleaner assembly.

Figure 23:
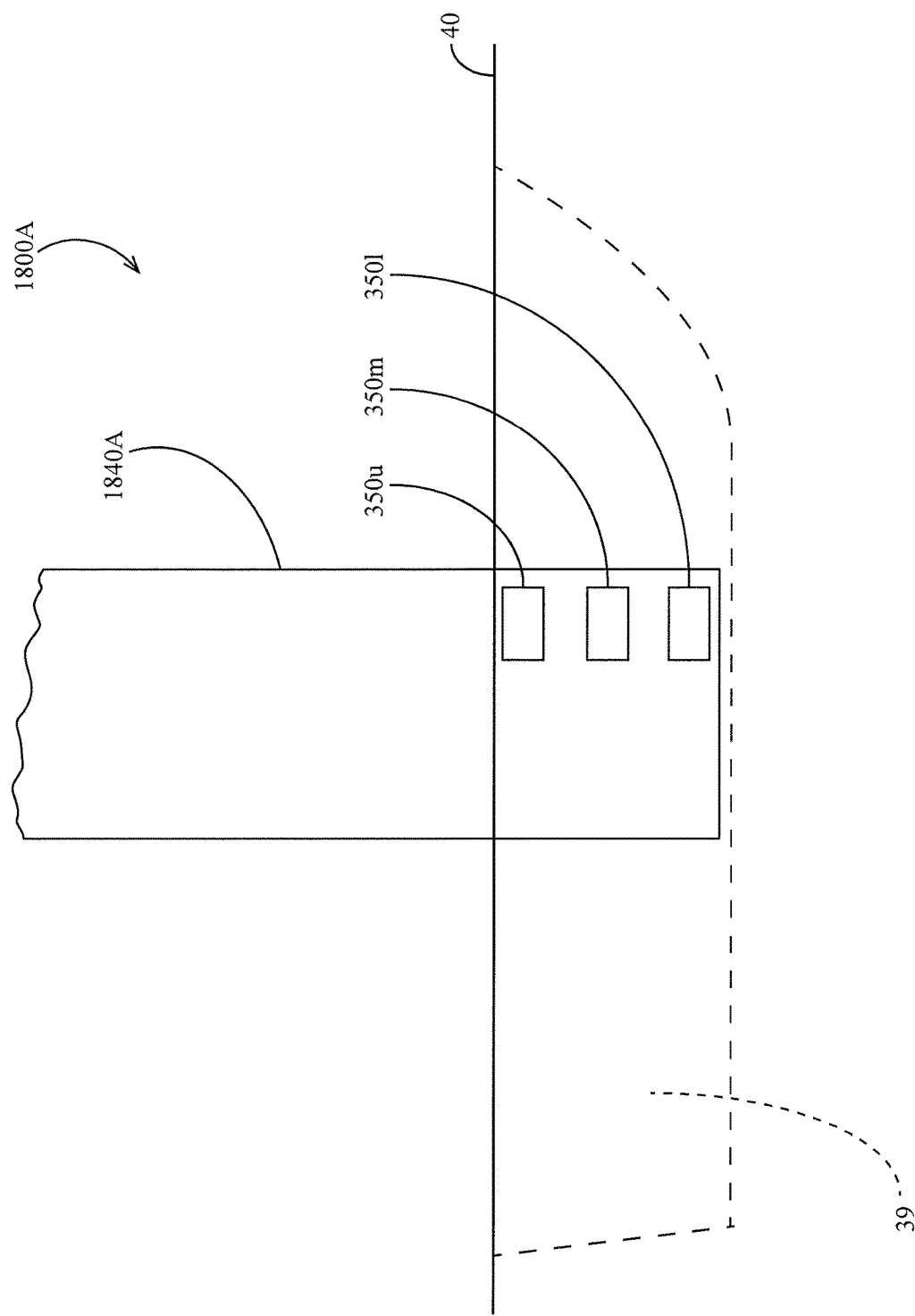
FIG. 23 is a side elevation view of another embodiment of a reference sensor having an instrumented shank.
Figure 24:
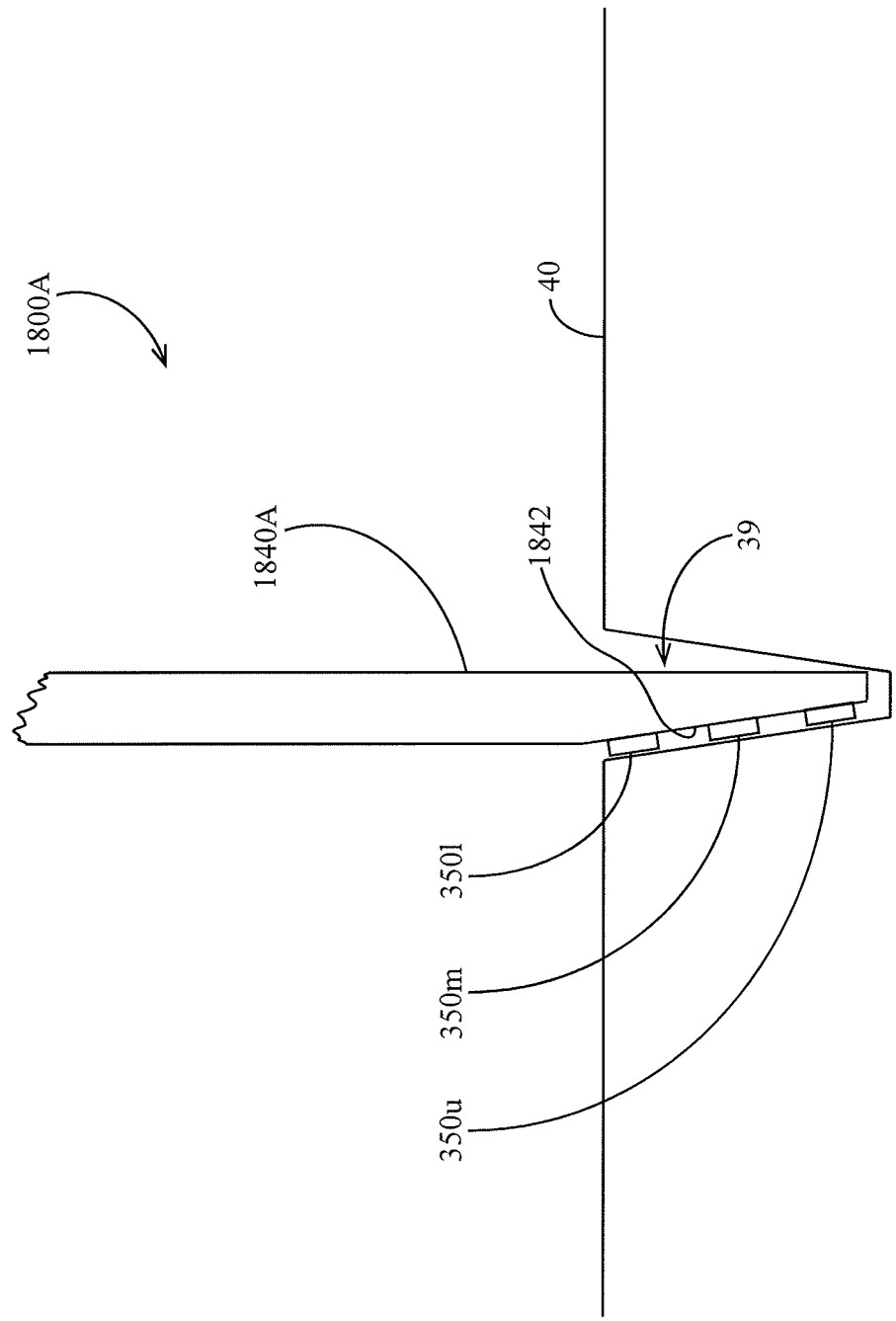
FIG. 24 is a front elevation view of the reference sensor of FIG. 23.

Referring to FIGS. 23 and 24, an embodiment of another reference sensor 1800A is illustrated which comprises an instrumented shank 1840A. Reference sensors 350*u*, 350*m*, 350*l*, are preferably disposed on a lower end of the shank 1840A and disposed to contact soil on a sidewall of the trench 39 at or adjacent the top of the trench, at an intermediate trench depth, and at or adjacent the bottom of the trench, respectively. The shank 1840A extends into the trench and preferably includes an angled surface 1842 to which the reference sensors 350 are mounted. The angle of surface 1842 is preferably parallel to the sidewall of the trench 39.

Data Processing and Display

Figure 20A:
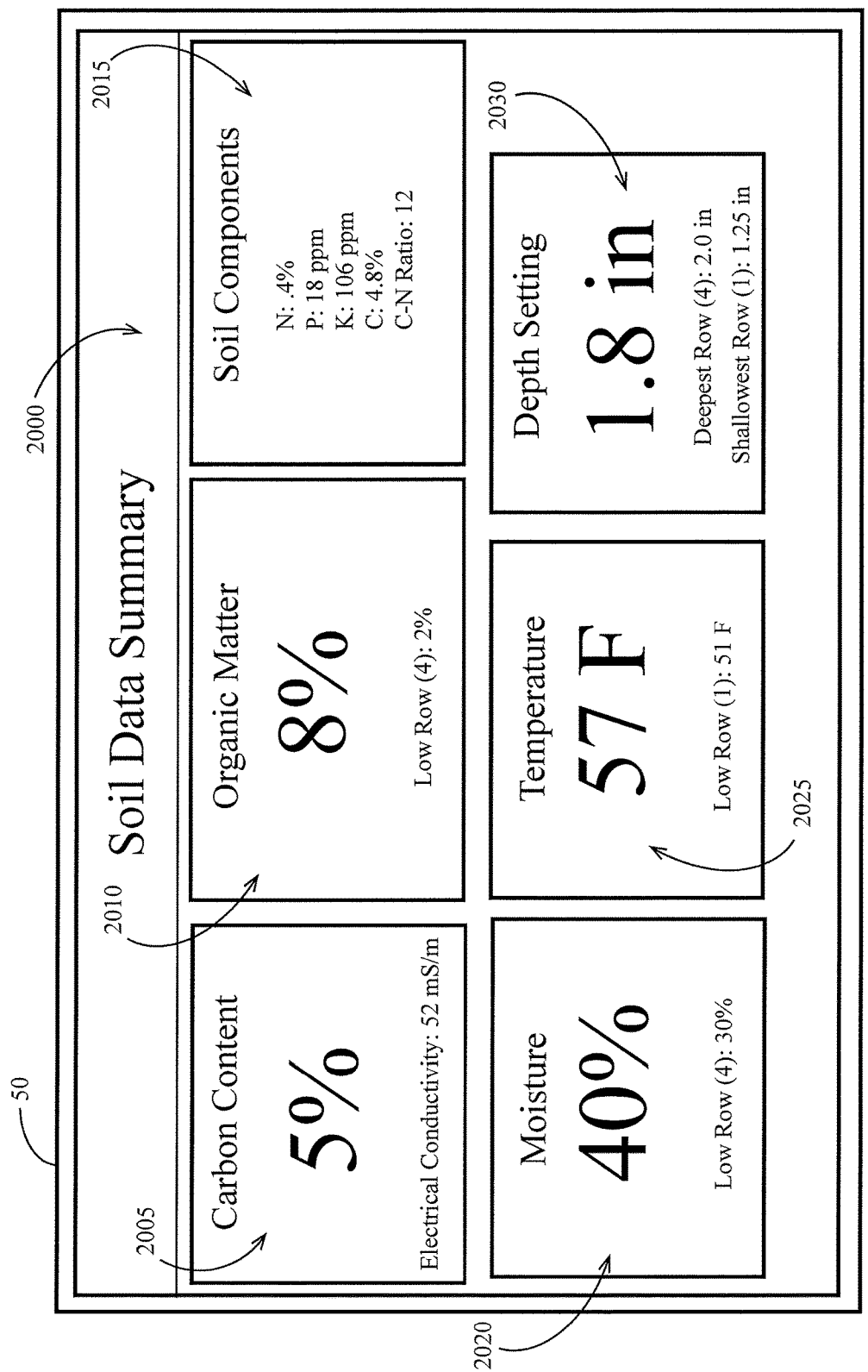
FIGS. 20A-20B illustrate embodiments of a soil data display screen.
Figure 20B:
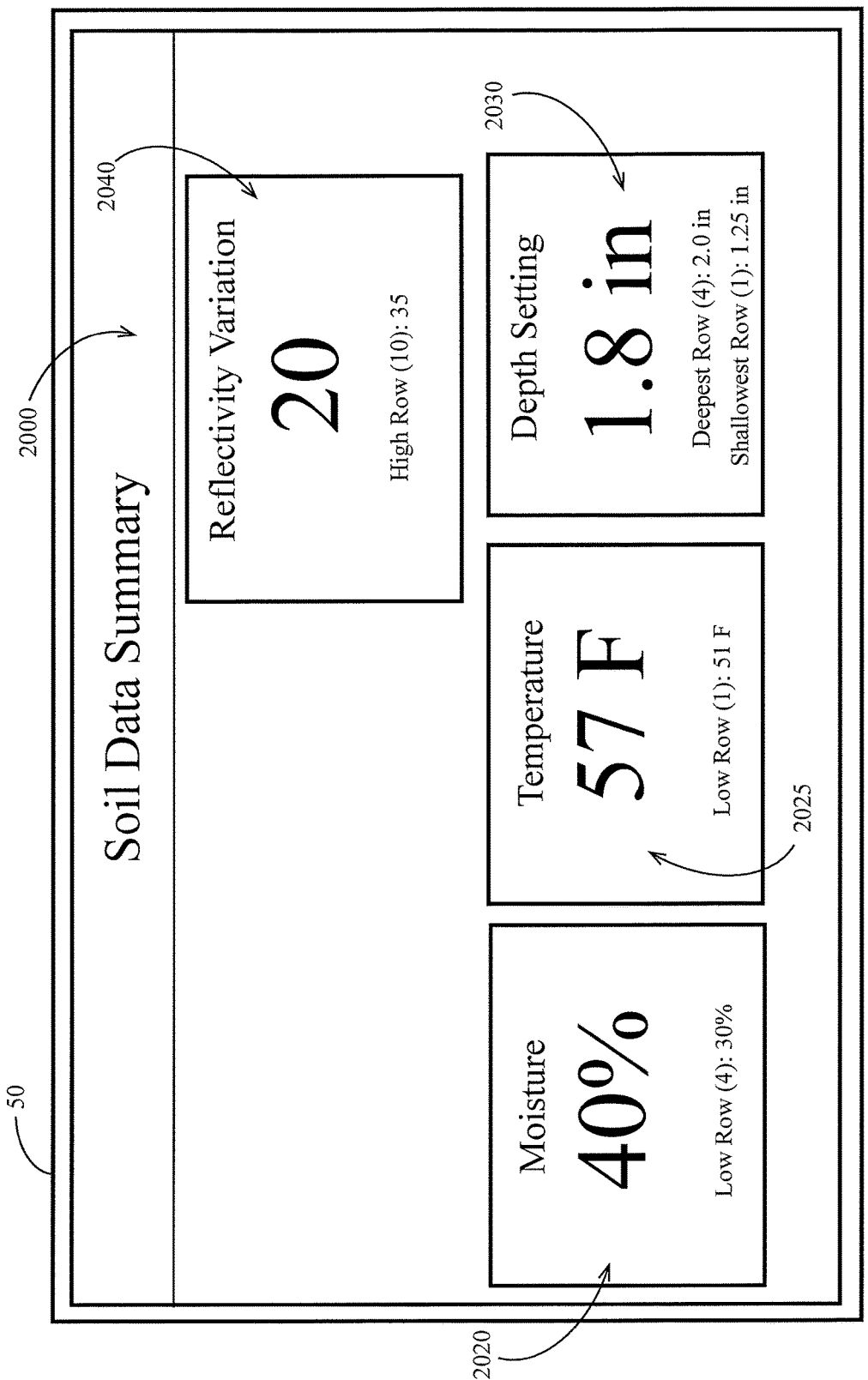

Turning to FIG. 20A-20B, the monitor 50 is preferably configured to display a soil data screen 2000 including a plurality of windows displaying soil data (as a numerical or legend-based representation) gathered using any of the seed firmers and associated sensors described herein. The soil data in each window preferably corresponds to current measurements measured by the firmer-mounted sensors on the seed firmers and/or the reference sensor 1800, 1800A. In some embodiments, the soil data in certain windows may correspond to average measurements over a preceding time window or over a previously traveled distance. In some embodiments the soil data in certain windows corresponds to an average value across a plurality of sensors across the planter; in such embodiments, the window also preferably identifies the row at which the lowest and/or highest value is measured as well as displaying the lowest and/or highest value measured at such row.

A carbon content window 2005 preferably displays an estimate of the soil carbon content. The carbon content is preferably estimated based on the electrical conductivity measured by the electrical conductivity sensors 370 (e.g., using an empirical relation or empirical look-up table relating electrical conductivity to an estimated carbon content percentage). The window 2005 preferably additionally displays the electrical conductivity measured by the electrical conductivity sensors 370.

An organic matter window 2010 preferably displays an estimate of the soil organic matter content. The organic matter content is preferably estimated based on the reflectivity at one or a plurality of wavelengths measured by the reflectivity sensors 350 (e.g., using an empirical relation or empirical look-up table relating reflectivity at one or a plurality of wavelengths to an estimated organic matter percentage).

A soil components window 2015 preferably displays an estimate of the fractional presence of one or a plurality of soil components (e.g., nitrogen, phosphorous, potassium, and carbon). Each soil component estimate is preferably based on the reflectivity at one or a plurality of wavelengths measured by the reflectivity sensors 350 (e.g., using an empirical relation or empirical look-up table relating reflectivity at one or a plurality of wavelengths to an estimated fractional presence of a soil component). In some embodiments, the soil component estimate is preferably determined based on a signal or signals generated by the spectrometer 373. In some embodiments, the window 2015 additionally displays a ratio between the carbon and nitrogen components of the soil.

A moisture window 2020 preferably displays an estimate of soil moisture. The moisture estimate is preferably based on the reflectivity at one or a plurality of wavelengths (e.g., 930 or 940 nanometers) measured by the reflectivity sensors 350, e.g., using an empirical relation or empirical look-up table relating reflectivity at one or a plurality of wavelengths to an estimated moisture. In some embodiments, the moisture measurement is determined as disclosed in U.S. Provisional Patent Application 61/824,975.

A temperature window 2025 preferably displays an estimate of soil temperature. The temperature estimate is preferably based on the signal generated by one or more temperature sensors 350.

A depth window 2030 preferably displays the current depth setting. The monitor 50 preferably also enables the user to remotely actuate the row unit 200 to a desired trench depth as disclosed in International Patent Application No. PCT/US2014/029352, incorporated herein by reference.

A reflectivity variation window 2040 (FIG. 20B) may show a statistical reflectivity variation during a threshold period (e.g., the prior 30 seconds) or over a threshold distance traveled by the implement (e.g., the preceding 30 feet). The statistical reflectivity variation may comprise any function of the reflectivity signal (e.g., generated by each reflectivity sensor 350) such as the variance or standard deviation of the reflectivity signal. The monitor 50 may additionally display a representation of a predicted agronomic result (e.g., percentage of plants successfully emerged) based on the reflectivity variation value. For example, values of reflectivity emergence may be used to look up a predicted plant emergence value in an empirically-generated database (e.g., stored in memory of the implement monitor 50 or stored in and updated on a remote server in data communication with the implement monitor) associating reflectivity values with predicted plant emergence.

Each window of the soil data summary screen 2000 preferably shows an average value for all row units ("rows") at which the measurement is made and optionally the row unit for which the value is highest and/or lowest along with the value associated with such row unit or row units. Selecting (e.g., clicking or tapping) each window preferably shows the individual (row-by-row) values of the data associated with the window for each of the row units at which the measurement is made.

Figure 21A:
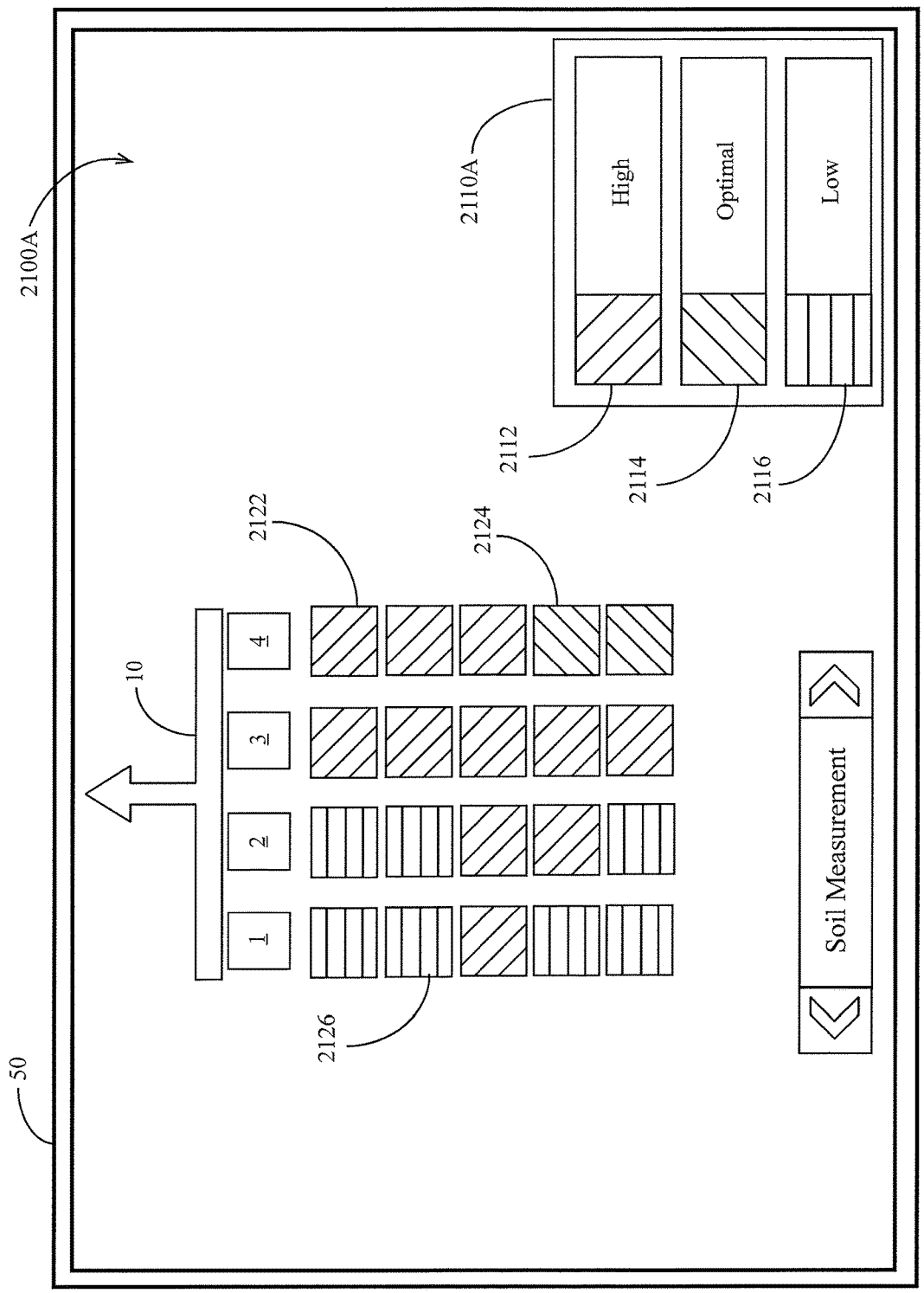
FIGS. 21A-21B illustrate embodiments of a spatial map screen.

Turning to FIG. 21A, the monitor 50 is preferably configured to display one or more map windows 2100A in which a plurality of soil data, measurement, and/or estimate values are represented by blocks 2122, 2124, 2126, each block having a color or pattern associating the measurement at the block position to the ranges 2112, 2114, 2116, respectively (of legend 2110A) in which the measurements fall. The map window 2100A is preferably generated and displayed for each soil data, measurement, and/or estimate displayed on the soil data screen 2000, preferably including carbon content, electrical conductivity, organic matter, soil components (including nitrogen, phosphorous, and potassium), moisture and soil temperature.

Figure 21B:
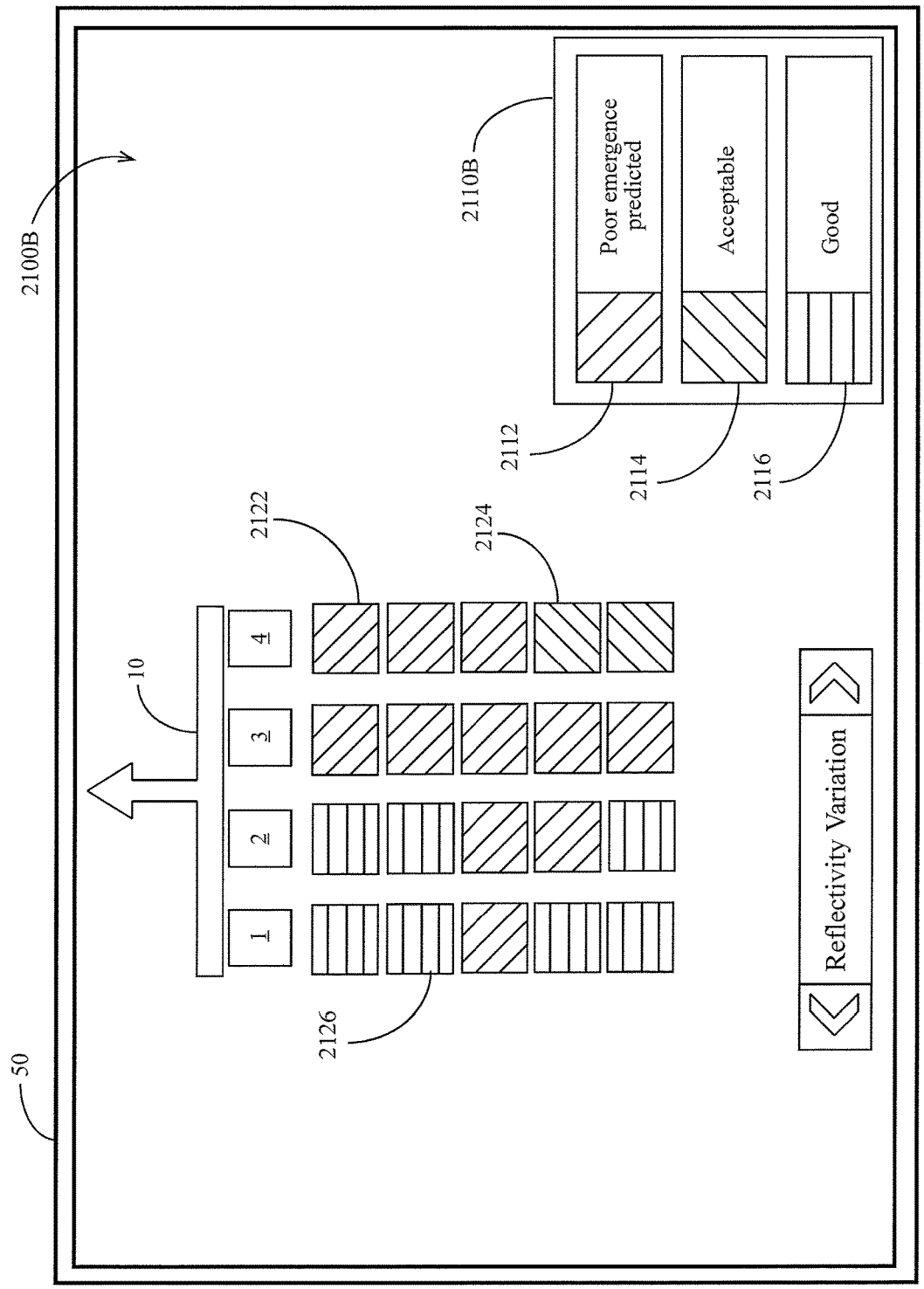

FIG. 21B shows another map window 2100B, in which the reflectivity variation is displayed spatially on a spatial reflectivity variation map displayed. As in the previous map window 2100A, in this map window 2100B, areas of the field may be associated with graphical representations 2122, 2124, 2126 (e.g., pixels or blocks) associated by color or pattern with subsets 2112, 2114, 2116, respectively of a legend 2110B. The subsets may correspond to numerical ranges of reflectivity variation. The subsets may be named according to an agronomic indication empirically associated with the range of reflectivity variation. For example, a reflectivity variation below a first threshold at which no emergence failure is predicted may be labeled "Good"; a reflectivity variation between the first threshold and a second threshold at which predicted emergence failure is agronomically unacceptable (e.g., is likely to affect yield by more than a yield threshold) may be labeled "Acceptable"' a reflectivity variation above the second threshold may be labeled "Poor emergence predicted".

Figure 17:
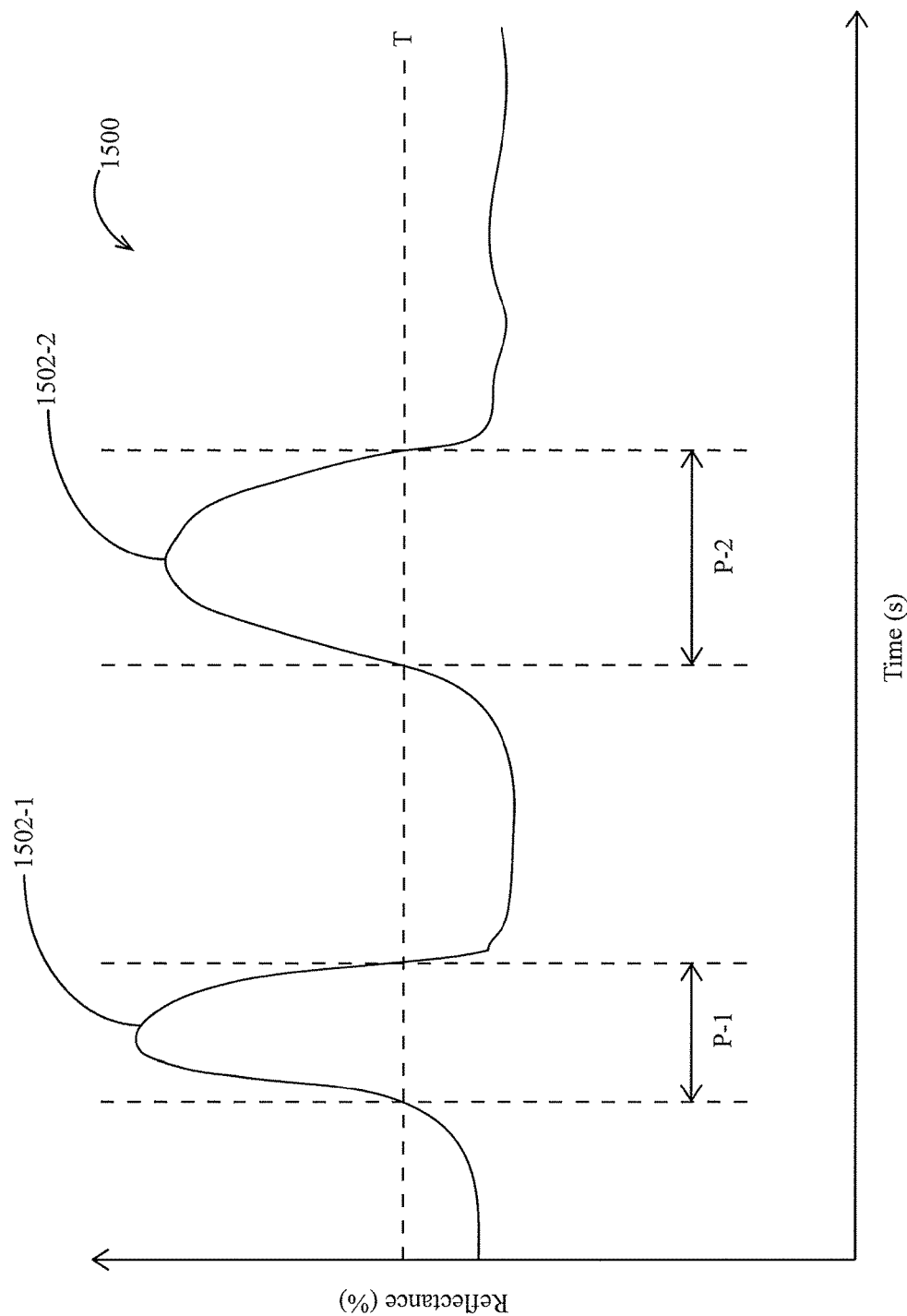
FIG. 17 is a plot of a reflectivity sensor signal.
Figure 22:
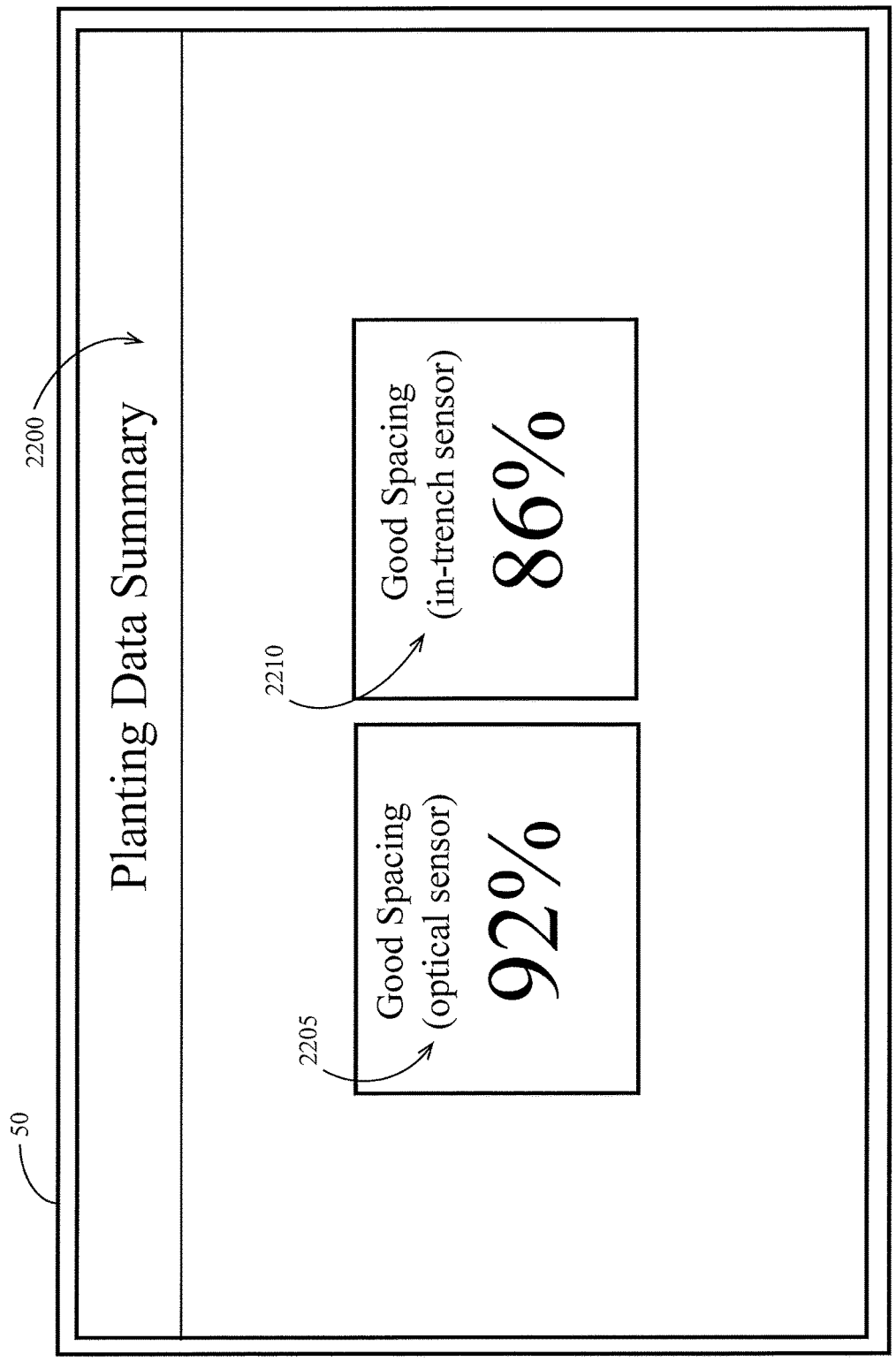
FIG. 22 illustrates an embodiment of a seed planting data display screen.

Turning to FIG. 22, the monitor 50 is preferably configured to display one or more planting data windows including planting data measured by the seed sensors 305 and/or the reflectivity sensors 350. The window 2205 preferably displays a good spacing value calculated based on seed pulses from the optical (or electromagnetic) seed sensors 305. The window 2210 preferably displays a good spacing value based on seed pulses from the reflectivity sensors 350. Referring to FIG. 17, seed pulses 1502 in a reflectivity signal 1500 may be identified by a reflectance level exceeding a threshold T associated with passage of a seed beneath the seed firmer. A time of each seed pulse 1502 may be established to be the midpoint of each period P between the first and second crossings of the threshold T. Once times of seed pulses are identified (whether from the seed sensor 305 or from the reflectivity sensor 350), the seed pulse times are preferably used to calculate a good spacing value as disclosed in U.S. patent application Ser. No. 13/752,031 ("the '031 application"), incorporated by reference herein. In some embodiments, in addition to good spacing, other seed planting information (including, e.g., population, singulation, skips and multiples) is also calculated and displayed on the screen 2200 according to the methods disclosed in the '031 application. In some embodiments, the same wavelength (and/or the same reflectivity sensor 350) is used for seed detection as moisture and other soil data measurements. In some embodiments the wavelength is about 940 nanometers. Where the reflectivity signal 1500 is used for both seed detection and soil measurement (e.g., moisture), the portion of the signal identified as a seed pulse (e.g., the periods P) are preferably not used in calculating the soil measurement. For example, the signal during each period P may be assumed to be a line between the times immediately prior to and immediately following the period P, or in other embodiments it may be assumed to be the average value of the signal during the previous 30 seconds of signal not falling within any seed pulse period P. In some embodiments, the screen 2200 also displays a percentage or absolute difference between the good spacing values or other seed planting information determined based on seed sensor pulses and the same information determined based on reflectivity sensor pulses.

In some embodiments, seed sensing is improved by selectively measuring reflectivity at a wavelength or wavelengths associated with a characteristic or characteristics of the seed being planted. In some such embodiments, the system 300 prompts the operator to select a crop, seed type, seed hybrid, seed treatment and/or another characteristic of the seed to be planted. The wavelength or wavelengths at which reflectivity is measured to identify seed pulses is preferably selected based on the seed characteristic or characteristics selected by the operator.

In some embodiments, the "good spacing" values are calculated based on both the seed pulse signals generated by the optical or electromagnetic seed sensors 305 and the reflectivity sensors 350.

In some such embodiments, the "good spacing" value for a row unit is based on the seed pulses generated the reflectivity sensor 350 associated with the row unit, which are filtered based on the signal generated by the optical seed sensor 305 on the same row unit. For example, a confidence value may be associated each seed pulse generated by the optical seed sensor (e.g., directly related to the amplitude of the optical seed sensor seed pulse). The confidence value may then be modified based on the optical seed sensor signal (e.g., increased if a seed pulse was observed at the optical seed sensor within a threshold period prior to the reflectivity sensor seed pulse, and decreased if the a seed pulse was not observed at the optical seed sensor within a threshold period prior to the reflectivity sensor seed pulse). A seed pulse is then recognized and stored as a seed placement if the modified confidence value exceeds a threshold.

In other such embodiments, the "good spacing" value for a row unit is based on the seed pulses generated the optical seed sensor 305 associated with the row unit, which are modified based on the signal generated by the reflectivity sensor 350 on the same row unit. For example, the seed pulses generated by the optical seed sensor 305 may be associated with the time of the next seed pulse generated by the reflectivity sensor 350. If no seed pulse is generated by the reflectivity sensor 350 within a threshold time after the seed pulse generated by the seed sensor 305, then the seed pulse generated by the seed sensor 305 may be either ignored (e.g., if a confidence value associated with the seed sensor seed pulse is below a threshold) or adjusted by an average time delay between reflectivity sensor seed pulses and seed sensor seed pulses (e.g., the average time delay for the last 10, 100 or 300 seeds).

In addition to displaying seed planting information such as good spacing values, in some embodiments the seed pulses measured may be used to time deposition of in-trench liquid and other crop inputs in order to time application such that the applied crop input lands on the seed, adjacent to the seed, or between seeds as desired. In some such embodiments, a liquid applicator valve selectively permitting liquid to flow from outlet 507 of the liquid conduit 506 is briefly opened a threshold time (e.g., 0 seconds, 1 ms, 10 ms, 100 ms or 1 second) after a seed pulse 1502 is identified in signal 1500 from the reflectivity sensor 350 associated with the same row unit 200 as the liquid applicator valve.

A signal generated by the reflectivity sensor may also be used to identify the presence of crop residue (e.g., corn stalks) in the seed trench. Where reflectivity in a range of wavelengths associated with crop residue (e.g., between 560 and 580 nm) exceeds a threshold, the system 300 preferably determines that crop residue is present in the trench at the current GPS-reported location. The spatial variation in residue may then be mapped and displayed to a user. Additionally, the downpressure supplied to a row cleaner assembly (e.g., a pressure-controlled row cleaner as disclosed in U.S. Pat. No. 8,550,020, incorporated herein by reference) may be adjusted either automatically by the system 300 in response to the identification of residue or adjusted by the user. In one example, the system may command a valve associated with a row cleaner downpressure actuator to increase by 5 psi in response to an indication that crop residue is present in the seed trench. Similarly, a closing wheel downforce actuator may also be adjusted by the system 300 or the operator in response to an indication that crop residue is present in the seed trench.

In some embodiments, an orientation of each seed is determined based on the width of reflectivity-based seed pulse periods P. In some such embodiments, pulses having a period longer than a threshold (an absolute threshold or a threshold percentage in excess of the mean pulse period) are categorized in a first category while pulses having a shorter period than the threshold are categorized in a second category. The first and second category preferably correspond to first and second seed orientations. Percentages of seeds over the previous 30 seconds falling in the first and/or second category may be displayed on the screen 2200. The orientation of each seed is preferably mapped spatially using the GPS coordinates of the seed such that individual plant performance may be compared to seed orientation during scouting operations.

In some embodiments, a determination of seed-to-soil contact is made based on the existence or lack of a recognized seed pulse generated by the reflectivity sensor 350. For example, where a seed pulse is generated by the optical seed sensor 305 and no seed pulse is generated by the reflectivity sensor 350 within a threshold time after the optical seed sensor seed pulse, a "Poor" seed-to-soil contact value is preferably stored and associated with the location at which the reflectivity sensor seed pulse was expected. An index of seed-to-soil contact may be generated for a row or rows by comparing the number of seeds having "Poor" seed-to-soil contact over a threshold number of seeds planted, distance traveled, or time elapsed. The operator may then be alerted via the monitor 50 as to the row or rows exhibiting seed-to-soil contact below a threshold value of the index. Additionally, the spatial variation in seed-to-soil contact may be mapped and displayed to the user. Additionally, a criterion representing the percentage of seeds firmed (e.g., not having "Poor" seed-to-soil contact) over a preceding time period or number of seeds may be displayed to the operator.

Figure 29:
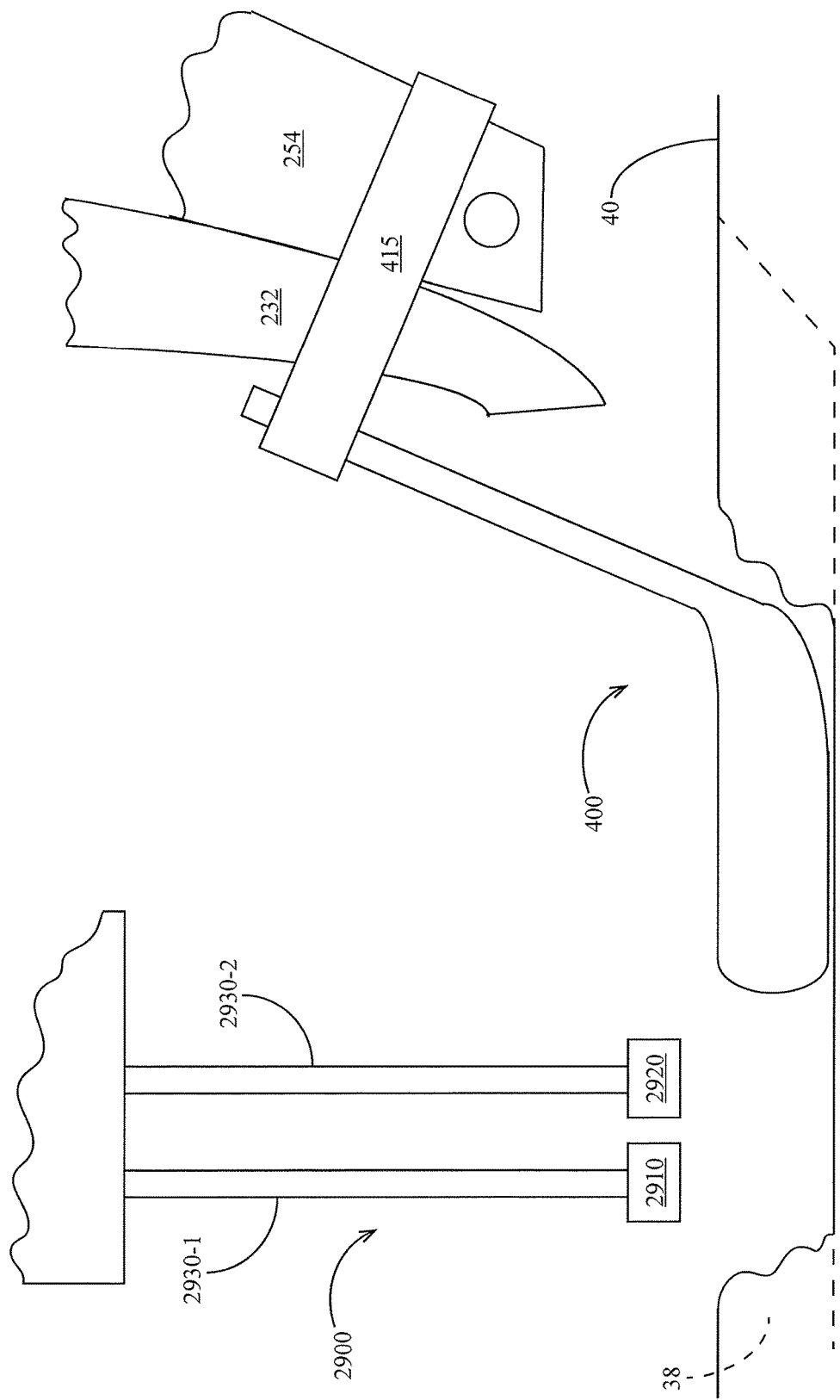
FIG. 29 is a side elevation view of a remote trench characteristic sensing system.

Turning to FIG. 29, in some embodiments, the row unit 200 additionally comprises a trench condition sensing system 2900. The trench condition sensing system 2900 preferably includes a sensor 2910 disposed to measure a characteristic (e.g., reflectivity, moisture, temperature, presence of seeds, presence of residue) of the trench 38 (e.g., the bottom of the trench). The sensor 2910 preferably comprises a sensor configured to remotely measure the trench characteristic (e.g., without contacting the soil). The sensor 2910 is preferably disposed above the soil surface (e.g., above the bottom of the trench and preferably above the top of the trench). The sensor 2910 may comprise a reflectivity sensor. The trench condition sensing system 2900 preferably additionally comprises light source 2920 (e.g., an LED) disposed to illuminate the trench 28. In some embodiments, the light source 2920 is configured to modify the intensity and/or wavelength at which the trench is illuminated. The sensor 2910 and the light source 2920 are preferably disposed longitudinally behind the seed firmer 400 and longitudinally forward of the closing system 236. The sensor 2910 and the light source 2920 are preferably disposed transversely between the lateral edges of the trench 38. The sensor 2910 and the light source 2920 are preferably suspended in their preferred locations by supports 2930 depending from the frame of the row unit 200. The sensor 2910 and the light source 2920 are preferably in data communication with the planter monitor 50 for transmission of commands and measurement data.

Lateral Extrusion Embodiments

Figure 27:
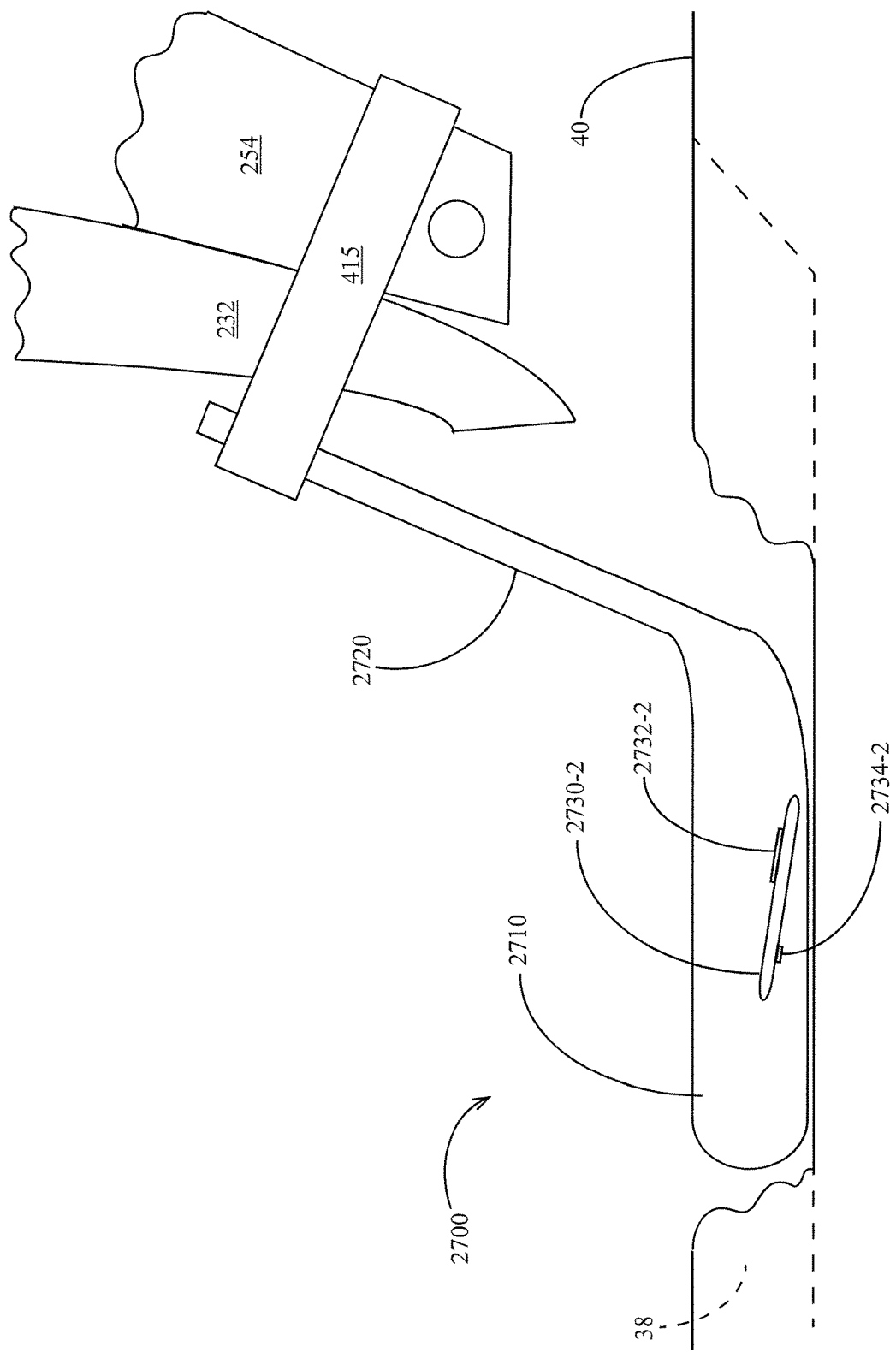
FIG. 27 is a side elevation view of a seed firmer having transverse trench-engaging extrusions.
Figure 28:
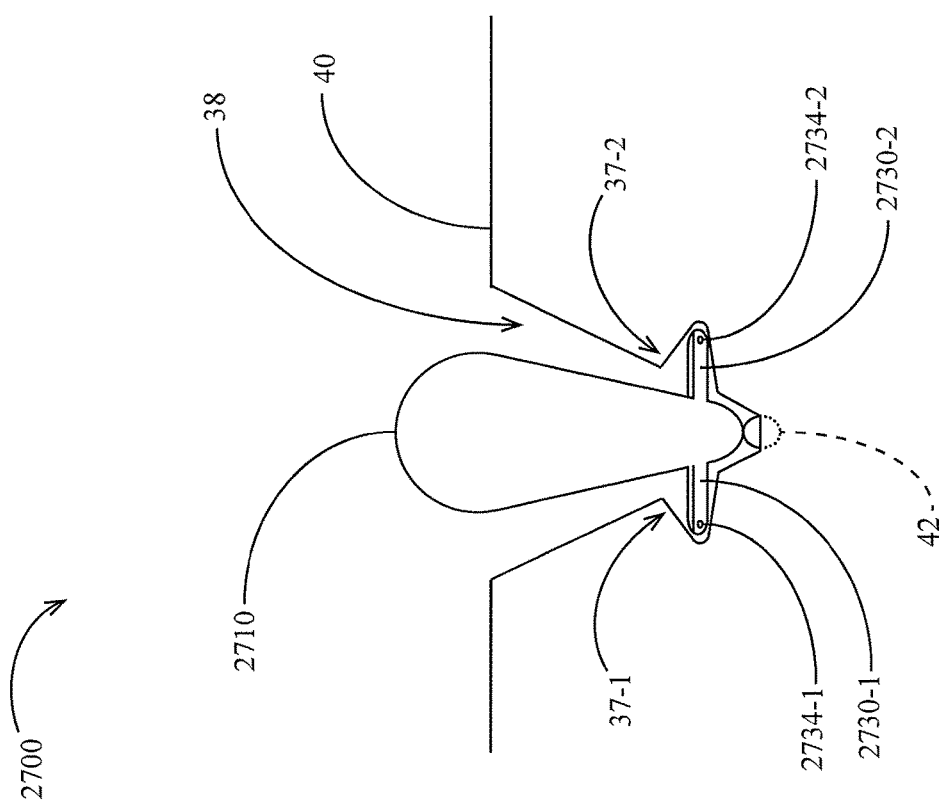
FIG. 28 is a rear view of the seed firmer of FIG. 27.

Turning to FIGS. 27 and 28, an embodiment of another seed firmer 2700 is illustrated in which the firmer 2700 includes trench-engaging extrusions or "wings" 2730. The wings 2730-1, 2730-2 are preferably disposed on the left and right side, respectively of the seed firmer 2700. The wings 2730 may be mounted (e.g., by a tongue-and-groove arrangement) to the firmer body 2710 of the seed firmer 2700 or formed as a single unitary part with the firmer body 2710. The wings 2730 are preferably disposed to open transversely-extending side trenches 37 (FIG. 28) in the soil as the firmer is moved longitudinally through the primary trench 38, such that the primary trench 38 includes two transversely-extending side trenches 37-1, 37-2 on its left and right sides. Each wing is preferably disposed at a wing angle (e.g., 10 degrees to 30 degrees) relative to horizontal such that a rearward end of the wing is higher than the a forward end of the wing. Each wing preferably has an upper surface which is preferably disposed at the wing angle. The wings 2730 are preferably disposed to retain a bottom surface of the firmer body 2710 in contact with the bottom of the primary trench 38, e.g., by transmitting a downward vertical force from the soil to the firmer body. The downward vertical force may be developed by the cutting action of the wing 2730 (e.g., the downward vertical force may be developed by soil moving from the lower forward end of the wing to the higher rearward end of the wing).

The wings 2730 may be made of the same material or a different material from the firmer body 2710. The wings 2730 may be made of a plastic or made of a material having greater wear-resistance than plastic such as metal (e.g., stainless steel or hardened white iron), may include a wear-resistant coating (or a non-stick coating as described herein), and may include a wear-resistant portion such as a tungsten carbide insert.

Each wing 2730 preferably includes a sensor 2732. In some embodiments, the sensor is disposed on an upper surface of the wing 2730 as illustrated in FIG. 27. In other embodiments, the sensor may be disposed on a forward end or a lower surface of the wing. The sensor 2732 may be an electrical conductivity sensor (e.g., one or more electrical conductivity probes), a temperature sensor (e.g., one or more thermocouple probes), a moisture sensor (e.g., a reflectivity sensor), an organic matter sensor (e.g., a reflectivity sensor), a pH sensor (e.g., a reflectivity sensor), a residue sensor (e.g., a reflectivity sensor), or a seed sensor (e.g., a reflectivity sensor).

Each wing 2730 preferably includes a fluid outlet 2734. The fluid outlet 2734 is preferably in fluid communication with a source of fluid (e.g., a fertilizer comprising pop-up starter, a fertilizer comprising nitrogen, a pesticide, or an herbicide). The fluid outlet 2734 may be in fluid communication with the source of fluid via an internal channel formed in the wings and/or the firmer body, where the internal channel is in fluid communication with a liquid supply tube placing the seed firmer 2700 in fluid communication with the source of fluid. The source of fluid may be mounted on the row unit, on the toolbar, elsewhere on the planter, on a separately drawn cart, or on the tractor. In the illustrated embodiment, the fluid outlet 2734 is formed in a transversely distal end of the wing 2730. In other embodiments, the fluid outlet 2734 may be formed in a transversely medial portion of the wing 2730 or adjacent to the firmer body 2710. In the illustrated embodiment, the fluid outlet 2734 is formed in a lower surface of the wing 2730 and disposed to dispense fluid in a generally downward direction (e.g., normal to the lower surface of the wing). In other embodiments, the fluid outlet 2734 may be formed in the outer distal tip of the wing 2730 and disposed to dispense fluid in an outboard direction. In other embodiments, the fluid outlet 2734 may be formed in an upper surface of the wing 2730 and disposed to dispense fluid in a generally upward direction (e.g., normal to the upper surface of the wing). The fluid outlet 2734 is preferably laterally spaced from the transverse center of the firmer body 2710 by a distance selected to avoid "burning" seed placed in the bottom of the trench with the liquid applied through the fluid outlet. For example, the fluid outlet 2734 may be laterally spaced from the transverse center of the firmer body 2710 by a distance between 0.5 inches and 3 inches (13 mm and 76 mm), e.g., 1 inch (25 mm), 1.5 inches (38 mm), or 2.5 inches (64 mm).

It should be appreciated that the firmer embodiment 2700 may additionally comprise the other sensors described herein, e.g., those disposed on the bottom of the firmer body 2710).

Turning to FIGS. 31-36, an embodiment of another firmer 3100 is illustrated having wings 3132 configured to create an opening in the sidewall of the planting trench and injection needles 3150 for injecting liquid (e.g., fertilizer such as nitrogen) into the opening.

Figure 35:
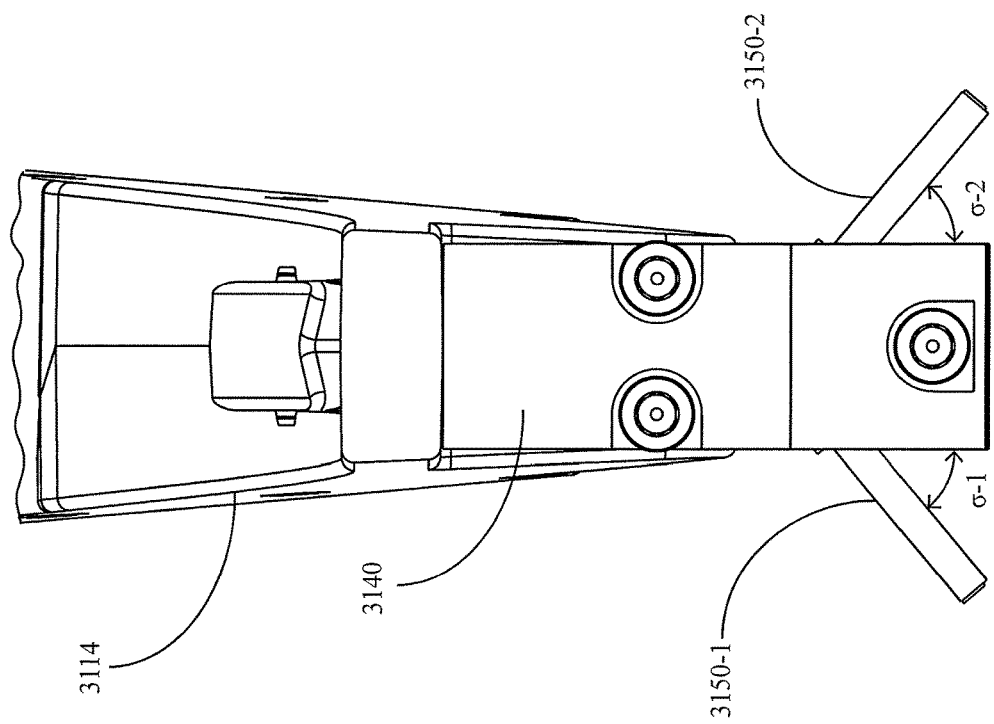
FIG. 35 is a rear elevation view of the seed firmer of FIG. 31.

The firmer body 3110 preferably includes a flexible portion 3112 for maintaining a resilient downward force on a tail portion 3114 of the firmer body as the firmer 3100 traverses the soil. A ground-engaging portion 3120 is preferably mounted to the tail portion 3114 and is preferably disposed to engage the trench and firm seeds at the bottom of the trench into the soil. Left and right wings 3132-1, 3132-2 and the injection needles 3150 preferably extend from the firmer 3100 at a downward angle (e.g., an angle σ from vertical as illustrated in FIG. 35). The angle σ may be between 10 and 80 degrees (e.g., 45 degrees). A forward-facing edge 3134 of each wing 3132 preferably cuts into the soil and is preferably in a swept-back orientation, that is, angled backward relative to a horizontal lateral (i.e., normal to the implement travel direction) plane at an angle between 10 and 80 degrees (e.g., 30 degrees, 45 degrees, or 70 degrees).

Figure 36:
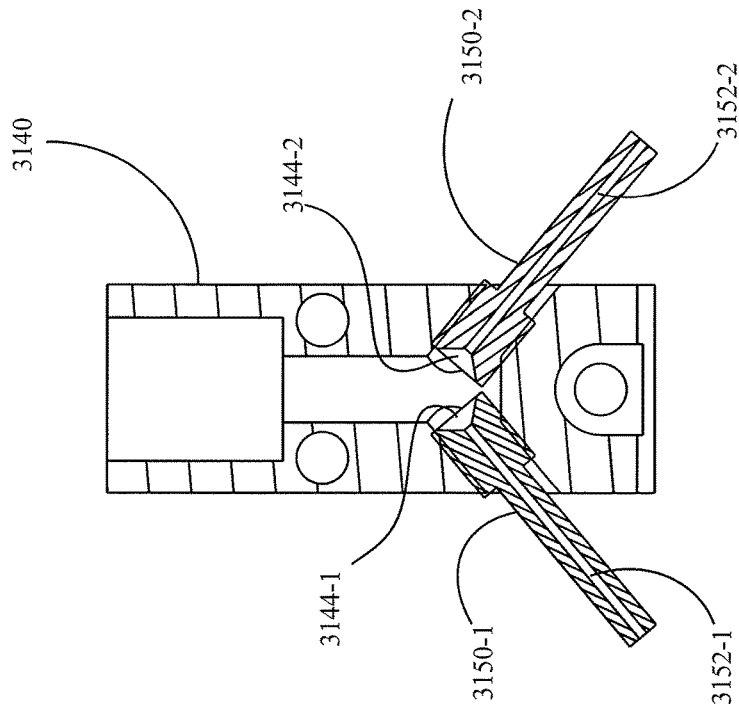
FIG. 36 is a cross-sectional view of the seed firmer of FIG. 31 along the cross-section A-A of FIG. 33.

A manifold 3140 is preferably configured to receive liquid and distribute the liquid to the trench (e.g., to the openings created by the wings 3132). As illustrated in FIG. 36, the liquid is preferably introduced to an inlet 3142 in the manifold 3140 by a flexible tube (not shown). The inlet 3142 is preferably in fluid communication with interior conduits 3152 of each injection needle 3150 via outlets 3144.

In installation, a wing body 3130 is preferably inserted into a slot 3122 in the ground-engaging portion 3120. The wing body 3130 is preferably retained in the slot 3122 by mounting the manifold 3140 to a terminal end of the ground-engaging portion 3120. It should be appreciated that the wing body 3130 may be removed and replaced by removing the manifold 3140 (e.g., by removing the bolts illustrated in FIG. 35). The injection needles 3150 may be removably inserted into the manifold 3140 (e.g., by threading) or permanently installed in the manifold (e.g., by pressing, welding, brazing or adhesive).

In operation, the wings 3132 preferably open side trenches 37 in the sidewalls of the trench 38 and liquid is pumped from a liquid source through the injection needles 3150 into the side trenches. It should be appreciated that the position of the injection needles 3150 directly behind the wings 3132 permits the injection needles to ride through the side trenches opened by the wings as the implement traverses the field.

In some embodiments, the wings 3132 may be supplemented or replaced with other firmer-mounted structure configured to open the side trenches 37. In some examples, a moving cutting surface such as a rotating circular blade may be provided on the side of the seed firmer to open the side trenches 37. In some embodiments, the wings may be omitted. In some such embodiments, the injection needles may be omitted and liquid applied through an opening flush with or raised slightly from the surface of the seed firmer. In some such embodiments, the opening may be relatively small and the applied liquid pressure increased in order to insert liquid into the sidewalls of trench 38 by spraying pressurized liquid into the sidewalls rather than or in addition to opening side trenches 37.

In some embodiments, the injection needles and wings (or similar structure for opening side trenches and injecting liquid) may be provided on structure other than a seed firmer disposed to open and fertilize side trenches in the planting trench 38 or another trench. In some examples, the injection needles and wings may be mounted to shank extending into the trench (e.g., to a modified embodiment of the shank 254), to the closing wheel assembly, or to an additional bracket or mounting structure depending from the row unit.

It should be appreciated that the various components of the firmer embodiment 3100 may have varying material properties. The flexible portion 3112 tail portion 3114 may be made of plastic, such as a nylon or acetal (e.g., Delrin). The ground-engaging portion 3120 may be made of metal such as steel or cobalt. The ground-engaging portion 3120 may be provided with a wear-resistant insert or layer such as tungsten carbide. The ground-engaging portion 3120 may be provided with a non-stick coating such as Teflon. The wings 3132 may be made of a metal such as steel or stainless steel. The edge 3134 of each wing and/or the entire wing 3132 may be provided with a wear-resistant layer such as tungsten carbide. The injection needles 3150 may be made of a metal such as steel or stainless steel. The manifold 3140 may be made of an acetal (e.g., Delrin), a nylon, a plastic, or a metal (e.g., aluminum, steel, or powdered metal).

In other embodiments, alternatively to or in addition to creating side trenches in the sidewalls of the trench for application of liquid adjacent to the trench, left and right opener disc assemblies may be used to open adjacent trenches transversely adjacent to the trench (e.g., two inches from the center of the trench and/or immediately adjacent to the edge of the trench) and liquid conduits may be used to direct liquid fertilizer into the adjacent trenches. The opener disc assemblies may each comprise a single disc coulter (e.g., vertical disc coulter) or a pair of opening discs configure to open a v-shaped trench similar to the planting trench. The systems and methods described herein for controlling the amount and type of liquid applied to the side trenches could also be used to control the amount and type of liquid applied to the adjacent trenches.

In other embodiments, alternatively to or in addition to creating side trenches in the sidewalls of the trench for application of liquid adjacent to the trench, left and right liquid conduits may be used to direct liquid fertilizer to positions on the soil surface adjacent to the trench (e.g., two inches from the center of the trench and/or immediately adjacent to the edge of the trench). The systems and methods described herein for controlling the amount and type of liquid applied to the side trenches could also be used to control the amount and type of liquid applied to the soil surface adjacent to the trench.

Figure 37:
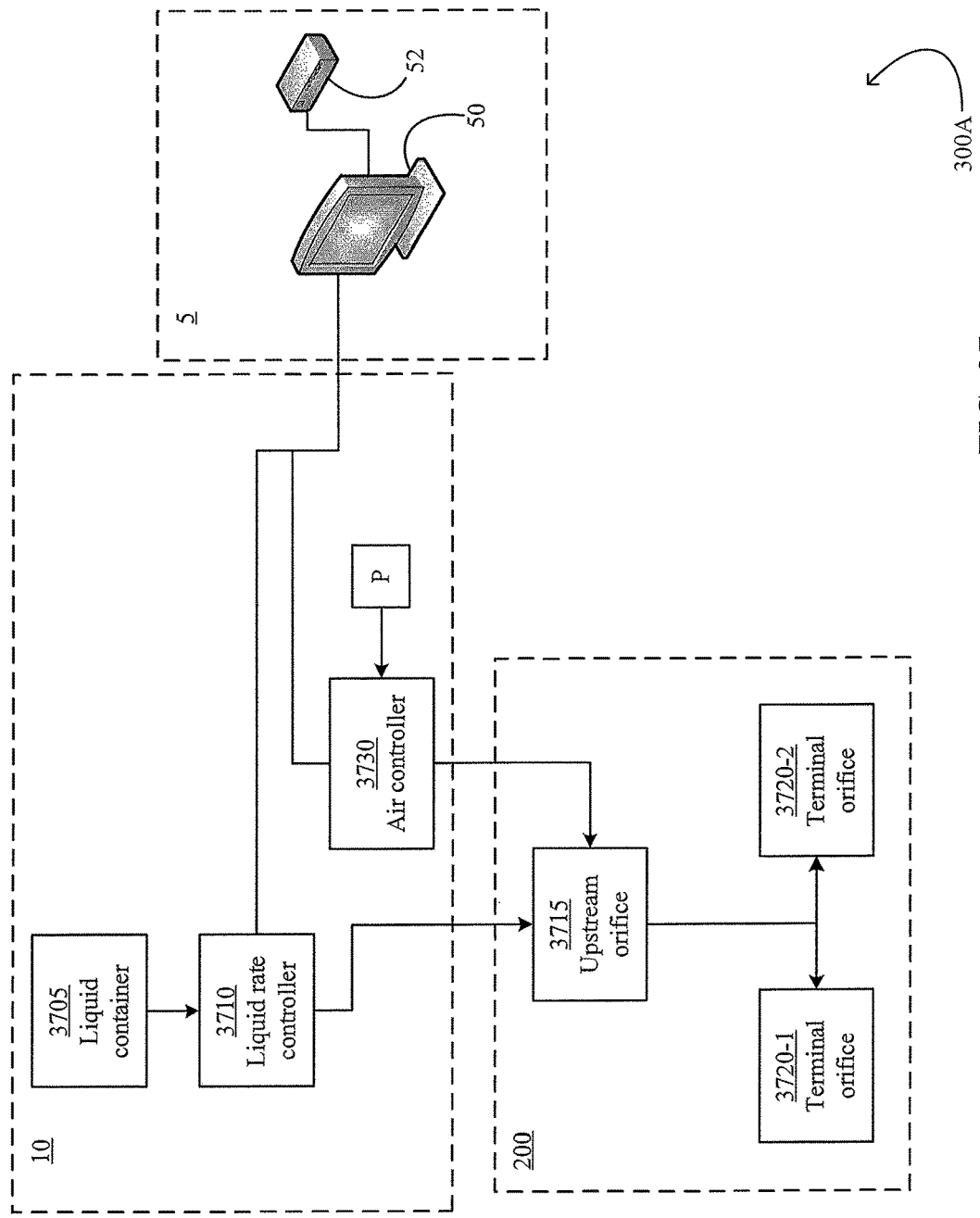
FIG. 37 schematically illustrates another embodiment of a soil monitoring system.

Referring to FIG. 37, an embodiment 300A of the system 300 of FIG. 3 is illustrated additionally including apparatus and systems for applying liquid to a trench or trenches (e.g., side trenches opened in the sidewalls of one or more planting trenches opened by planting row units 200). A processor such as implement monitor 50 is preferably in data communication (e.g., electrical or wireless communication) with one or more liquid rate controllers 3710 configured to control the flow rate and/or pressure at which liquid is dispensed from a liquid container 3705 which may be supported by the implement 10. The liquid rate controller may comprise a variable rate pump and/or a fluid control valve. The liquid container 3705 is preferably in fluid communication with a plurality of row units 200, preferably via the liquid rate controller 3710. The system 300 may include one liquid rate controller in fluid communication with all or a subset (e.g., a planter section) of the row units 200 supported on the toolbar 14. In other embodiments, a separate liquid controller may be associated with each row unit 200 for controlling the flow rate and/or pressure of liquid application at that row unit; in such embodiments, each liquid controller may be mounted to its associated row unit. In operation of the system 300A, the liquid rate controller or controllers 3710 preferably varies the application rate as the implement traverses the field based on a prescription map associating desired application rates with locations (e.g., geo-referenced locations, rasters, management zones, polygons) in the field. In some such embodiments, locations in the field having common soil type or other soil characteristic may be associated with common flow rates.

Continuing to refer to FIG. 37, the system 300A may further include one or more orifices for controlling the rate of liquid application. The orifices are preferably removable and replaceable by the operator, e.g., to select a different rate of liquid application. In some embodiments, the liquid rate controller 3710 is in fluid communication with an upstream orifice 3710. The upstream orifice 3715 may comprise a replaceable orifice plate selected from a group of orifice plates having varying orifice widths (e.g., those available from Schaffert Mfg. Co. in Indianola, Nebr. or TeeJet in Wheaton, Ill.). In other embodiments, the upstream orifice 3715 may comprise a replaceable flexible tube selected from a group of flexible tubes having varying inner diameters. In some embodiments, the liquid rate controller 3710 is in fluid communication with one or more terminal orifices 3720. The terminal orifices may be disposed at a terminal end of a fluid transmission line (e.g., flexible tube). For example, liquid may exit the terminal orifices 3720 directly into the trench or side trench. In some embodiments, the terminal orifices 3720 may comprise the liquid injection needles 3150 (see FIG. 36), which may be selected from a group of injection needles having varying inner diameters. In some embodiments, the terminal orifices 3720 may comprise removable orifices disposed at or near the terminal ends of the injection needles 3150. In some embodiments, the terminal orifices may comprise the smallest orifice in the system 300A.

Continuing to refer to FIG. 37, in some embodiments the system 300A may further include an air controller 3730 for selectively directing and/or varying the rate of air flow from an air pressure source P (e.g., an impeller such as a blower used to supply seed from a bulk fill tank to the row units 200) to the row units 200 (e.g., through the upstream orifice 3715 or the terminal orifices 3720). The air controller 3700 may comprise a shutoff valve and/or a flow control valve. The monitor 50 is preferably in data communication with the air controller 3730 and preferably selectively opens and/or varies the rate of air flow to the row unit 200 (e.g., to the firmer 3100). In operation, the air controller 3730 may be opened or a flow rate selected based on a manual input (e.g., an input into the GUI of the monitor 50). In other embodiments, the air controller 3730 may be opened or a flow rate selected upon identification of a predetermined event (e.g., a time period, activation of the liquid rate controller, deactivation of the liquid rate controller, or a signal from the liquid rate controller or flow sensor indicating flow rates through one or more upstream orifices 3715 and/or terminal orifices 3720).

Figure 38:
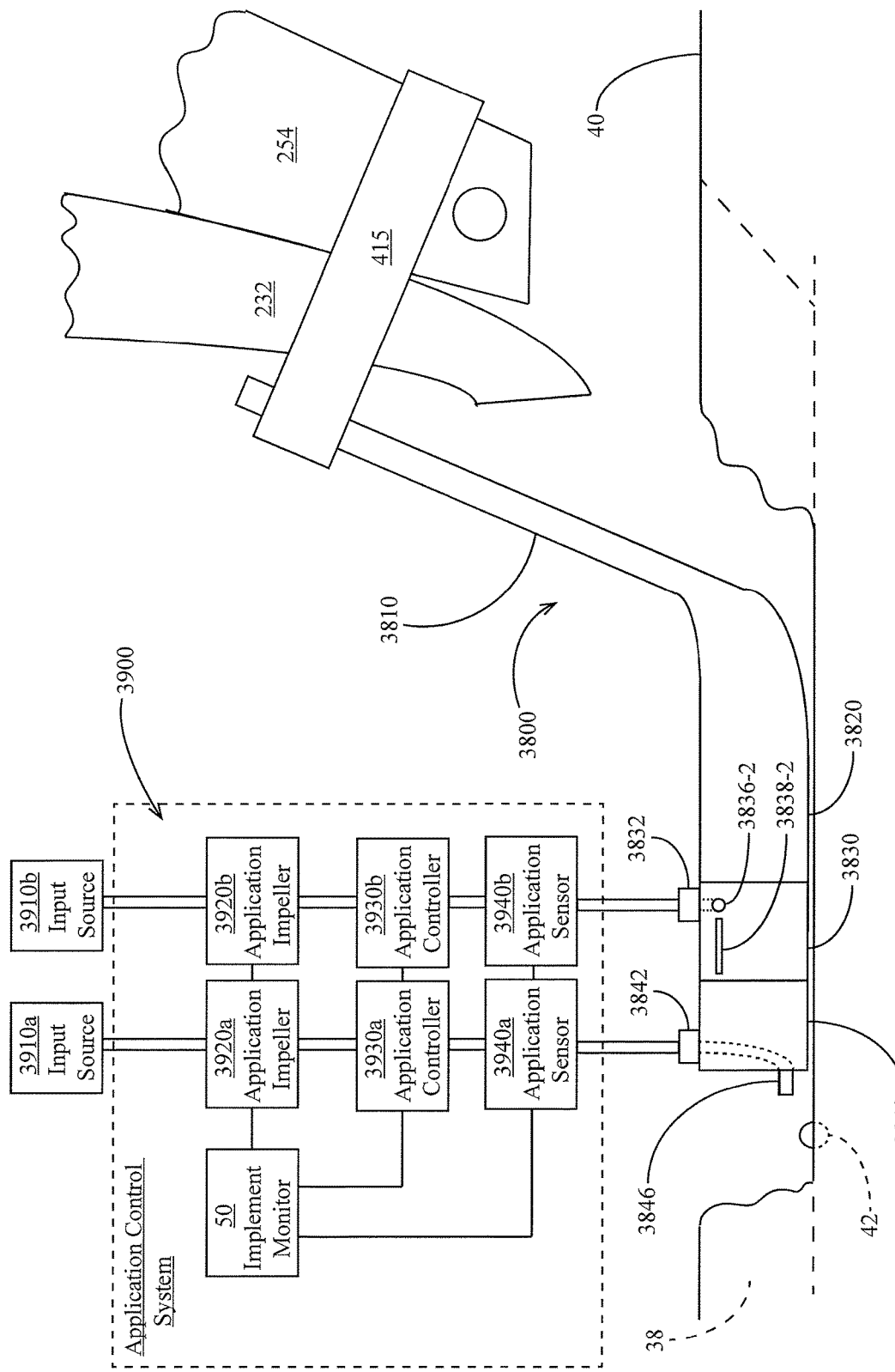
FIG. 38 is a side view of an embodiment of a seed firmer and schematically illustrates an application control system.
Figure 39:
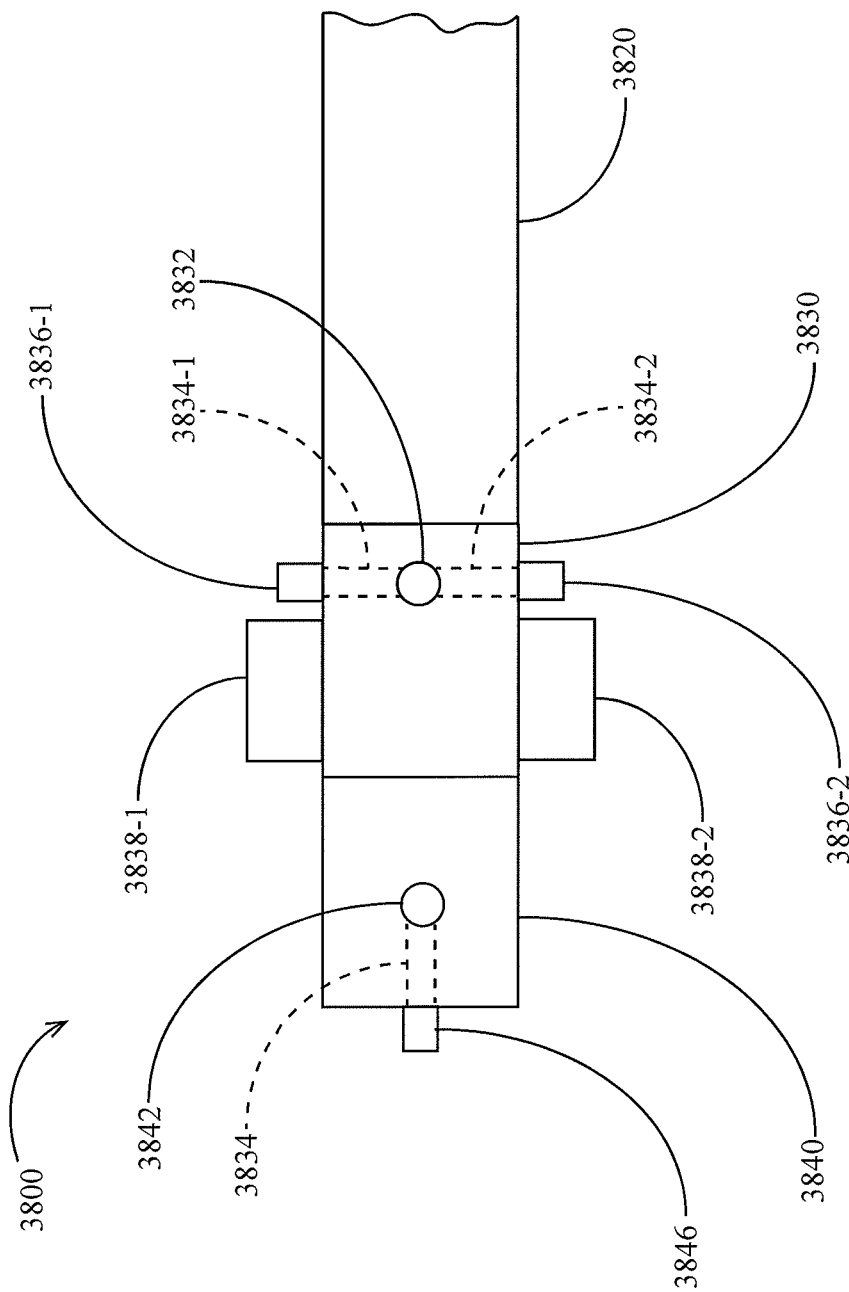
FIG. 39 is a partial top plan view of the seed firmer of FIG. 38.

Turning to FIGS. 38 and 39, an embodiment of another seed firmer 3800 having liquid application features is illustrated. It should be appreciated that the application of liquid by the seed firmer 3800 may also be accomplished in other embodiments by other structure on a planter or other implement.

The seed firmer 3800 preferably includes a flexible portion 3810 mounted to the planter and configured to resiliently impose a downpressure on a tail portion 3820 of the seed firmer. The seed firmer 3800 also preferably includes a side application portion 3830 and an in-furrow application portion 3840. The portions 3830, 3840 may comprise modular components which may be selectively mounted to the tail portion 3820 and/or each other. In other embodiments, the portions 3820, 3830, 3840 may alternatively comprise portions of a single unitary component.

The side application portion 3830 preferably includes a left wing 3838-1 and a right wing 3838-2 disposed to open side trenches in the main seed trench 38. The wings 3838 are preferably extend generally horizontally from the side of the seed firmer 3800. The wings 3838 are preferably disposed toward a vertically upper end of the side application portion 3830. The side application portion 3840 also preferably includes a liquid application inlet 3832 in fluid communication with a left liquid outlet 3836-1 and a right liquid outlet 3836-2, preferably via interior conduits 3834-1 and 3834-2, respectively. In operation, the wings 3838 preferably open side trenches in the seed furrow and liquid (e.g., fertilizer) is placed in the side trenches through the liquid outlets 3836.

The in-furrow application portion 3840 preferably includes a liquid application inlet 3842 in fluid communication with a liquid outlet 3846, preferably via an interior conduit 3834. The liquid outlet 3846 is preferably disposed to deposit liquid in the seed furrow. The liquid outlet 3846 may be disposed to deposit liquid directly on seeds 42 in the seed furrow. In other embodiments, the liquid outlet 3846 may comprise a splitter having two outlets disposed to deposit liquid on the sidewalls of the seed furrow.

Referring again to FIG. 38, an application control system 3900 is illustrated in fluid communication (e.g., via flexible hose) with the liquid inlets 3832, 3842 for supplying fluid to be applied via the fluid outlets 3836, 3846, respectively. Each of the liquid inlets 3832, 3842 is preferably in fluid communication with an application sensor 3940 (e.g., fluid flow rate sensor, fluid pressure sensor, fluid blockage sensor), an application controller 3930 (e.g., fluid flow control valve, fluid pressure control valve, on-off fluid solenoid valve, selectively sizable and/or replaceable fluid orifice), and an application impeller (e.g., liquid pump). Each of the application impeller 3920, application controller 3930, and application sensor 3940 are preferably in data communication (e.g., electronic communication, electrical communication, wireless communication) with the implement monitor 50 for receiving control signals from the implement monitor and for reporting measurement and other output signals to the implement monitor. The application control system 3900 is preferably in fluid communication with one or more input sources 3910 (e.g., via flexible hose).

In operation, the application impeller 3920 impels fluid from the input source 3910 at a rate that may be controlled by the implement monitor 50. The application controller selectively controls a fluid flow parameter (e.g., pressure, flow rate) of fluid being impelled from the input source 3910. A fluid flow parameter (e.g., pressure, flow rate) of fluid from the input source 3910 is preferably measured by the application sensor 3940 before the fluid enters the liquid 3842 and/or 3832.

In the illustrated embodiment, each of the liquid inlets 3832, 3842 are in fluid communication with separate input sources, application impellers, application controllers, and application sensors. In some implementations of such an embodiment, the input sources 3910a and 3910b may contain different fluids (e.g., different types of fertilizer, liquid insecticide). In some examples the input source 3910 contains a fertilizer comprising phosphorous, potassium and nitrogen (e.g., 7-23-5 starter fertilizer such as XLR-rate starter fertilizer available from CHS Inc. in Grove Heights, Minn.) for in-furrow application via the fluid outlet 3846 and the input source 3910b contains a fertilizer comprising nitrogen (e.g., 28% nitrogen fertilizer). In such an embodiment or in other embodiments, an in-furrow application rate maintained by the application impeller 3920a and/or controller 3930a is less than a side trench application rate (i.e., the total rate applied to both side trenches) maintained by the application impeller 3920b and/or controller 3930b. For example, the in-furrow application rate may be in a range of 0 to 5 gallons per acre (0 to 468 liters per hectare) while the side trench application rate (i.e., the total rate applied to both side trenches) may be in a range of 5 to 15 gallons per acre (47 to 140 liters per hectare). It should be appreciated that rate of application in the embodiments disclosed herein may be controlled by determining a fluid application rate required to obtain a desired application rate per area (e.g., gallons per acre or liters per hectare) based on implement width, number of liquid application rows, and a speed reported by a speed sensor (e.g., radar, GPS system).

In some embodiments, a single application control system 3900 may be in fluid communication with the liquid inlets 3842 and/or 3832 on a plurality of seed firmers 3800 (e.g., firmers within a section or subset of row units on the planter or all of the firmers on the planter), or only on a single seed firmer 3800 in order to provide row-by-row control and monitoring of in-furrow and/or side trench application.

Figure 40:
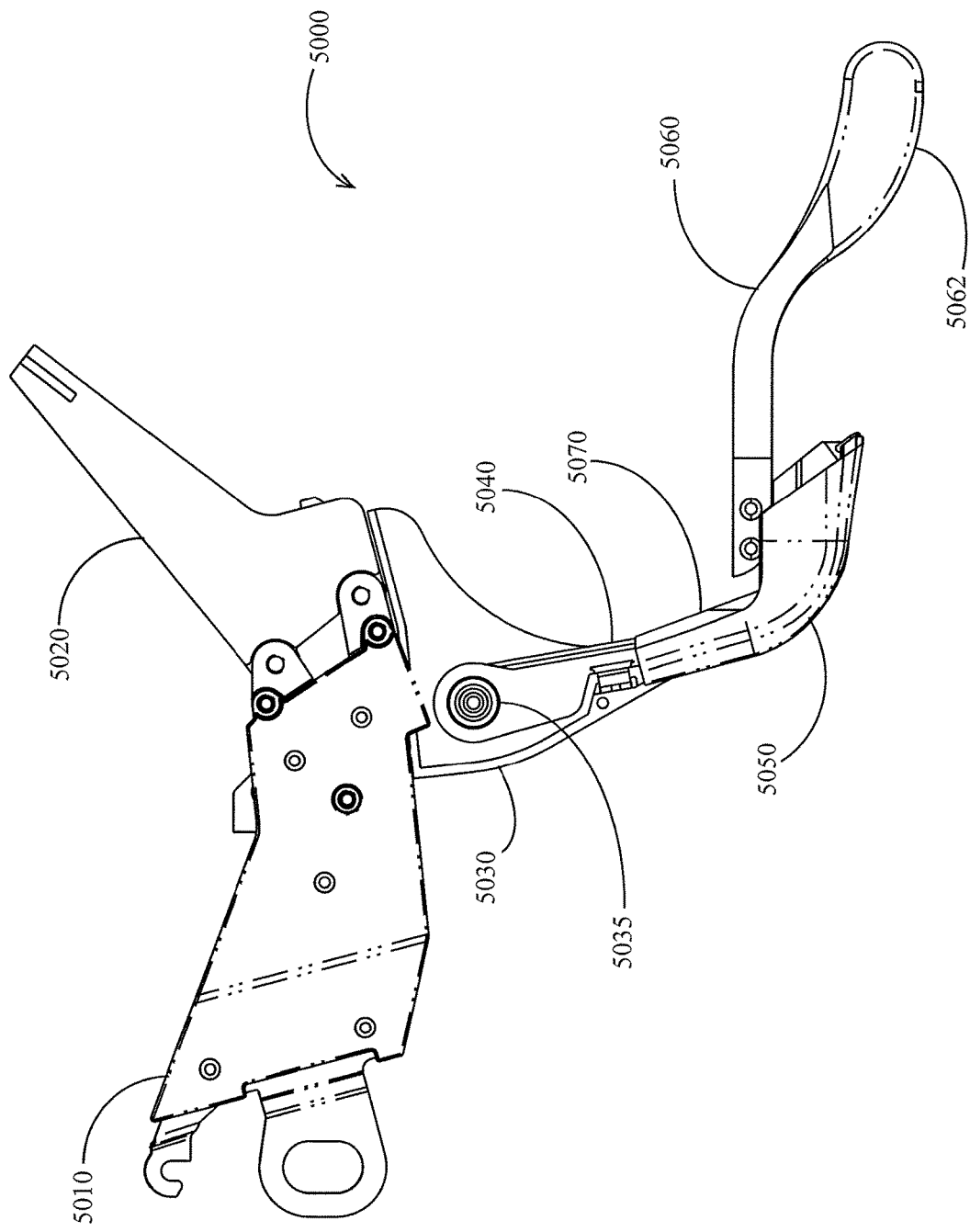
FIG. 40 is a side elevation view of an embodiment of a liquid application assembly.
Figure 41:
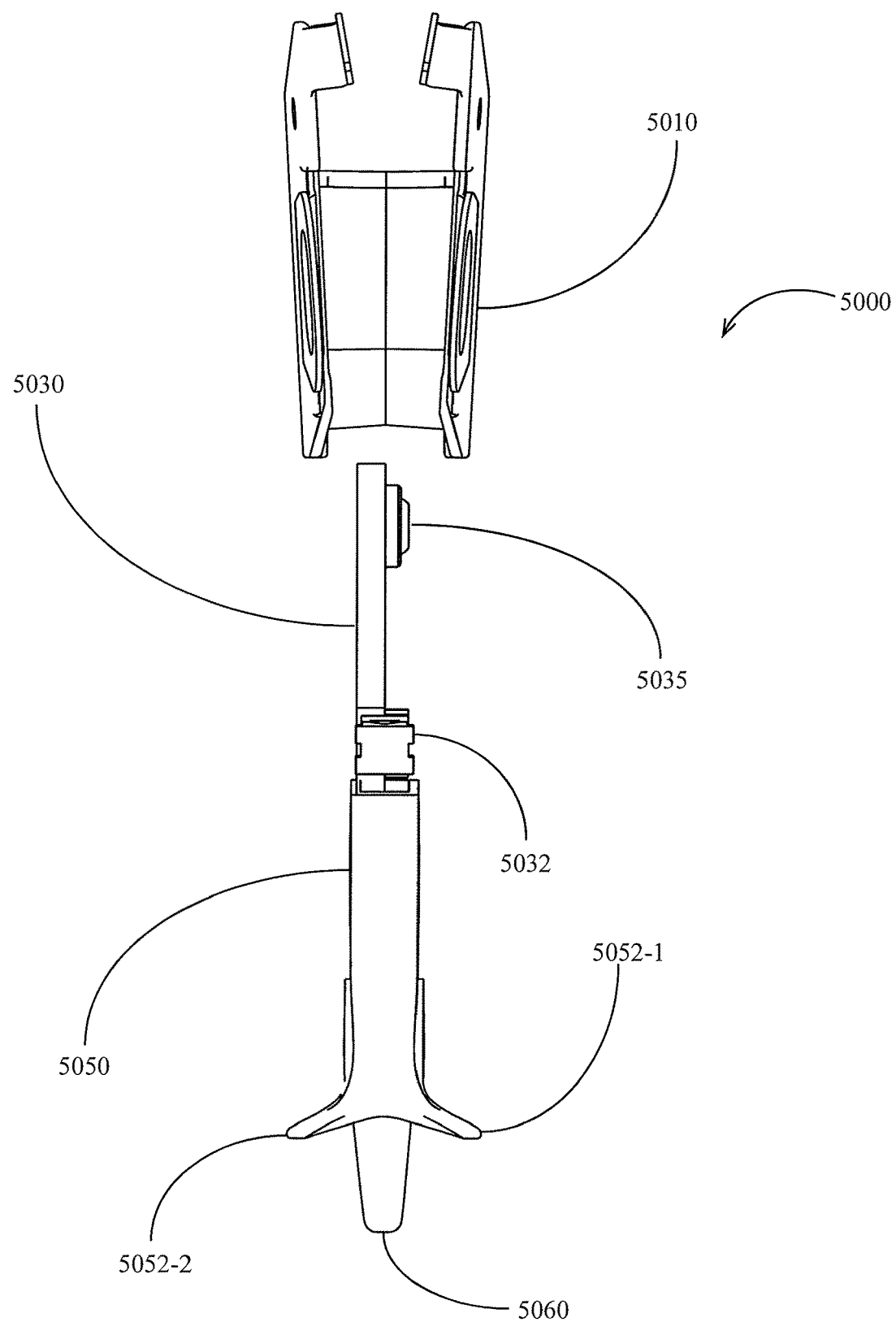
FIG. 41 is a front elevation view of the liquid application assembly of FIG. 40.
Figure 42:
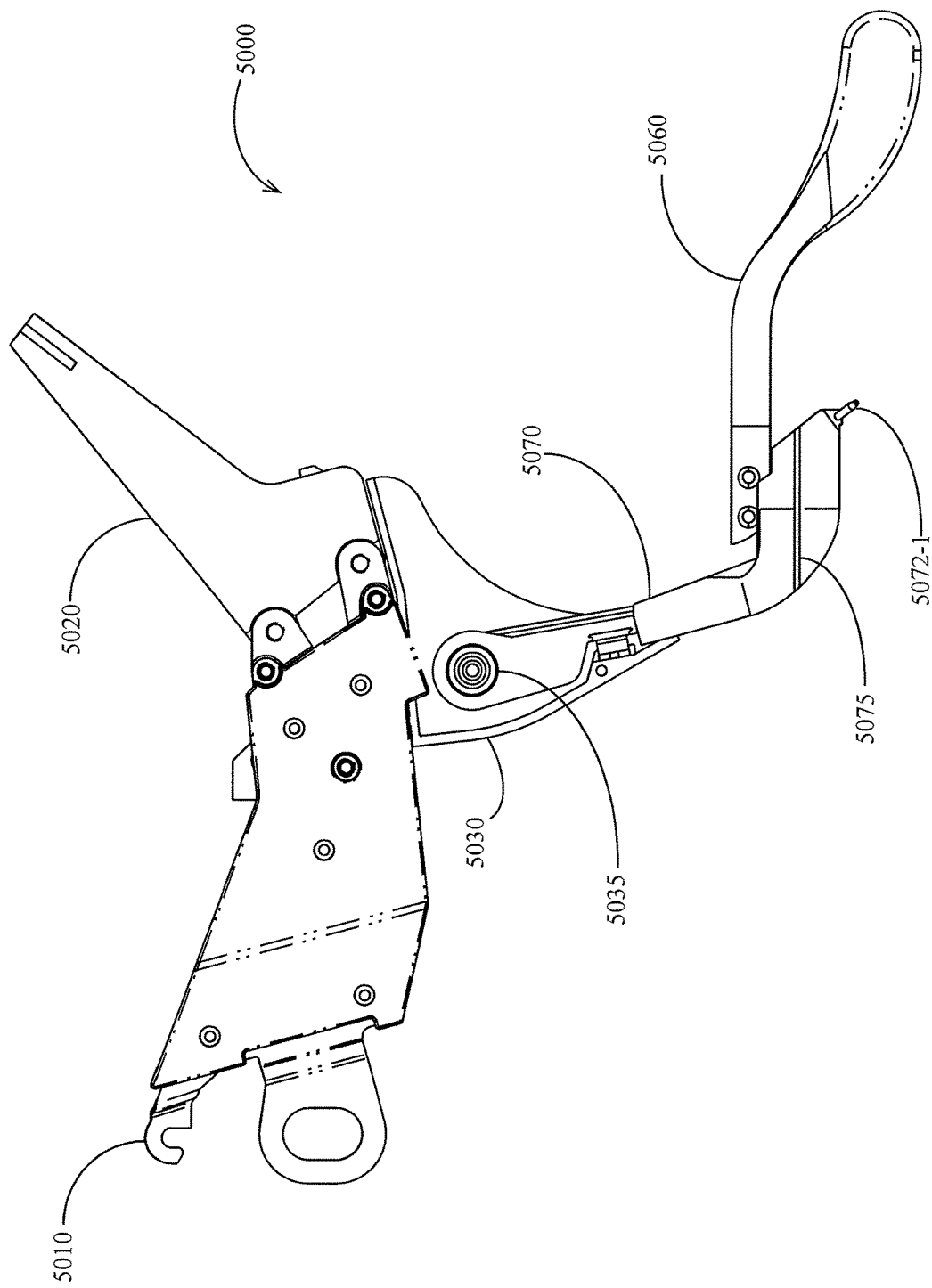
FIG. 42 is a side elevation view of the liquid application assembly of FIG. 40 with a side trench opener removed.

Turning to FIGS. 40-42, an embodiment of a liquid application assembly 5000 is illustrated. The liquid application assembly 5000 is preferably mounted to the shank of an implement such as a planter row unit (or in some embodiments to another component of the planter or row unit, e.g., a seed tube or seed conveyor of the row unit) at a forward end by a mounting bracket 5010. The liquid application assembly 5000 may be stabilized (e.g., parallel to or perpendicular to the implement direction of travel) by a stabilization arm 5020. The stabilization arm may be mounted at a forward end to the mounting bracket 5010 and at a rearward end to a component of the implement (e.g., to the row unit subframe and/or closing wheel assembly of a planter row unit).

A shank 5030 of the liquid application assembly 5000 preferably extends downward toward the soil. A pivot arm 5040 is preferably pivotally mounted to the shank 5030 at a pivot 5035, preferably for pivoting about an axis perpendicular to the implement direction of travel. A biasing member (e.g., a spring such as a torsional spring) preferably biases the pivot arm 5040 (e.g., along the clockwise direction on the view of FIG. 40) against a stop 5032. A liquid conduit 5070 is preferably rigidly mounted to the pivot arm. In some embodiments the vertical position of the liquid conduit 5070 is preferably adjustable by the user such as by sliding the liquid conduit to a desired vertical position and then selectively locking a locking mechanism to rigidly fix the liquid conduit to the pivot arm. The liquid conduit preferably includes a liquid inlet (not shown) in fluid communication with two outlets 5072-1, 5072-2 which preferably extend into the left and right sidewalls of the trench, respectively.

A side trench opener 5050 is preferably removably mounted to the liquid conduit 5070; (e.g., by being slidingly received in a slot 5075 formed in the liquid conduit). The side trench opener 5050 preferably includes wings 5052-1, 5052-2 which preferably extend into the left and trench sidewalls respectively. The wings 5052-1, 5052-2 are preferably positioned forward of the outlets 5072-1, 5072-2 respectively such that the outlets extend into side trenches opened by the wings during operation. In operation, liquid such as liquid fertilizer is preferably applied to the side trenches via the outlets 5072. The liquid application assembly 5000 preferably includes a seed firmer 5060 having a ground-engaging portion 5062 which preferably resiliently engages the bottom and sidewalls of the trench during operation.

In operation, the spring bias of the pivot arm 5040 against the stop 5032 preferably retains the side trench opener in a ground-engaging position in which the wings form side trenches at a first desired vertical position (i.e., depth) along the sidewalls of the trench. If an obstruction (e.g., rock or hard soil) contacts the side trench opener as the implement traverses the field such that a counter-moment exceeding the spring bias (e.g., counter-clockwise on the view of FIG. 40) is imposed on the pivot arm, then the pivot arm 5040 preferably deflects (e.g., counter-clockwise on the view of FIG. 40) in order to pass over the obstruction without failure. It should be appreciated that a ground-engaging coulter, blade or other device could be mounted the biased pivot arm instead of or in addition to the side trench opener and liquid conduit such that the other ground-engaging device would likewise deflect to avoid obstructions.

In some embodiments, the pivot 5035 is a spherical bearing or other joint permitting the pivot arm 5040 to pivot laterally. In these and other embodiments, the engagement of the seed firmer 5060 to the trench preferably determines the lateral position of the wings such that the wings move laterally as the lateral position of the trench varies during operation. Put otherwise, because the lateral position of the seed firmer 5060 is fixed by engagement with the sidewalls of the trench and the seed firmer and side trench opener are both rigidly fixed to the liquid conduit, variation in lateral position of the trench causes a corresponding lateral movement of the seed firmer, which causes corresponding lateral movement of the side trench opener. The lateral position of side trench opener (including the wings) is thus indexed to the lateral position of the trench, such that the extent to which the wings extend into the sidewalls of the trench is constant despite variation in lateral position of the trench. It should be appreciated that the position of the side trench opener relative to the trench may be accomplished by other ground-engaging structure such as a coulter or packer wheel.

It should be appreciated that in operation of liquid application assembly 5000, the vertical position of the seed firmer is preferably mechanically decoupled from the vertical position of the side trench opener such that the seed firmer (which engages the bottom of the trench) can deflect vertically over seeds and other objects while the side trench opener (which preferably does not engage the bottom of the trench) retains its vertical position and thus the vertical position (depth) of the side trenches opened by the wings.

In some embodiments, the seed firmer 5060 may be mounted to other components of the liquid application assembly 5000 and may be disposed to engage the trench at different positions relative to the location at which the side trench opener engages the trench. In some embodiments, the seed firmer 5060 may be mounted forward (e.g., to the left on the view of FIG. 40) of the side trench opener 5050. In some such embodiments the seed firmer may extend at least partially beneath the side trench opener. In some such embodiments, the seed firmer may also be resiliently biased against the trench by additional alternative structure such as a torsional spring.

In some embodiments, the liquid application assembly may additionally include liquid routing structure (e.g., flexible tubing, rigid pipes) positioned to apply liquid (e.g., the same or different type of liquid applied directly in the trench) to the soil surface to either or both sides of the trench.

Figure 43:
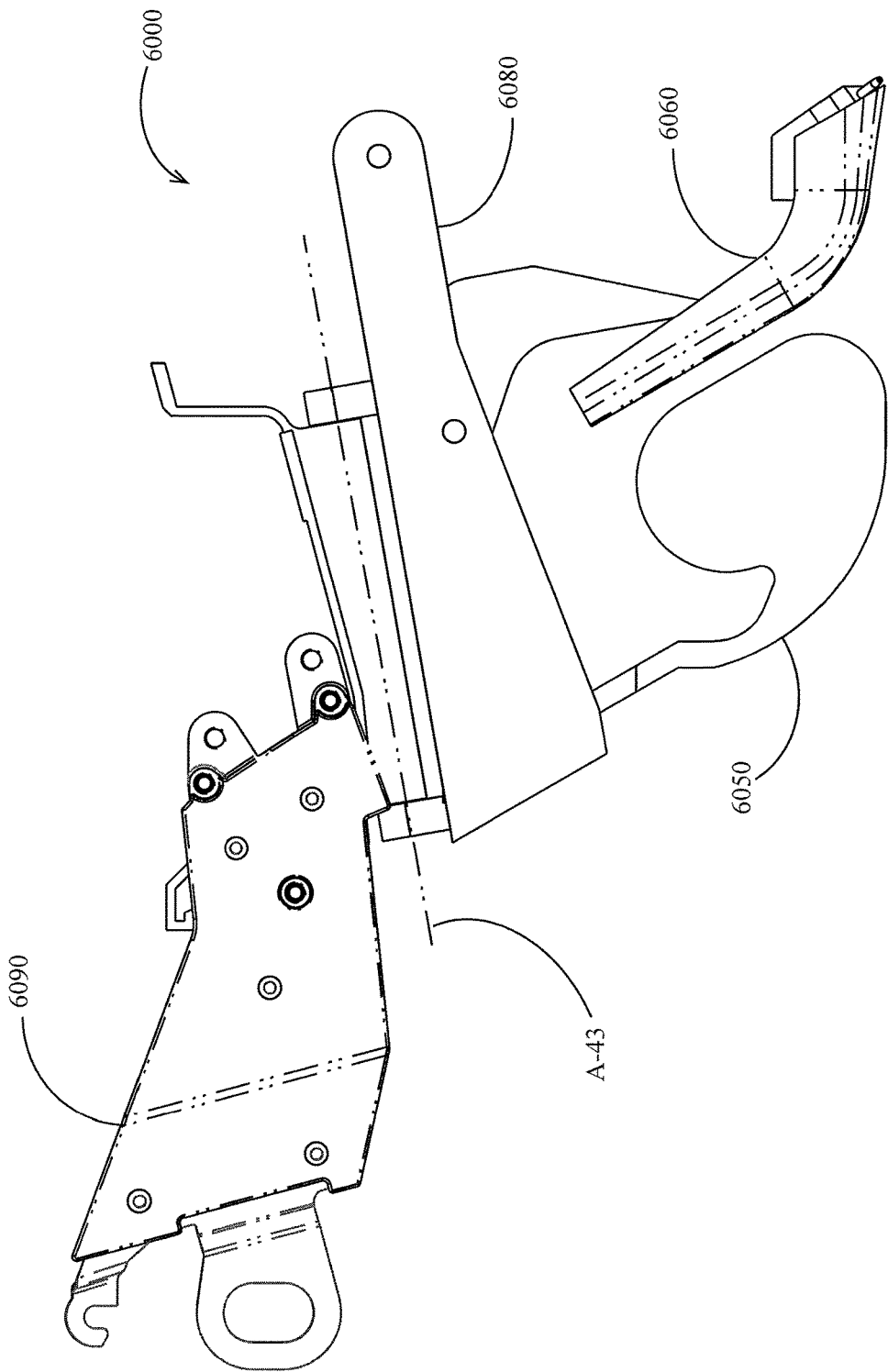
FIG. 43 is a side elevation view of another embodiment of a liquid application assembly.

Turning to FIG. 43, an embodiment of another liquid application assembly 6000 is illustrated. The assembly 6000 includes a seed firmer 6050 that resiliently engages the bottom of the trench longitudinally forward of a side trench opener 6060. In the assembly 6000, the firmer and side trench opener may be independently mounted to a mounting bracket 6080. The bracket 6080 may be pivotally mounted to a bracket 6090 which is preferably removably mounted to the row unit shank. The bracket 6080 preferably pivots about an axis A-43 with respect to the bracket 6090. The axis A-43 preferably intersects a vertical plane extending longitudinally and intersecting the bottom of the trench. Thus, the firmer 6050 and side trench opener 6060 are enabled to pivot about the axis A-43 during operation. Because the firmer 6050 preferably engages the bottom of the trench and is engaged on both sides by the trench sidewalls, the firmer preferably moves with the lateral position of the trench as the implement traverses the field, thus guiding or "ruddering" the lateral position of the side trench opener 6060 and maintaining consistent extension of the side trenches into the trench sidewalls. The side trench opener 6060 is preferably substantially similar to the side trench opener 5050 of FIG. 40, and thus, preferably includes a removable liquid conduit 6070 substantially similar to the liquid conduit 5070 for supplying liquid to the side trenches.

Figure 44:
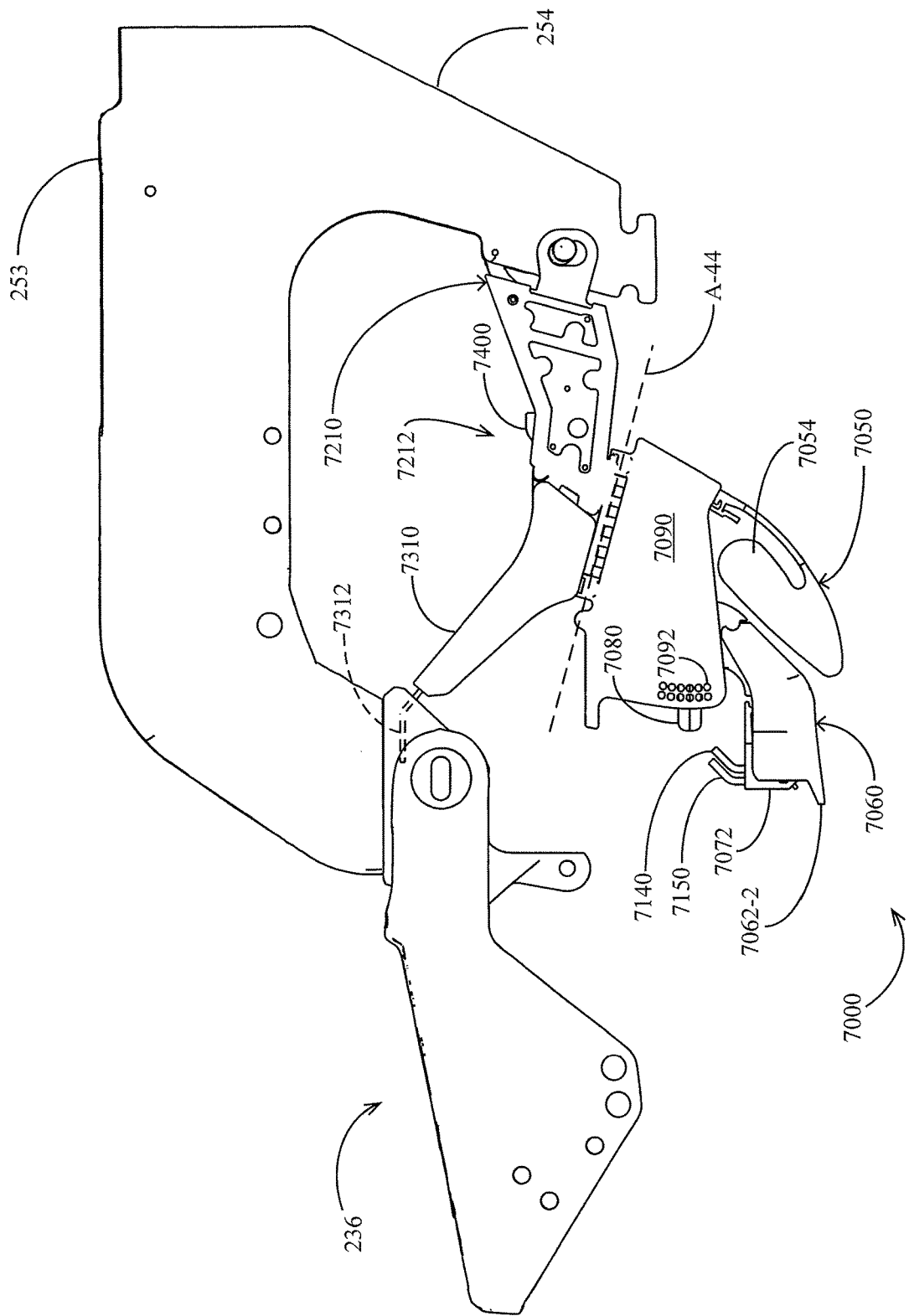
FIG. 44 is a side elevation view of an embodiment of a liquid application assembly in cooperation with a row unit subframe.
Figure 45:
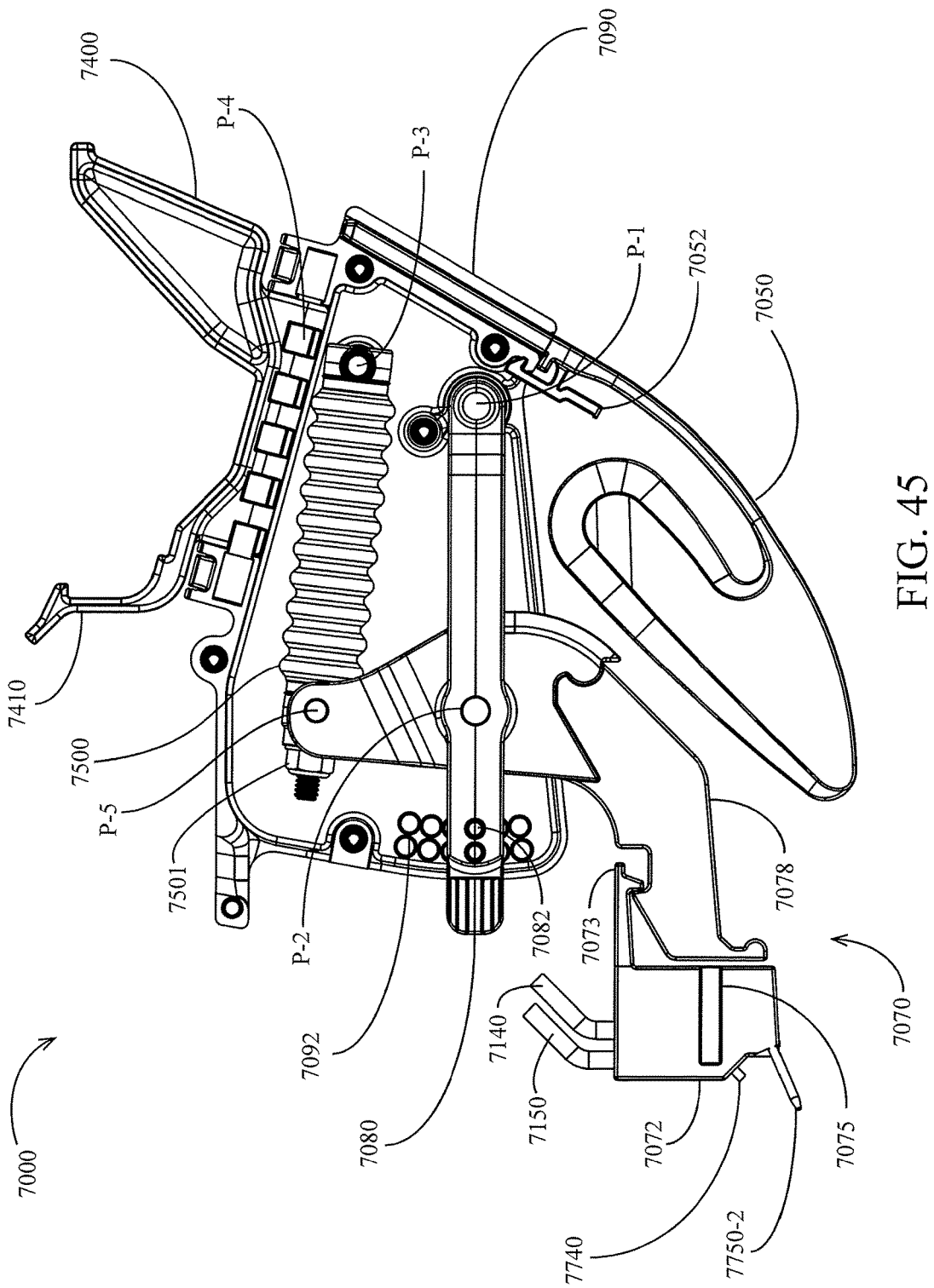
FIG. 45 is a side elevation view of the liquid application assembly of FIG. 44 with certain components cut away and/or not shown for clarity.
Figure 46:
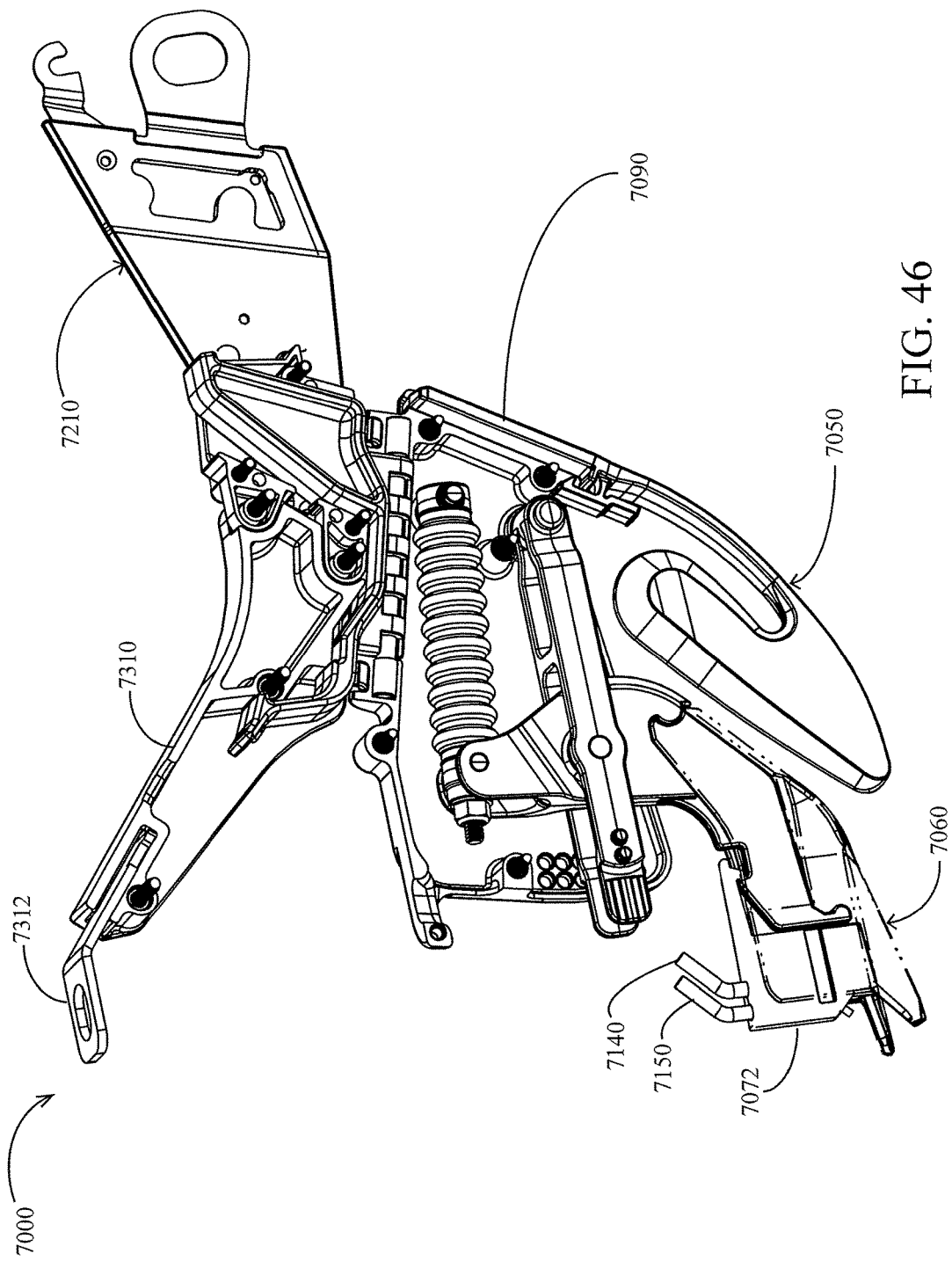
FIG. 46 is a perspective view of the liquid application assembly of FIG. 44 with certain components cut away and/or not shown for clarity, and with a wing body thereof shown in phantom lines.

Turning to FIGS. 44-46, an embodiment of another liquid application assembly 7000 is illustrated. A forward bracket 7210 is preferably mounted to the downwardly extending shank 254 of row unit subframe 253. A rearward bracket 7310 is preferably mounted to the row unit subframe 253 (e.g., by a tab 7312 which may be mounted by use of a bolt fixing the closing wheel assembly 236 to the row unit subframe 253). The forward bracket 7210 and rearward bracket 7310 preferably cooperate to retain an axis A-44 defined by a pivot P-4 of the liquid application assembly 7000 in alignment with the row unit subframe 253. The forward bracket 7210 may be mounted (e.g., by screws) to or formed as a unitary part with the rearward bracket 7310. A mounting insert 7400 is preferably received (e.g., in a first tool-less installation movement) at least partially within an opening 7212 in forward bracket 7210. A flexible tab 7410 of the mounting insert 7400 is preferably received (e.g., in a second tool-less installation movement) in an opening in the rearward bracket 7310. After installation, the mounting insert 7400 is preferably retained in position relative to the forward and rearward brackets until removal (e.g., tool-less removal) by deformation (e.g., rearward deformation) of the flexible tab 7410 and sliding the insert 7400 downward and out of the openings in the forward and rearward brackets.

Continuing to refer to FIGS. 44-46 and the liquid application assembly 7000, a housing 7090 is preferably pivotally mounted to the mounting insert 7400 about the pivot P-4 (e.g., a pin). The pivot P-4 preferably defines the axis A-44, which is preferably aligned with the opening discs and with the length of the planting trench 38. The axis A-44 preferably descends along the travel direction of the implement (e.g., to the right on the view of FIG. 44). Pivot P-4 allows the liquid application system to deform out of the way when rocks or other hard debris is encountered, and pivot P-4 can allow the liquid application system to turn and remain in the trench when the planter row unit turns.

A seed firmer 7050 of the liquid application assembly 7000 is preferably removably mounted (e.g., without the use of tools) to a forward end of the housing 7090 by partial insertion into the housing and attachment of a flexible tab 7052 to a lip of the housing 7090, which flexible tab may be released by deformation (e.g., without the use of tools) at a lower end thereof, permitting removal of the seed firmer from the housing 7090. When installed on the housing 7090, the seed firmer 7050 is preferably disposed in substantial longitudinal alignment with the planting trench 38 and preferably resiliently contacts the trench to firm seeds into a trough thereof. An upwardly extending portion 7054 of the seed firmer preferably blocks the flow and/or accumulation of residue between the seed firmer 7050 and the housing 7090 during planting operations. While the seed firmer 7050 is not required, including seed firmer 7050 provides the benefit of acting as a guide and/or rudder for keeping the liquid application system toward s the center of the trench.

A liquid placement sub-assembly 7070 is preferably mounted to the housing 7090. An arm 7078 of the liquid placement sub-assembly 7070 is preferably adjustably mounted to the housing 7090 as described in more detail below. A wing body 7060 of the liquid placement sub-assembly 7070 is preferably removably mounted to a lower end of the arm 7078 such that the position of the arm 7078 determines the position of wings 7062 of the wing body relative to the trench and thus the height of side trenches opened in the trench by the wings. A liquid manifold 7072 is preferably removably mounted to a rearward end of the arm 7078 (e.g., by mating a groove 7075 of the manifold with a corresponding internal tongue of the wing body 7060 and removably securing a flexible tab 7073 to the arm 7078) such that the position of the arm 7078 determines the position of injection needles 7750 extending from the manifold 7072 relative to the trench. The manifold 7072 preferably includes a first liquid inlet 7140 in fluid communication with a central outlet 7740 disposed to deposit liquid on the transverse center of the trench 38 (e.g., on top of seeds at the bottom of the trench) and a second liquid inlet 7150 in fluid communication with the injection needles 7750 for deposition into the sidewalls of the trench (e.g., into side trenches opened by the wings 7062). The injection needles 7750 are preferably disposed longitudinally rearward of the wings 7062 such that the injection needles extend into the side trenches created by the wings in the sidewalls of the trench.

The height of the arm 7078 is preferably adjustable by the user without the use of tools. For example, the arm 7078 may be mounted to a height adjustment arm 7080 which is pivotally mounted to the housing 7090 at a pivot P-1. The height of the arm 7078 is thus determined by the angular position of the height adjustment arm 7080 about the pivot P-1, which may be adjusted by selectively engaging pins 7082 of the arm 7080 in a subset of holes 7092 in the housing 7090, the holes 7092 having varying vertical positions (e.g., along a semi-circular path as illustrated). The pins 7082 may be selectively engaged and disengaged from the holes 7092 by deflecting (e.g., moving or compressing) the height adjustment arm 7080 relative to the housing 7090 for adjustment of the position of the height adjustment arm 7080.

The height and/or orientation of the wing body 7060 and/or the manifold 7072 is preferably resiliently displaceable during planting operations. For example, the arm 7078 may be pivotally mounted to the arm 7080 (e.g., at a pivot P-2), permitting the wing body and manifold to displace during operation (e.g., upon contact with residue or an obstruction in the field). However, to resiliently return the wing body and manifold to a desired position after deflection, a spring 7500 is preferably mounted to the housing 7090 at a first end thereof (e.g., at a pivot P-3) and to an upper end of the arm 7078 at a second end thereof (e.g., at a pivot P-5). The spring 7500 may be a tension spring, compression spring, coil spring, air spring, or other resilient device which is in an undeformed state when the arm 7078 is in a first (e.g., desired) position and which is in a deformed state when the arm 7078 is deflected into a second (e.g., undesired) position. Optionally, the tension in spring 7500 can be adjusted by fastener 7501.

It should be appreciated that the liquid placement subassembly 7070 and the seed firmer 7050 pivot with the housing 7090 such that both pivot about the axis P-4 relative to the row unit subframe 253. Thus, as the lateral position of the trench 38 relative to the row unit frame shifts transversely to the travel direction, the engagement of the seed firmer 7050 in the bottom of the trench causes the seed firmer to deflect transversely with the trench 38 and thus deflect (e.g., guide or "rudder") the liquid placement subassembly 7070 to pivot and deflect with the shift in trench position, thus ensuring desirable liquid placement relative to the trench.

Figure 47:
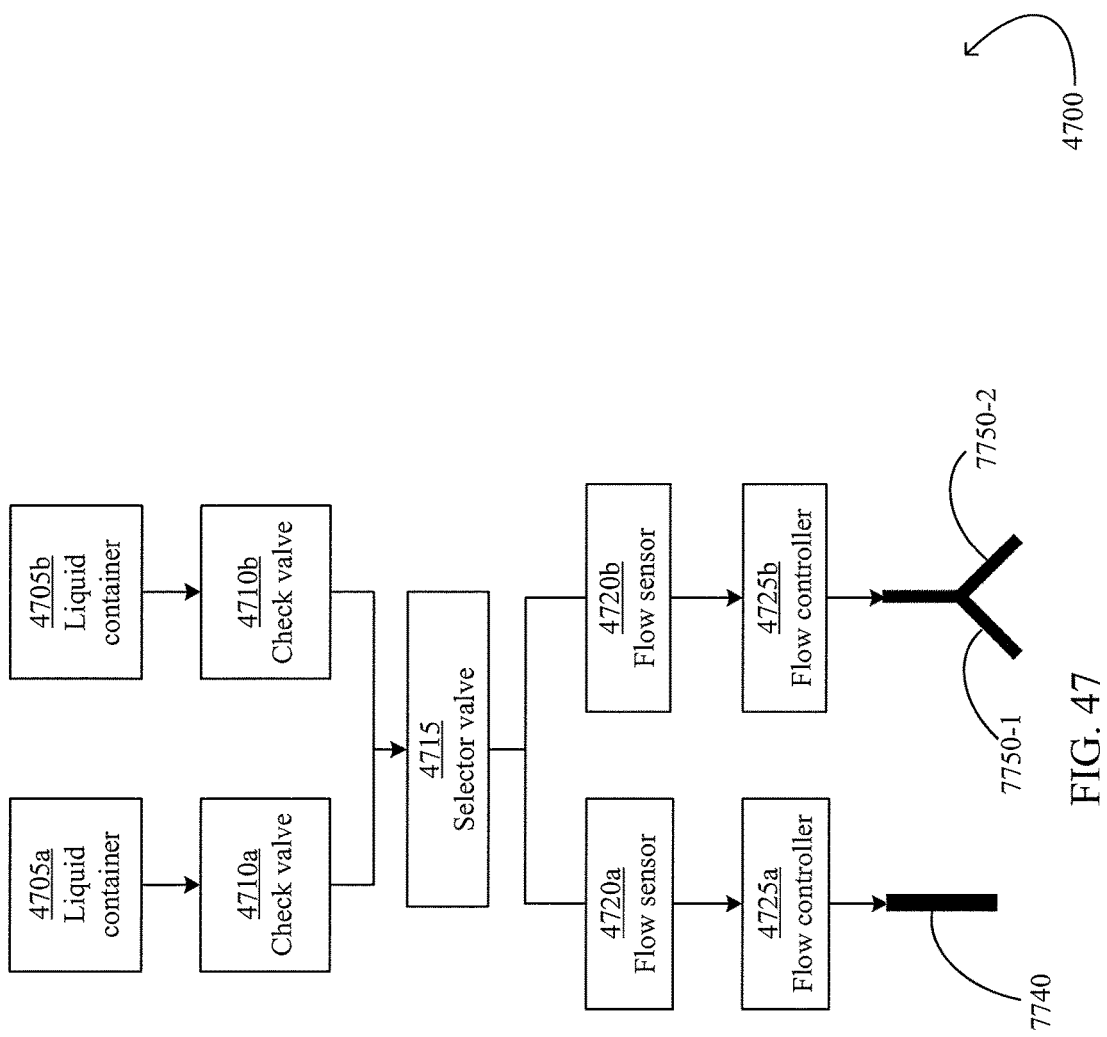
FIG. 47 schematically illustrates an embodiment of a liquid control system.

Turning to FIG. 47, a liquid control system 4700 is illustrated for selectively controlling and monitoring flow from liquid containers 4705a and 4705b (which may contain the same liquid or different liquids) to the central outlet 7740 and the left and right injection needles 7750-1, 7750-2 (collectively, the "selective outlets"). Check valves 4710 are preferably in fluid communication with the liquid containers in series with the associated leakage of liquid from the containers 4705 in operating states in which fluid does not flow from one of the containers to the selective outlets. A selector valve preferably selectively places one or more of the containers 4705 with one or more of the selective outlets.

For example, the valve 4715 may have some or all of the following positions: (1) a first position in which the first liquid container 4705a is in fluid communication with both the central outlet 7740 and the injection needles 7750-1, 7750-2; (2) a second position in which the second liquid container 4705b is in fluid communication with both the central outlet 7740 and the injection needles 7750-1, 7750-2; (3) a third position in which the first liquid container 4705a is in fluid communication with the central outlet 7740 and the second liquid container 4705b is in fluid communication with the injection needles 7750-1, 7750-2; (4) a fourth position in which the first liquid container 4705a is in fluid communication with the central outlet and no liquid flows from the injection needles; (5) a fifth position in which the first liquid container 4705a is in fluid communication with the injection needles and no liquid flows from the central outlet; (6) a sixth position in which the second liquid container 4705b is in fluid communication with the central outlet and no liquid flows from the injection needles; (7) a seventh position in which the first liquid container 4705b is in fluid communication with the injection needles and no liquid flows from the central outlet; and (8) an eighth position in which no liquid flows from either the central outlet or the injection needles. Optionally, a filter (not shown) can be disposed in the liquid system to filter the liquid at any time before the liquid leaves an outlet. For example, a filter could be disposed at the inlet of first inlet 7140 and/or at the inlet of second inlet 7150.

The selector valve 4715 may comprise one or more directional flow control valves which may be adjustable manually or by electronic control (e.g., by data communication with the implement monitor 50). The selector valve 4715 may also comprise a repositionable valve which may be partially manually disassembled and modified to one of the positions described above before reassembly. The flow controllers 4725 may be one or more manually adjustable flow controllers (e.g., replaceable orifices) or rate control valves controlled by the implement monitor 50. A flow sensor 4720 may be associated with each branch of the system 4700 for separately sensing the flow rate to the central outlet and injection needles. In embodiments in which the implement monitor 50 controls the direction and/or rate of liquid application as described above, the implement monitor may consult a liquid prescription stored in memory and select a desired combination of flow rates and liquid types to be deposited through the injection needles and/or the central outlet; for example, the liquid prescription may associate a desired combination with each geo-referenced location in the field in the liquid prescription, and the monitor 50 may determine the geo-referenced location of the planter (and/or specific row unit) reported by the GPS receiver 52 to identify the currently desired combination. The monitor then preferably controls the selector valve 4715 and/or flow controllers 4725 in order to deposit the desired combination of fluid types and flow rates through the injection needles and/or the central outlets. It should be appreciated that although a single branch of the control system 4700 is associated with both injection needles 7750, a separate branch could be associated with each needle to enable application of a unique liquid type and/or rate through each of the central outlet, left injection needle and right injection needle.

Figures 48, 50A:
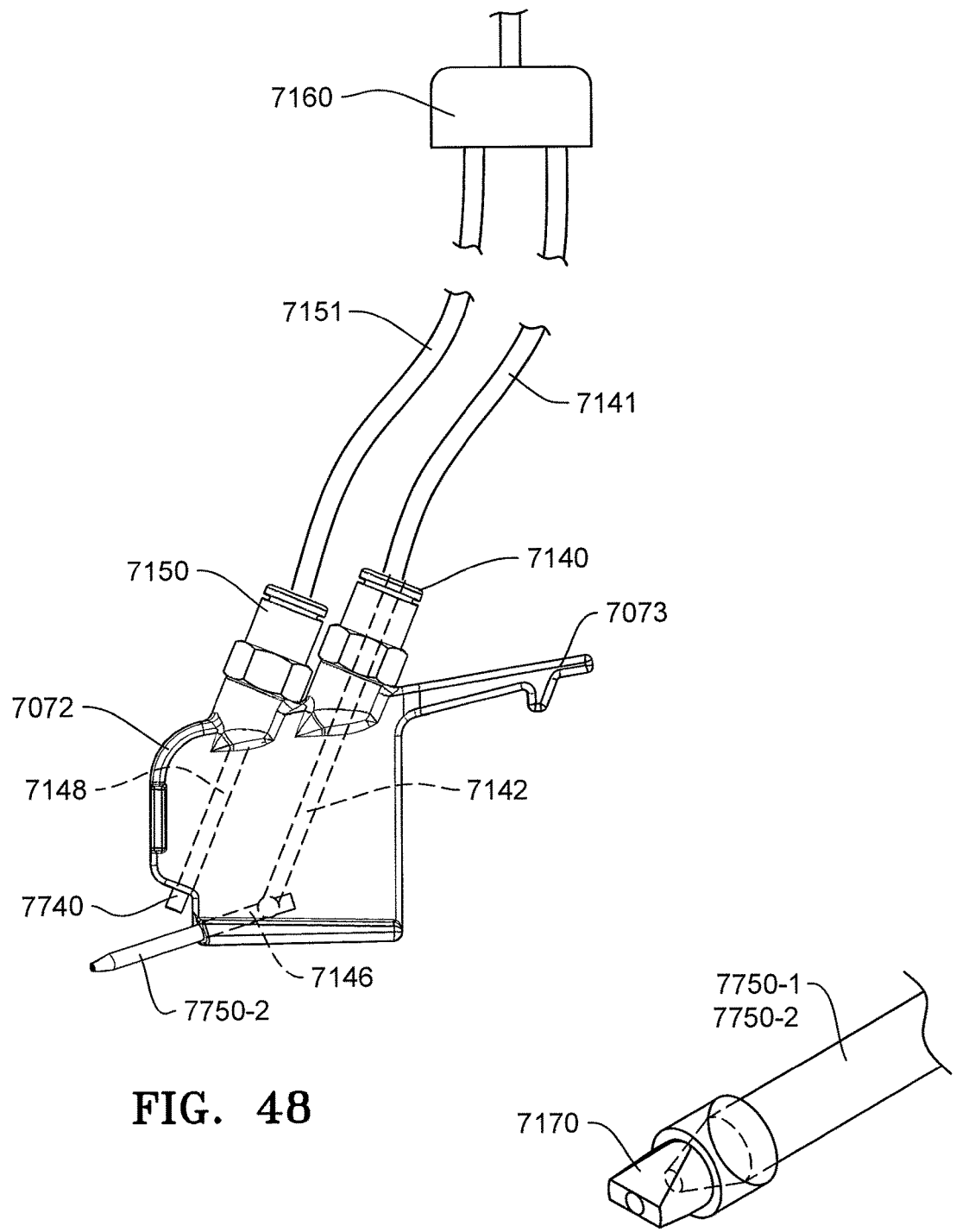
FIG. 48 is a side elevation view of a flow balance valve in fluid communication with the first liquid inlet and the second liquid inlet.
FIG. 50A is a perspective view of an embodiment of an elastomeric self-opening valve.

Referring to FIG. 48, a flow balance valve 7160 may be disposed before the feed to first liquid inlet 7140 and second liquid inlet 7150 to regulate the flow of the liquid between the central outlet 7740 and the injection needles 7750. In such an embodiment, the flow balance valve 7160 is connected to first liquid inlet 7140 via hose 7141 and to second liquid inlet 7150 via hose 7151. The flow going to the central outlet 7740 and the injection needles 7750-1, 7750-2 can be selected to be any desired division of the flow of fluid. In one embodiment, the flow is set to be about one third to hose 7150 and about two thirds to hose 7141. In such an embodiment, the flow will then be about one third to the central outlet 7740 and one third to each sidewall of the seed trench 38 after the flow is split to needles 7750-1 and 7750-2. Using the flow balance valve 7160 will keep the flow to the center of the trench 38 and the sidewalls of the trench 38 consistent in the event that a needle 7750-1 or 7750-2 becomes obstructed by soil. Thus preventing all of the fluid flow from going to the center of the seed trench 38 where the seed 42 is located, which could cause damage to the seed in the event of over fertilization.

Figure 49:
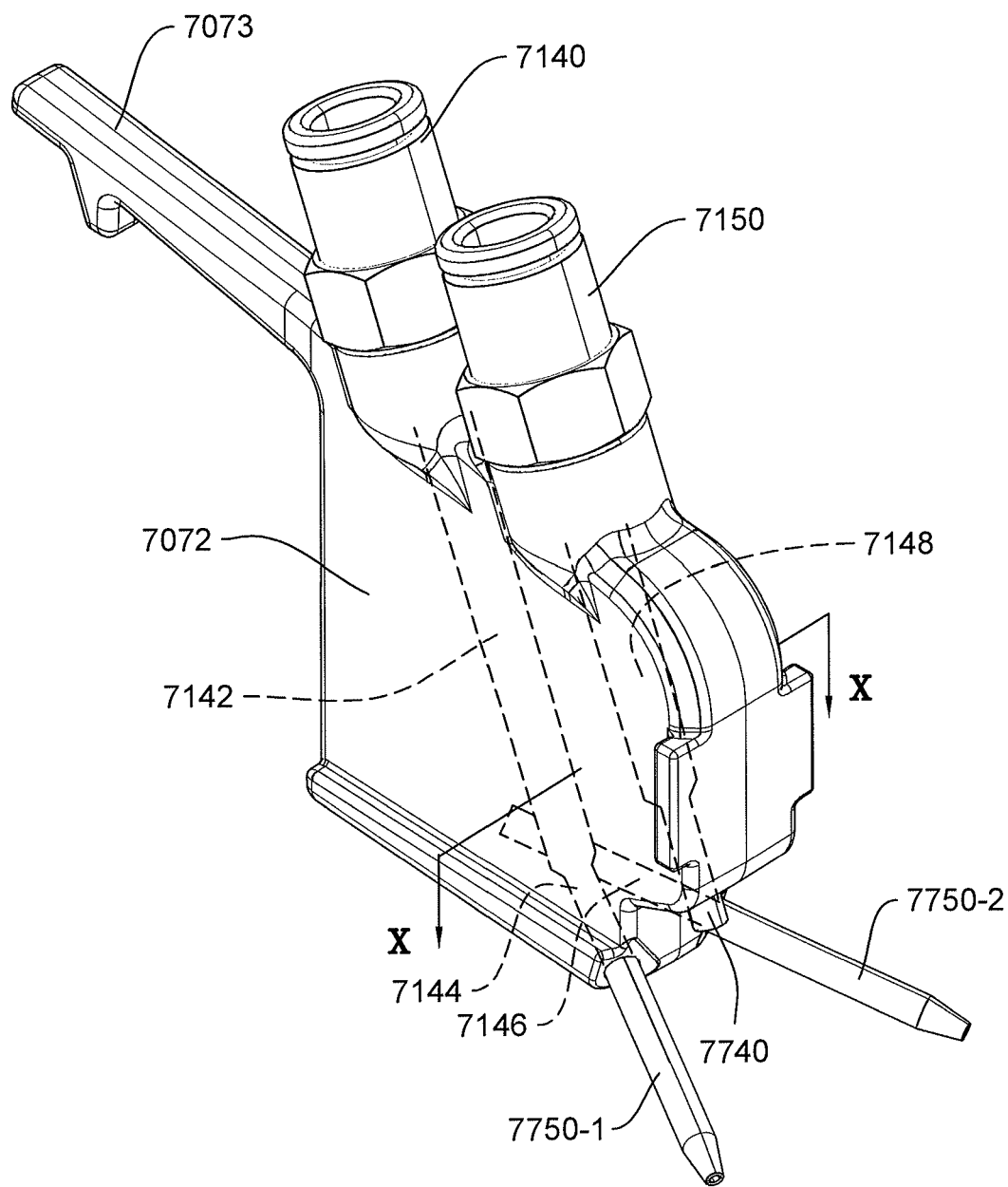
FIG. 49 is a perspective view of the manifold showing the liquid passages therethrough.

FIG. 48 and FIG. 49 show the main liquid passage 7142 through the body of the manifold 7072 from the first liquid inlet 7140 and the Y-passages 7144, 7146 to the respective needles 7750-1, 7750-2. Also shown is the liquid passage 7148 through the body of the manifold 7072 from the second liquid inlet 7150 to the central outlet 7740.

Any of the needles in the above embodiments (such as 3150 or 7750 (7750-1, 7750-2)) may include a self-opening valve disposed at the outlet of the needle. It should be appreciated that under certain conditions, soil may enter the nozzle causing an obstruction. Accordingly, sealing the needle when no fluid is flowing may help to prevent soil from obstructing the needle. The self-opening valve may be any type of elastomeric valve that opens when a desired amount of pressure difference across the valve is applied. Examples of elastomeric valves include, but are not limited to, duckbill valves, dome valves, cross-slit valves, and slit valves. FIG. 50A is one example of a self-opening valve 7170 (duckbill type) shown disposed on the outlet of the needles 7750-1, 7750-2.

Figure 50B:
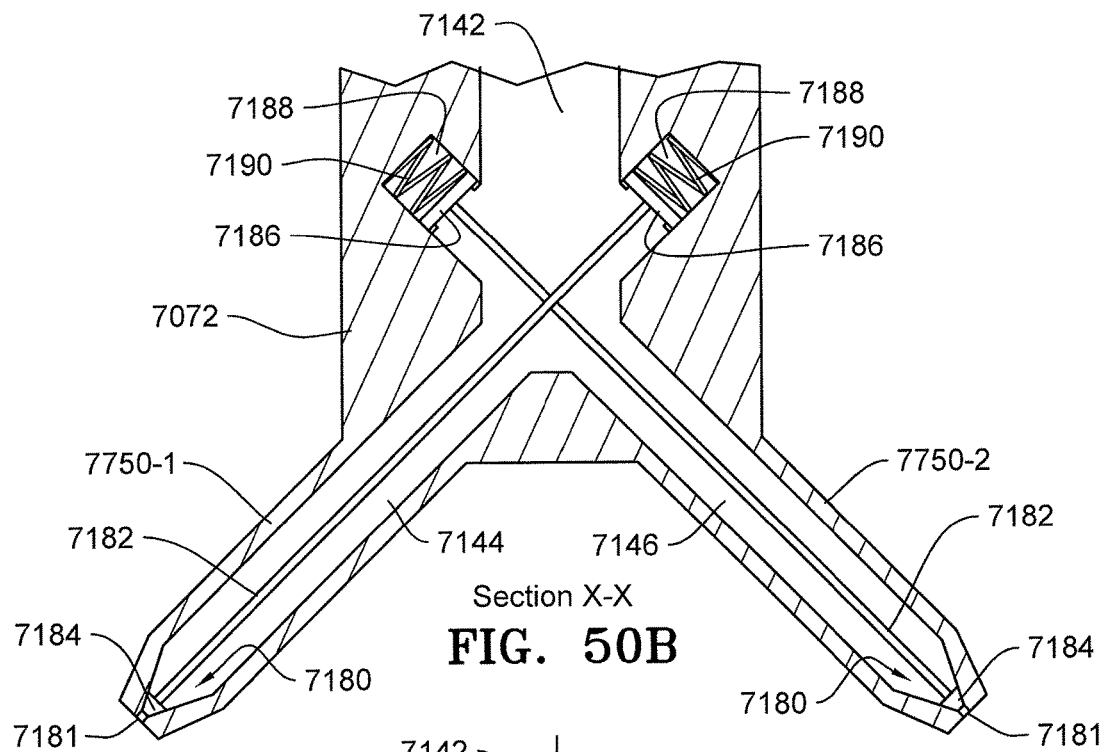
FIGS. 50B-50C are cross-sectional views of the manifold along the cross-section X-X of FIG. 49 showing another embodiment of a self-opening valve.
Figure 50C:
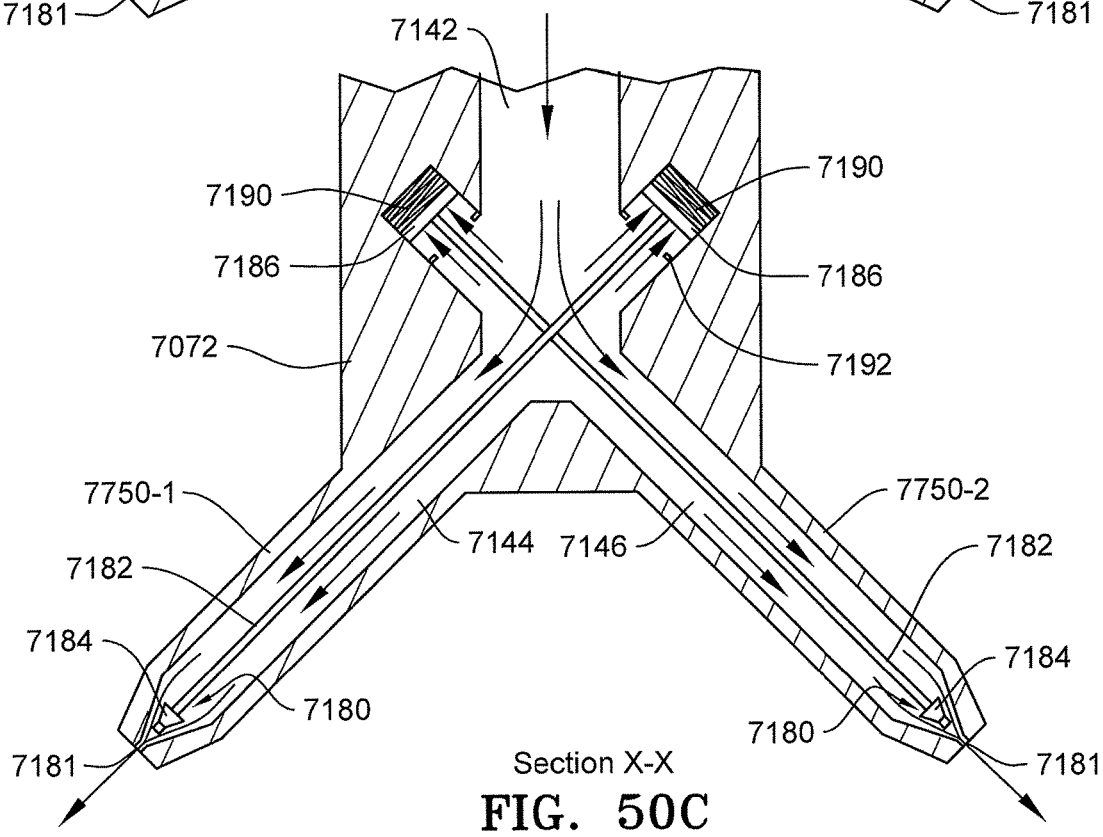

FIGS. 50B-50C are cross-sectional views of the manifold 7072 along section lines X-X of FIG. 48 showing another embodiment of self-opening valves 7180 which may be disposed in the needles 7750-1, 7750-2 to seal the needle openings 7181 when no liquid is flowing to help prevent soil from entering the openings which could cause an obstruction when flow is reinitiated. The self-opening valves 7180 comprise a valve stem 7182 with a valve head 7184 on a distal end and a piston 7186 on a proximal end of the valve stem 7182. The piston 7186 is seated within a bore 7188 and is biased outwardly by a spring 7190 which causes the valve head 7184 to seat within the opening 7181 of the needle 7750-1, 7750-2 when no liquid is flowing into the main passage 7142 as illustrated by FIG. 50B. However, when liquid flows into the main passage 7142, the pressure acts on the underside of the piston 7186 forcing the piston to compress the spring 7190 which causes the valve stem 7182 to move upwardly as shown in FIG. 50C unseating the valve head 7184 from the opening 7181 which permits liquid to exit as shown in FIG. 50C. Stops 7192 may be provided to limit the travel of the piston 7186 beyond the end of the bore 7188 so the valve stem 7182 from falling out of the needle opening. It should be appreciated that the valve stems are vertically offset from one another to prevent interference where the stems cross in the middle of the main passage 7142. It should also be appreciated that rather than biasing the piston 7186 with a spring 7190 a diaphragm (not shown) or any other suitable bias may be used to bias the piston 7186.

Image Capture

Figure 51:
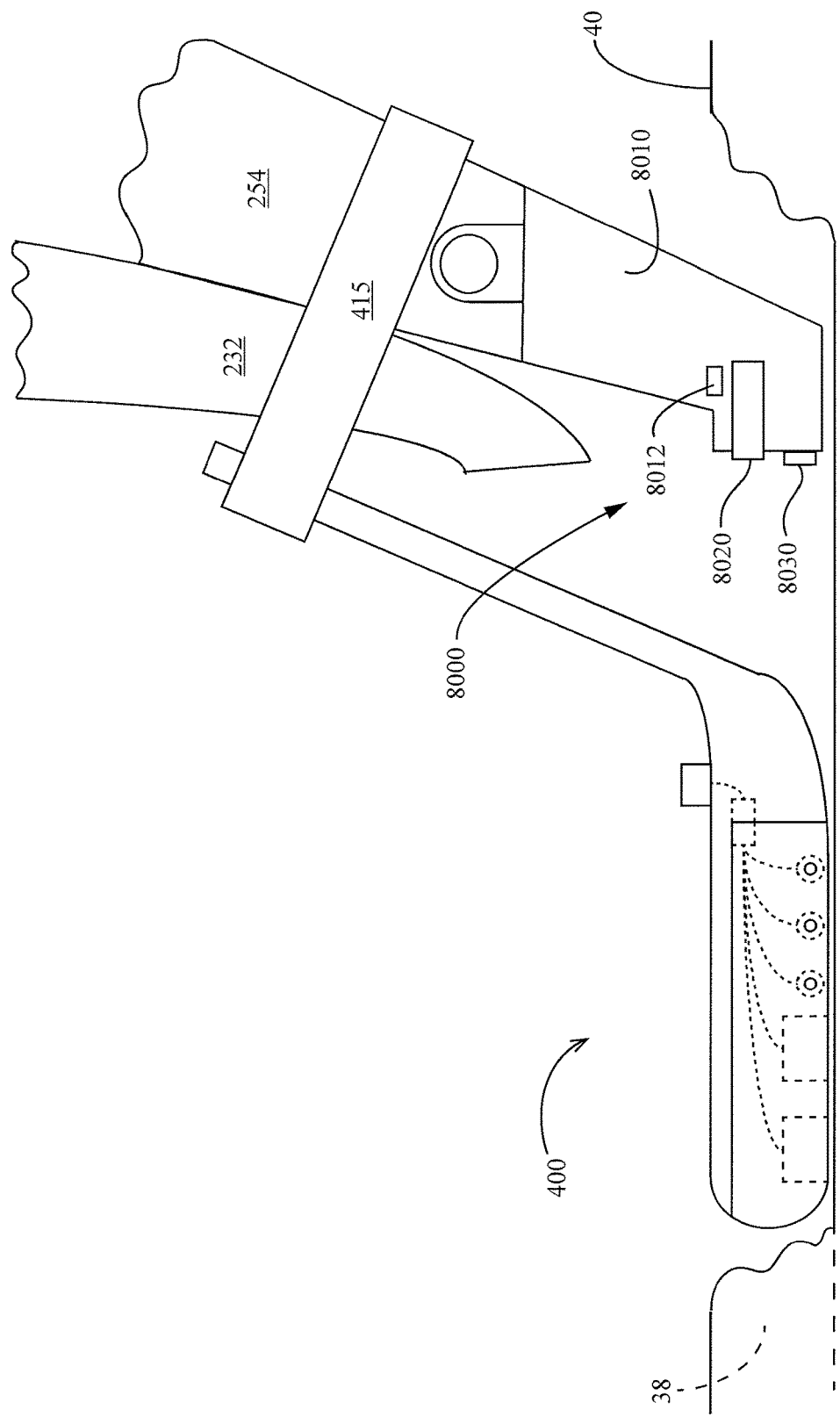
FIG. 51 illustrates an embodiment of an image capture apparatus for a row unit.

Referring to FIG. 51, an image capture apparatus 8000 is illustrated incorporating a camera 8020 mounted to an extension 8010. The extension 8010 may be removably mounted to a portion of the row unit such as a lower end of the shank 254. The camera 8020 is preferably oriented to capture an image of the trench, and may be oriented rearward (e.g., opposite the direction of travel) and disposed at least partially inside the trench 38 (e.g., at least partially below the surface. It should be appreciated that the camera 8020 is mounted forward of the closing system 236 and rearward of a leading edge of the opening discs 244 (e.g., at least partially laterally between the opening discs). In embodiments in which the camera 8020 is adjacent to the opening discs 244, one or more wear-resistant guards 8012 (comprised, e.g., of tungsten carbide or other wear-resistant material) is preferably mounted to either side of the extension 8010 and preferably extend laterally laterally outward such that their laterally terminal ends are disposed between the camera 8020 and the opening discs 244 to protect the camera from contact with the opening discs. A light source 8030 (e.g., LED) is preferably mounted to the extension 8010 and preferably disposed to illuminate the trench 38 and/or soil surface 40 to improve the quality of image capture. The image or images captured by the camera 8020 preferably include the sidewalls of the trench, the bottom of the trench and/or the upper surface of the soil surface 40. The camera may be disposed forward of the seed firmer 400 as illustrated and may be disposed to capture an image of seeds. The camera may be a video camera and/or still image camera and is preferably in data communication with the implement monitor 50 for transmission of images to the implement monitor for display to the user and/or association with a location (e.g., geo-referenced location) in the field at which the images are captured and for storage in memory of the implement monitor and/or on a remote server.

Figure 52:
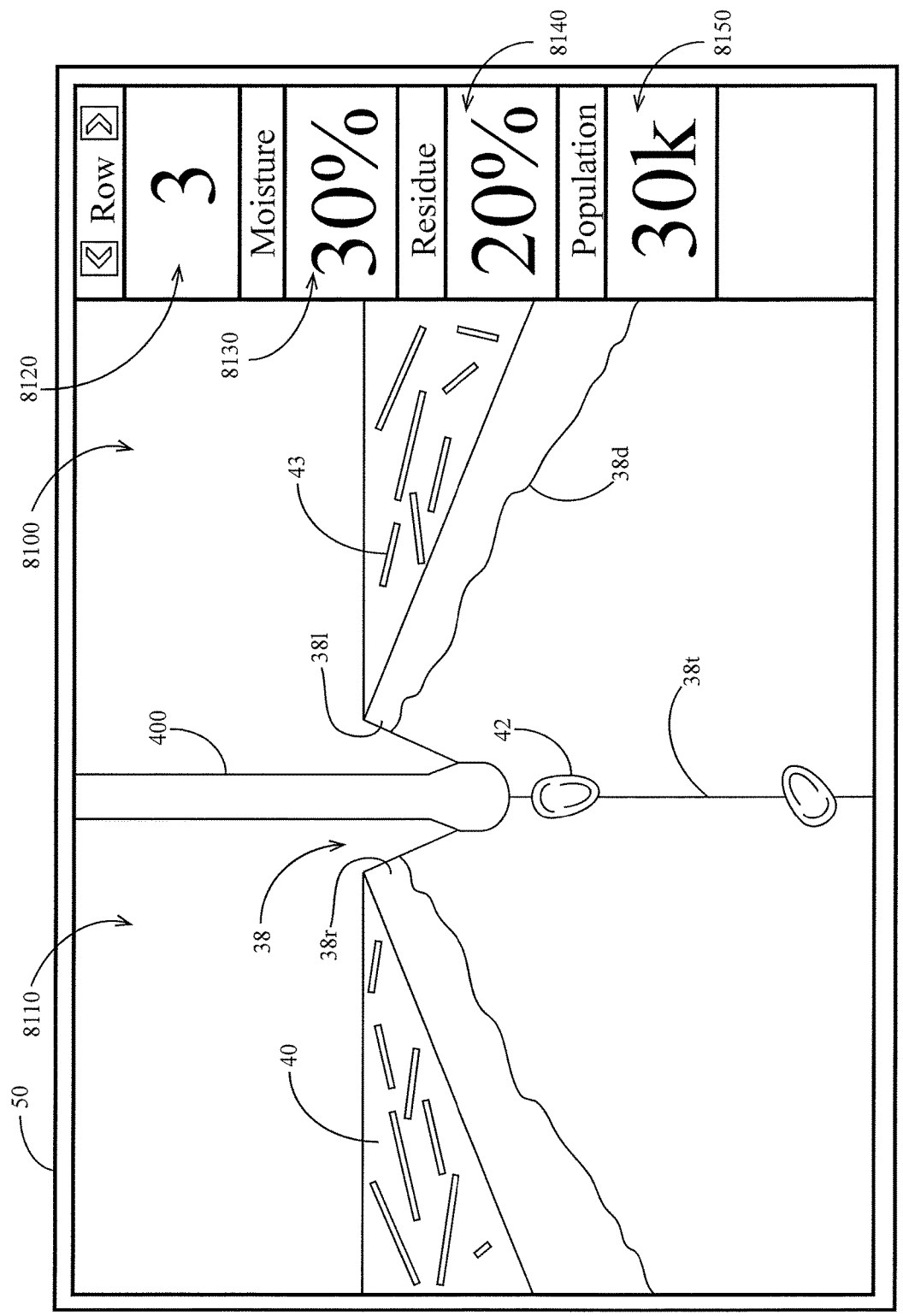
FIG. 52 illustrates an embodiment of a graphical display showing an image captured by the image capture apparatus of FIG. 51.

Turning to FIG. 52, the implement monitor 50 preferably displays a screen 8100 including an image 8110 (e.g., video or still image) including the soil surface 40, residue 43 on the soil surface, the trench 38 including sidewalls 38r, 38l and trough 38t thereof, and seeds 42 disposed in the bottom of the trench.

The screen 8100 preferably includes a row identification window 8120 which identifies which row is associated with the displayed image. Selecting one of the arrows in the row identification window 8120 preferably commands the monitor 50 to load a new screen including an image associated with another, different row of the implement (e.g., captured by a second image capture apparatus associated with that other, different row).

The screen 8100 preferably includes numerical or other indications of soil or seed data which the monitor 50 may determine by analyzing one or more images 8110 or a portion or portions thereof.

Soil data measurement window 8130 preferably displays a soil moisture value associated with the soil in the trench 38. The soil moisture value may be based upon an image analysis of the image 8110 (e.g., the portion of the image corresponding to the sidewalls 38r, 38l). Generally, the image 8110 may be used to determine a moisture value by referencing a database correlating image characteristics (e.g., color, reflectivity) to moisture value. To aid in determining the moisture value, one or more images may be captured at one or more wavelengths; the wavelengths may be selected such that a statistical correlation strength of image characteristics (or an arithmetic combination of image characteristics) with moisture at one or more wavelengths is within a desired range of correlation strength. A wavelength or amplitude of light waves generated by the light source 8030 may also be varied to improve image quality at selected image capture wavelengths or to otherwise correspond to the selected image capture wavelengths. In some implementations, the trench may be divided into portions having different estimated moistures (e.g., the portions of the sidewall 38*l* above and below the moisture line 38*d*) and both moistures and/or the depth at which the moisture value changes (e.g., the depth of moisture line 38*d*) may be reported by the screen 8100. It should be appreciated that the moisture values may be mapped spatially using a map similar to the map shown in FIG. 21B. It should be appreciated that a similar method and approach may be used to determine and report soil data other than moisture (e.g., soil temperature, soil texture, soil color) based on one or more captured images.

Agronomic property window 8140 preferably displays an agronomic property value (e.g., residue density, trench depth, trench collapse percentage, trench shape) which may be estimated by analysis of the image 8110. For example, a residue density may be calculated by the steps of (1) calculating a soil surface area (e.g., by identifying and measuring the area of a soil surface region identified based on the orientation of the camera and the depth of the trench, or based on the color of the soil surface), (2) calculating a residue coverage area by determining an area of the soil surface region covered by (e.g., by identifying a total area of the soil surface covered by residue, where residue may be identified by areas having a color lighter than a constant threshold or more than a threshold percentage lighter than an average color of the soil surface region), and (3) dividing the residue coverage area by the soil surface area.

Planting criterion window 8150 preferably displays a planting criterion such as seed spacing, seed singulation, or seed population. The planting criterion may be calculated using a seed sensor and the algorithms disclosed in U.S. Pat. No. 8,078,367, incorporated by reference ("the '367 patent"). In some implementations, algorithms similar to those disclosed in the '367 patent may be used in conjunction with a distance between seeds calculated with reference to the image 8110. For example, the monitor 50 may (1) identify a plurality of seeds in the image 8110 (e.g., by identifying regions of the image having a range of colors empirically associated with seeds); (2) identify one or more image distances between adjacent seeds (e.g., by measuring the length of a line on the image between the centroids of the seeds); (3) convert the image distances to "real space" distances using a mathematical and/or empirical relationship between distances extending along the trench in the image and corresponding distances extending along the actual trench; (4) calculate a planting criterion (e.g., seed population, seed spacing, seed singulation) based on the "real space" distances and/or the image distances.

Figure 53:
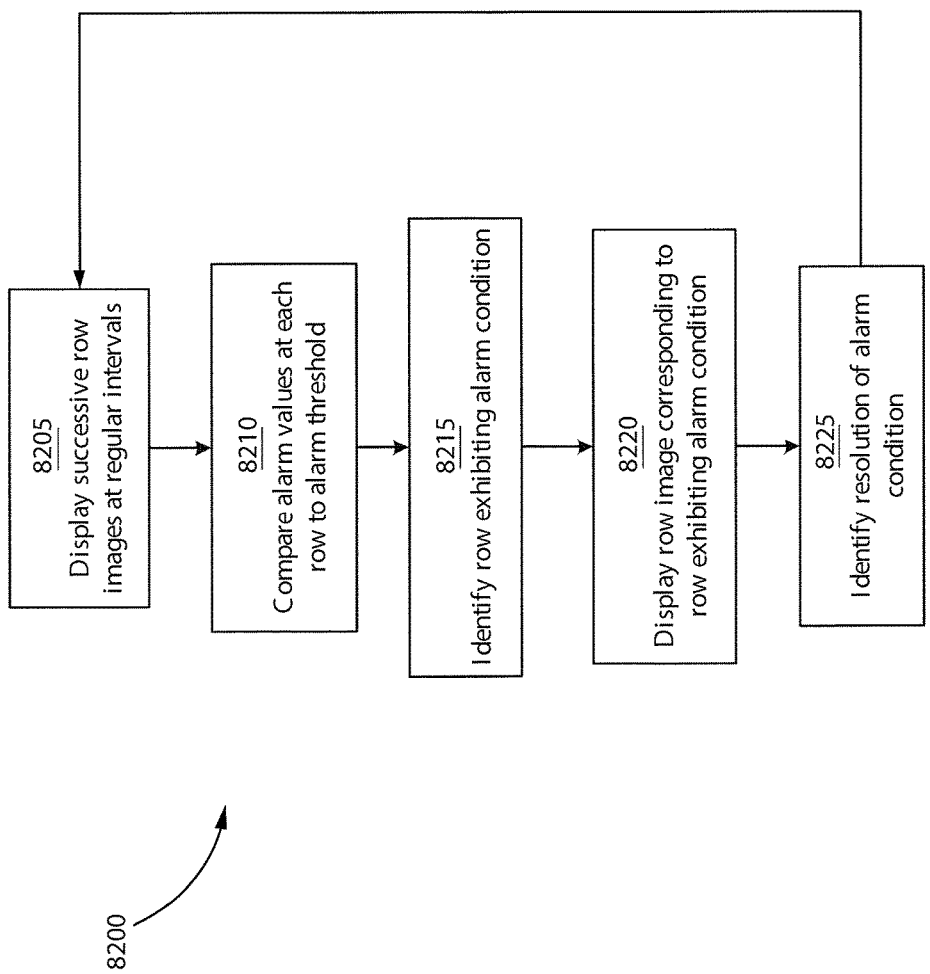
FIG. 53 illustrates an embodiment of a row image selection process.

Turning to FIG. 53, an exemplary process 8200 for selecting a row image to display on the screen 8100 is illustrated. It should be appreciated that because multiple row units may incorporate an image capture apparatus, it may be undesirable to simultaneously display images from all such row units. Instead, at step 8205, the monitor 50 preferably displays successive row images (i.e., still or video images captured by successive row units) by displaying a new row image a regular interval (e.g., 10 seconds, 30 seconds, one minute). For example, a first still image or video stream from a first image capture apparatus at a first row unit may be displayed until the expiration of a first regular interval, whereupon a second still image or video stream from a second image capture apparatus at a second row unit may be displayed until the expiration of a second regular interval. Step 8210 is preferably carried out simultaneously with step 8205. At step 8210 the monitor 50 preferably compares an alarm value at each row unit to an associated alarm threshold. The alarm value may correspond to a soil measurement value (e.g., soil moisture, soil temperature soil texture, soil color, soil reflectivity, soil reflectivity variation) which may be estimated based on analysis of the row image or measured by another soil characteristic sensor associated with the row unit; the alarm value may correspond to an agronomic property or planting criterion (e.g., residue density, trench collapse, trench shape, trench depth, seed spacing, seed singulation, seed population, fertilizer flow rate) which may be estimated based on analysis of the row image or measured by another agronomic property sensor (such as a seed sensor, fertilizer flow rate sensor, trench depth sensor). The alarm threshold may comprise a selected constant value of the alarm value or a statistical function (e.g., one or more standard deviation above or below the mean or average) of the alarm value reported to the monitor during a preceding period or during operation in a specified area (e.g., 30 seconds, 30 feet of travel, the entire field associated with the operation). At step 8215, the monitor 50 preferably identifies a row exhibiting an alarm condition (e.g., at which the alarm value has exceeded the alarm threshold). At step 8220, the monitor 50 preferably displays (e.g., on the screen 8100) the row image captured by the image capture apparatus associated with the row unit exhibiting the alarm condition. The monitor 50 may optionally indicate a graphical representation of the alarm condition adjacent to the row image (e.g. in a separate window) indicating the alarm or by adding an attention-drawing indication (e.g., a red border) to a window (e.g., soil data measurement window 8130, agronomic property window 8140). At step 8225, the monitor 50 preferably identifies a resolution of the alarm condition (e.g., by enabling the user to cancel the alarm or by determining that the alarm condition is no longer active) and preferably returns to step 8205.

It should be appreciated that although some embodiments herein are described as liquid application assemblies or devices, there are features and of such assemblies and devices which may provide benefits and functionalities separate from liquid deposition. For example, in operation, the side trench opener embodiments described herein preferably loosen the trench sidewalls prior to the closing of the trench by the closing wheels (and/or other closing system components) reducing sidewall smearing and sidewall compaction. Additionally, it should be appreciated that any of the above embodiments of the side trench openers may be used to loosen the trench sidewalls to reduce sidewall compaction without delivering liquid. Additionally, the loosened soil maybe more readily closed by the closing system, ensuring seed-to-soil contact after the trench is closed.

Various modifications to the embodiments and the general principles and features of the system and methods described herein will be readily apparent to those of skill in the art. Thus, the foregoing description is not to be limited to the embodiments of the apparatus, systems and methods described herein and illustrated in the drawing figures, but is to be accorded the widest scope consistent with the appended claims and their equivalents.

The invention claimed is:

1. A monitoring system for an agricultural planting implement having at least one row unit, the row unit opening a trench and depositing seeds into the trench, the system comprising:

a seed firmer resiliently engaging the trench, the seed firmer disposed to firm the seeds into a lower portion of the trench;

a reflectivity sensor mounted to said seed firmer, said reflectivity sensor disposed to measure a reflectivity value of said lower portion of the trench;

an electrical conductivity sensor mounted to said seed firmer, said electrical conductivity sensor disposed to measure an electrical conductivity value of soil in said trench;

an implement monitor in data communication with said reflectivity sensor and said electrical conductivity sensor, wherein said implement monitor is configured to identify a seed in the trench based on said reflectivity value;

wherein said implement monitor is configured to correlate said measured electrical conductivity value with a soil carbon content value.

2. The monitoring system of claim 1, wherein said implement monitor is configured to correlate said reflectivity value with an estimated moisture value.

3. The monitoring system of claim 2, wherein said implement monitor includes a graphical user interface, and wherein said implement monitor displays said estimated moisture value on said graphical user interface.

4. The monitoring system of claim 1, wherein said implement monitor is configured to calculate an in-trench spacing value based on a time or distance between seeds identified using said reflectivity value.

5. The monitoring system of claim 4, further comprising:
an optical seed sensor disposed to detect the presence of seeds deposited by the row unit before the seeds enter the trench, wherein said implement monitor is configured to calculate an optical sensor spacing value based on a time or distance between seeds detected by said optical seed sensor.

6. The monitoring system of claim 1, wherein said implement monitor is configured to correlate said reflectivity value with an estimated moisture value.

7. The monitoring system of claim 6, wherein said implement monitor is configured to correlate said reflectivity value with an estimate moisture value only when said reflectivity value does not indicate the presence of a seed.

8. The monitoring system of claim 7, wherein said implement monitor is configured to calculate an in-trench spacing value based on a time or distance between seeds identified using said reflectivity value.

9. The monitoring system of claim 8, further comprising:
an optical seed sensor disposed to detect the presence of seeds deposited by the row unit before the seeds enter the trench, wherein said implement monitor is configured to calculate an optical sensor spacing value based on a time or distance between seeds detected by said optical seed sensor.

10. The monitoring system of claim 1, further comprising:
a temperature sensor mounted to said seed firmer, said temperature sensor disposed to measure a temperature value of soil in said trench.

11. The monitoring system of claim 1, further comprising:
a spectrometer; and
a fiber-optic cable, said fiber-optic cable having a terminal end, said terminal end disposed to receive light reflected from a bottom portion of said trench.

12. The monitoring system of claim 11, wherein said terminal end of said fiber-optic cable is mounted to said seed firmer.

13. The monitoring system of claim 11, wherein said implement monitor is configured to correlate a signal generated by said spectrometer with a percentage of an element present in the soil in the trench.

* * * * *